US008540313B2

(12) United States Patent
Fujita et al.

(10) Patent No.: US 8,540,313 B2
(45) Date of Patent: Sep. 24, 2013

(54) SEAT STRUCTURE

(75) Inventors: Etsunori Fujita, Hiroshima (JP); Seiji Kawasaki, Hiroshima (JP); Hiroki Oshimo, Hiroshima (JP); Shigeyuki Kojima, Hiroshima (JP)

(73) Assignee: Delta Tooling Co., Ltd., Hiroshima-shi (JP)

( * ) Notice: Subject to any disclaimer, the term of this patent is extended or adjusted under 35 U.S.C. 154(b) by 733 days.

(21) Appl. No.: 12/601,404

(22) PCT Filed: May 20, 2008

(86) PCT No.: PCT/JP2008/059223
§ 371 (c)(1),
(2), (4) Date: Apr. 14, 2010

(87) PCT Pub. No.: WO2008/143249
PCT Pub. Date: Nov. 27, 2008

(65) Prior Publication Data
US 2010/0187881 A1    Jul. 29, 2010

(30) Foreign Application Priority Data

May 22, 2007 (JP) ................................. 2007-136061
Aug. 16, 2007 (JP) ................................. 2007-212085

(51) Int. Cl.
*A47C 1/024* (2006.01)
(52) U.S. Cl.
USPC .... 297/300.3; 297/317; 297/296; 297/354.11
(58) Field of Classification Search
USPC ................. 297/291–293, 296, 300.5, 354.11, 297/284.4, 300.3, 317
See application file for complete search history.

(56) References Cited

U.S. PATENT DOCUMENTS

| 4,157,203 A | | 6/1979 | Ambasz |
| 4,585,272 A | * | 4/1986 | Ballarini ................... 297/296 X |
| 4,709,963 A | * | 12/1987 | Uecker et al. .............. 297/300.5 |

(Continued)

FOREIGN PATENT DOCUMENTS

| JP | 60 8661 | 1/1985 |
| JP | 63 50243 | 4/1988 |

(Continued)

*Primary Examiner* — Anthony D Barfield
(74) *Attorney, Agent, or Firm* — Oblon, Spivak, McClelland, Maier & Neustadt, L.L.P.

(57) ABSTRACT

Follow-up performance to respiratory movements is made higher than that of the prior art without obstructing movements of the pelvis of a person. A configuration is adopted that a cushioning member arrangement frame for a seat back 34, 140 and a cushioning member arrangement frame for a seat cushion are displaced according to load fluctuation to a cushioning member for a seat back 40, 150 or a cushioning member for a seat cushion 20. That is, such a configuration is adopted that the cushioning member arrangement frame for a seat back 34, 140 or the cushioning member for a seat cushion 20 not only moves according to load fluctuation but also frames themselves supporting them move via tension structure members spread over the frames (a cushioning member for a seat back and a cushioning member for a seat cushion). Accordingly, when a person lays his/her pelvis at his/her sitting position for deep breathing, the cushioning member arrangement frame for a seat back is displaced to push the vicinity of an upper portion of the cushioning member for a seat back, so that the vicinity of a lower portion of the cushioning member for a seat back is pushed forward to enrich support of the sacrum of the person.

15 Claims, 37 Drawing Sheets

(56) References Cited

U.S. PATENT DOCUMENTS

| | | | |
|---|---|---|---|
| 4,966,411 A * | 10/1990 | Katagiri et al. | 297/300.5 X |
| 5,472,261 A * | 12/1995 | Oplenskdal et al. | 297/284.4 |
| 5,904,397 A * | 5/1999 | Fismen | 297/291 |
| 6,478,379 B1 * | 11/2002 | Ambasz | 297/354.11 |
| 7,422,287 B2 * | 9/2008 | Heidmann et al. | 297/291 X |
| 2007/0236071 A1 | 10/2007 | Fujita et al. | |
| 2009/0099721 A1 | 4/2009 | Imai et al. | |

FOREIGN PATENT DOCUMENTS

| | | |
|---|---|---|
| JP | 1 46126 | 10/1989 |
| JP | 8 182572 | 7/1996 |
| WO | 2005 094632 | 10/2005 |
| WO | 2007 023624 | 3/2007 |

\* cited by examiner

Fig. 4
(a)
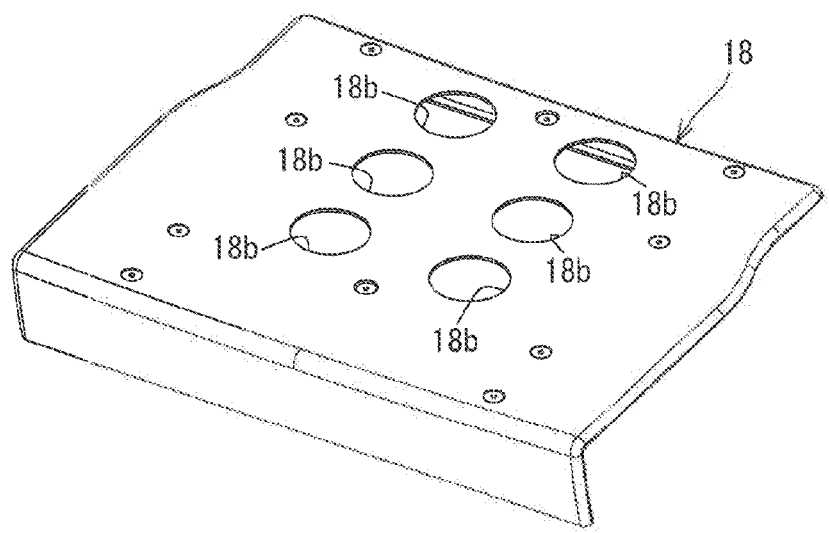
(b)
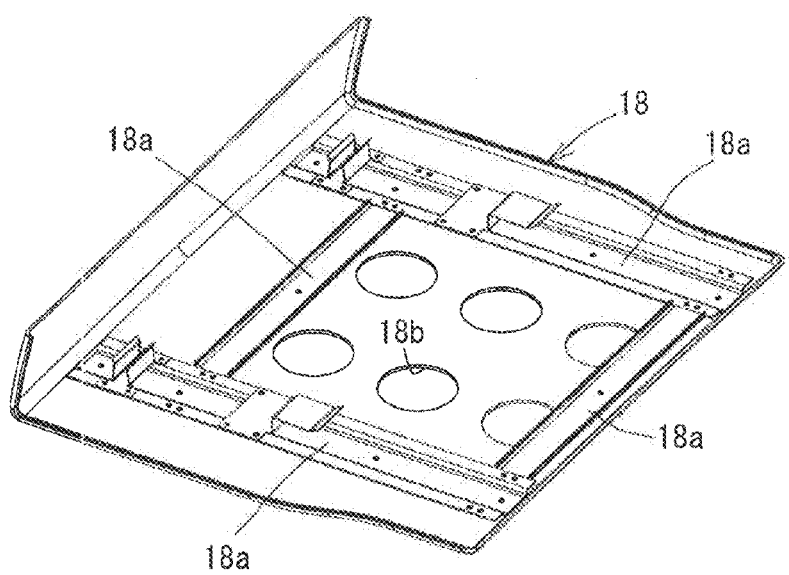

Fig. 5
(a)
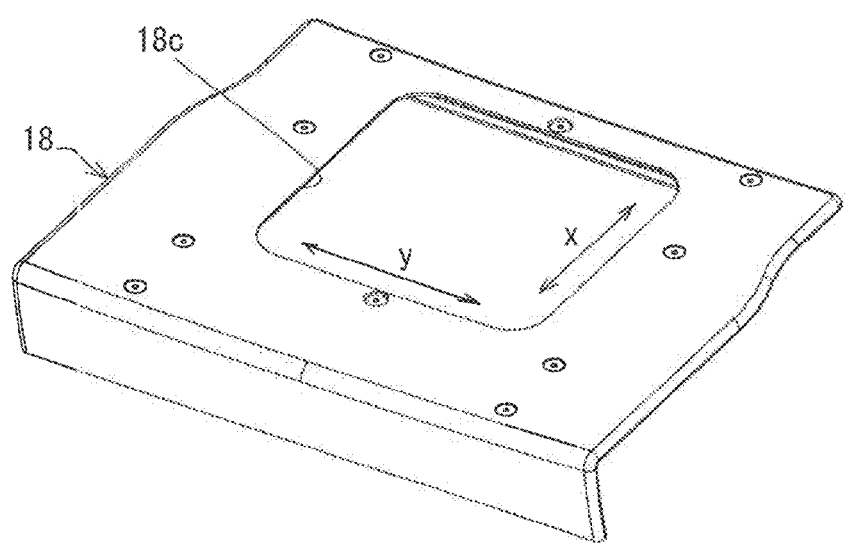
(b)
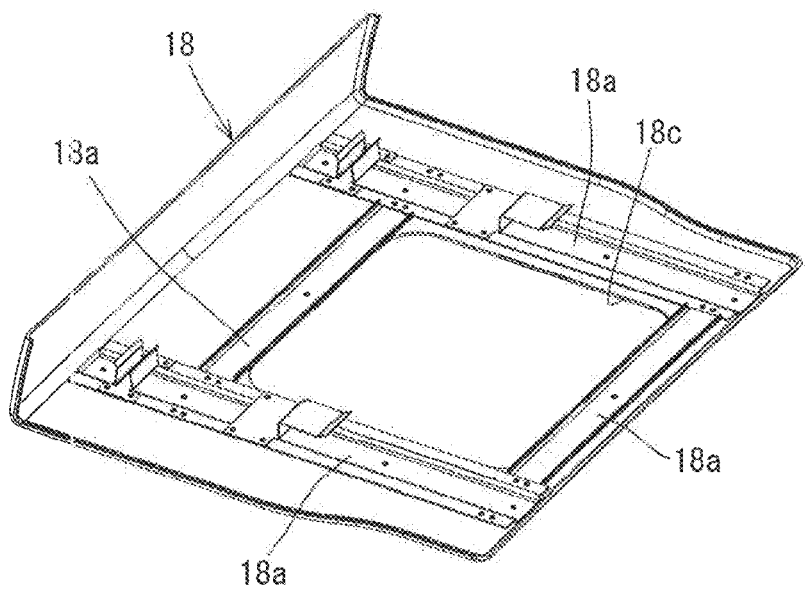

Fig. 21
(a)
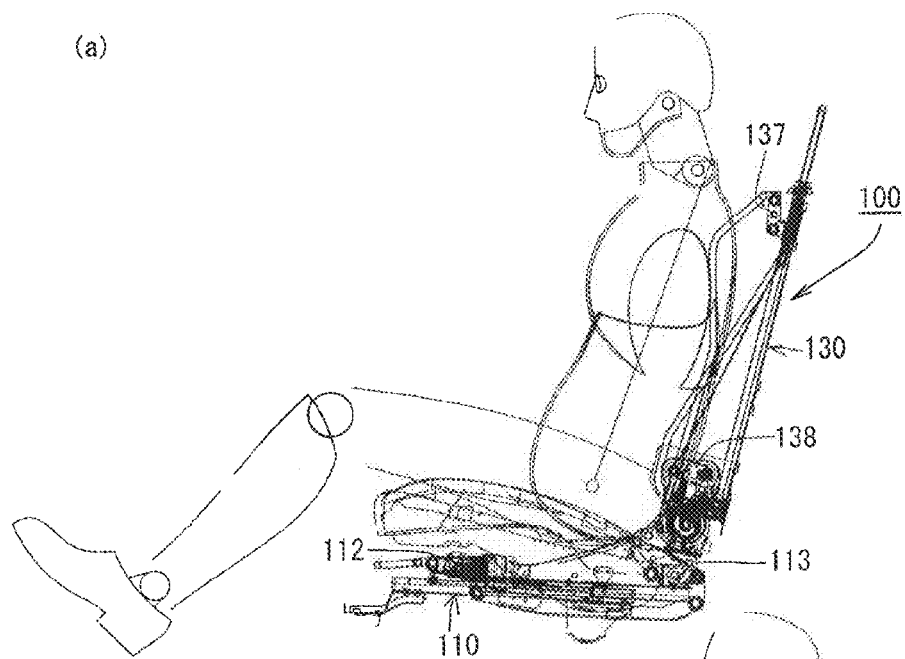
(b)
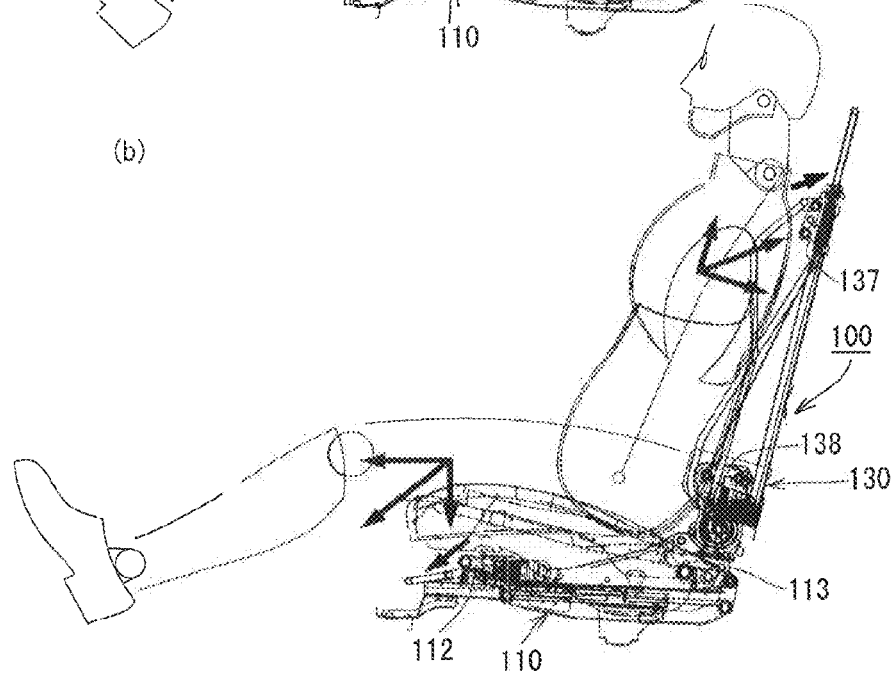

COMPARISON OF DEGREE OF FATIGUE

HERTBEAT FLUCTUATION COMPARISON

SEAT STRUCTURE

TECHNICAL FIELD

The present invention relates to a seat structure, and particularly relates to a seat structure which is suitable for a seat for such a transport machine as an automobile, an airplane, or a train while being suitable for an office chair, or a chair installed in a movie theater, a theater, or the like.

BACKGROUND ART

Patent Documents 1 to 5 disclose seat structures formed by disposing such a cushioning member as a solid knitted fabric (a three-dimensional net member) on a seat cushion frame. When the cushioning member is disposed on the seat cushion frame in this manner, a base net such as a solid knitted fabric or a two-dimensional woven fabric is provided below the cushioning member via an elastic member in order to prevent bottom contact or improve vibration absorbing characteristic or impact absorbing characteristic. All the Patent Documents 1 to 5 disclose that a torsion bar unit provided with a torsion bar, an arm coupled to the torsion bar and supported to be rotatable about the torsion bar, and a supporting frame supported by the arm is disposed at a rear portion of a seat cushion and the base net is elastically supported by coupling a rear end of the base net to the supporting frame.

Patent Document 1: Japanese Patent Application Laid-open No. 2004-347577
Patent Document 2: Japanese Patent Application Laid-open No. 2003-182427
Patent Document 3: Japanese Patent Application Laid-open No. 2004-188164
Patent Document 4: Japanese Patent Application Laid-open No. 2004-141545
Patent Document 5: WO2004/007238A1

DISCLOSURE OF INVENTION

Problems to be Solved by the Invention

According to the techniques disclosed in Patent Documents 1 to 5, follow-up performance to a body movement of a person is made higher than ever before, so that seating comfort, vibration absorbing characteristic, impact absorbing characteristic, and the like are improved, but these improvements are mainly achieved by increased follow-up performance of the cushioning member or the base net supporting the cushioning member to a body movement. Further, the improvements are directed to a seat with a small size in a vertical direction between a floor and a hip point of a person.

Now, when a person breathes steadily, stability of his/her body is maintained and a lung ventilation ratio is improved, so that his/her sympathetic nerve function easily comes on, his/her concentration is high even in his/her relaxed state, and his/her wakeful degree is increased. It is important to provide a seat structure which does not prevent movement of his/her pelvis accompanying breathing in order to realize this at a sitting position. When the pelvis is laid at the sitting position, his/her diaphragm falls, a space in which his/her lungs inflate sufficiently occur, he/she can breathe in deeply, and when he/she raises the pelvis at a breathing-out time, he/she can breathe out using his/her surface layer muscles so that he/she can breathe out largely. Accordingly, such a structure is desired that the sitting face moves together with breathing so that movement of the pelvis is not prevented and, hip slippage can be prevented, and a dam for preventing the hip slippage also moves together with breathing. When muscles are used for prevention of the hip slippage and maintenance of attitude, it becomes difficult for a person to conduct respiratory movements due to shrinkage of his/her antigravity muscle. The techniques disclosed in Patent Documents 1 to 5 are also directed to seat structures where respiratory movements at a sitting position of a person are not prevented so much, but in order for a person to be able to conduct respiratory movements further naturally, it is desired to further increase follow-up performance to respiratory movements (body movements) so as not to prevent movements of a musculoskeletal system according to the respiratory movements while maintaining his/her posture with his/her muscles relaxed.

In WO2005/092193, for example, the present applicants have further proposed to obtain time-series data of a gradient of an amplitude change ratio (gradient of a power value), which is obtained by obtaining the change ratio of displacement (amplitude) of a bio-signal and further performing slide calculation of the change ratio a predetermined number of times at a predetermined slide lap ratio, or obtain time-series data of the maximum Lyapunov index gradient, which is obtained by similarly performing slide calculation of the maximum Lyapunov index of a chaos indicator, thereby detecting change of a condition of a human body. The present applicants have also proposed the technique providing an air pack sensor along a vertical direction in the vicinity of a lumbar of a person as a sensor for detecting a bio-signal. The technique is for utilizing the fact that air pressure of the air pack sensor is fluctuated according to breaths, heartbeats, or the like to detect the same in a time-series manner, thereby capturing change of the condition of the human body.

In order to detect a bio-signal such as breath or heartbeat utilizing such an air pack sensor with a high sensitivity, compression to muscles of the back and the air pack sensor is required. Thereby, tension acts on a surface of the air pack sensor and vibrations of a membrane occur, so that mechanical amplifying action such as a behavior of a microphone occurs due to entrance and exit of air via a small hole in the air pack, but a supporting pressure of a human body rises in the case. Accordingly, movements of a cushioning member are obstructed. When the seat structure prevents movements of the pelvis of a person, bottom contact occurs, so that pressure exceeding internal pressure of the air pack sensor largely acts. As a result, respiratory movements are obstructed. Here, balance (spring constant is zero state) between the internal pressure of the air pack and external pressure occurring due to compression to muscles is required. From this point, a seat structure where a cushioning member does not prevent movements of the pelvis of a person and he/she conducts respiratory movements easily accompanying the movement of the pelvis is required.

On the other hand, a seat structure for an airplane or the like is required to take such a configuration that, because a space between a front seat and a rear seat is restricted, a person can take as relaxed sitting posture as possible within the restricted space, or that the person can easily conduct light exercise which promotes a muscle pumping function of his/her lower leg(s) as countermeasures against economy-class syndrome, therefore, such a configuration that hip slippage is prevented and movements of the pelvis accompanying respiratory movements are not obstructed is required, as described above. In an airplane or the like, a person changes, within a narrow seat space, his/her posture such as he/she takes an upright posture or he/she leans against a seat back to stretch his/her legs, but it is required that even in either posture, tonus of his/her antigravity muscle is reduced or supporting/maintaining easiness of his/her posture is improved owing to that movements of the pelvis are not obstructed or he/she can breathe easily, or balance of autonomic nervous system (sympathetic nervous system, parasympathetic nervous system) is good. When the balance of autonomic nervous system is good, the sympathetic nervous function lowers according to shutting of the eyes of a person and a parasympathetic nervous function becomes dominant over the sympathetic nervous function and rapid induction of sleep is caused, so that he/she can take rest easily and can early recover from fatigue owing to the sleep.

The present invention has been made in view of the above circumstances, and an object thereof is to provide a seat structure where follow-up performance to respiratory movements can be increased without obstructing movements of the pelvis of a person, supporting/maintaining performance of his/her posture is high, detection sensitivity of a bio-signal can be improved, and even if a seat is installed in a restricted space in an airplane or the like, these can be realized.

Means for Solving the Problems

In order to solve the above-described problems, the present invention provides a seat structure comprising: a seat back section provided with an elastic supporting mechanism for a seat back which supports a cushioning member arrangement frame for a seat back provided for arranging a cushioning member for a seat back such that the cushioning member arrangement frame for a seat back can be displaced according to load fluctuation to the cushioning member for a seat back; and a seat cushion section provided with an elastic supporting mechanism for a seat cushion which supports a cushioning member arrangement frame for a seat cushion provided for arranging a cushioning member for a seat cushion such that the cushioning member arrangement frame for a seat cushion can be displaced according to load fluctuation to the cushioning member for a seat cushion.

Preferably, the cushioning member arrangement frame for a seat back is made of flexible material and configures a portion of the elastic supporting mechanism for a seat back, the vicinity of an upper portion of the cushioning member arrangement frame for a seat back is displaced backward by load fluctuation for pressing the vicinity of an upper portion of the cushioning member for a seat back backward, and the vicinity of an upper portion of the cushioning member arrangement frame for a seat back is displaced forward via the cushioning member for a seat back by load fluctuation pressing the vicinity of a lower portion of the cushioning member for a seat back backward.

Preferably, the vicinity of the upper portion of the cushioning member arrangement frame for a seat back is displaced backward and the vicinity of a lower portion thereof is displayed forward by load fluctuation pressing the vicinity of the upper portion of the cushioning member for a seat back backward.

Preferably, the cushioning member arrangement frame for a seat back is provided with a high rigid portion in the vicinity of a portion corresponding to a waist of a person, and can be displaced forward and backward utilizing the vicinity as a fulcrum.

Preferably, the seat back section is provided with a resin cover, a base frame fixed inside the resin cover, and the cushioning member arrangement frame for a seat back, and the cushioning member arrangement frame for a seat back is provided such that an upper hem portion thereof is spaced from the resin cover forward.

Preferably, a combination of the resin cover and the base frame fixed and integrated to the resin cover, and the cushioning member arrangement frame for a seat back have different elasticities and the elasticity of the cushioning member arrangement frame for a seat back is lower than that of the combination of the resin cover and the base frame fixed and integrated to the resin cover.

Preferably, a spring member configuring a portion of the elastic supporting mechanism for a seat back is provided on an upper portion side of the base frame, and the upper hem portion of the cushioning member arrangement frame for a seat back is elastically supported by the spring member.

Preferably, the seat back section is provided with a base frame and a parallel linkage having an upper link portion and a lower link portion which are respectively arranged in the vicinity of an upper portion of the base frame and in the vicinity of a lower portion thereof, the cushioning member arrangement frame for a seat back is disposed such that the vicinity of an upper portion thereof is coupled to the upper link portion of the parallel linkage and the vicinity of a lower portion thereof is coupled to the lower link portion of the parallel linkage, and the elastic supporting mechanism for a seat back is provided with a torsion bar coupled to at least one of a rotation center of the upper link portion and a rotation center of the lower link portion.

Preferably, the upper link portion and the lower link portion of the parallel linkage are attached such that a position of the cushioning member for a seat back supported by the upper link portion and the lower link portion is displaced obliquely backward and upward at a load applying time while being displaced obliquely forward and downward at a load removing time.

Preferably, an upper end of a coil spring whose lower end is engaged with any frame is engaged with a lower portion of the cushioning member for a seat back.

Preferably, the coil spring is disposed in the vicinity of a portion corresponding to a waist of a person along a vertical direction, where forward and backward swing centering around a lower end of the coil spring and expansion and contraction occur in the coil spring according to load fluctuation.

Preferably, the seat structure further comprises an auxiliary cushion for a seat back whose upper end is engaged with an approximately central portion of the cushioning member for a seat back and whose lower end is provided covering a front side of the coil spring, wherein a lower end side of the auxiliary cushion for a seat back is thicker than an upper end side thereof.

Preferably, the seat cushion section is provided with a platform frame and a parallel linkage having a front link portion and a rear link portion which are disposed in the vicinity of a front portion of the platform frame and in the vicinity of a rear portion thereof, respectively, the cushioning member arrangement frame for a seat cushion is provided with a front portion supporting frame disposed between a pair of front link portions of the parallel linkage and a rear portion supporting frame disposed between a pair of rear link portions of the parallel linkage, and the elastic supporting mechanism for a seat cushion is provided with a torsion bar coupled to at least one of a rotation center of the front link portion and a rotation center of the rear link portion.

Preferably, the front link portion and the rear link portion of the parallel linkage are attached such that positions of the front portion supporting frame and the rear portion supporting frame supported by the front link portion and the rear link portion are displaced obliquely forward and downward at a load applying time while being displaced obliquely backward and upward at a load removing time.

Preferably, a cushion pan with flexibility for supporting the cushioning member for a seat cushion which is supported by the front portion supporting frame and the rear portion supporting frame is disposed at a lower portion of the cushioning member for a seat cushion, and the cushion pan includes a hole portion formed at a site including a position corresponding to at least an ischial tuberosity of a person.

Preferably, the cushion pan is provided with a front portion engagement portion engaged with the front portion supporting frame and a rear portion engagement portion engaged with the rear portion supporting frame, and the cushion pan is provided such that, when load pressing a front edge portion of the cushion pan at a leg stretching time of a person acts on the cushion pan, the cushion pan is rotated about the front portion supporting frame such that a portion of the cushion pan positioned on the side of a hip of a person rises upwardly.

Preferably, the front portion engagement portion comprises a pair of plate springs projecting from the cushion pan downwardly such that the plate springs can clamp the front portion supporting frame, and the rear portion engagement portion is formed of a plate spring having a bent portion obtained by bending a base plate portion joined to a lower face of the cushion pan downward and then bending the same backward, where the bent portion is inserted below the rear portion supporting frame so that the rear portion supporting frame is clamped between the bent portion and the lower face of the cushion pan.

Preferably, the rear portion supporting frame engaged with the rear portion engagement portion is provided within a range from 80 to 200 mm forward from a boundary portion between the cushioning member for a seat back and the cushioning member for a seat cushion.

The hole portion of the cushion pan can be formed as a pair of right and left hole portions corresponding to an ischial tuberosity of a person. Preferably, a set of the pair of right and left hole portions is formed as a plurality of sets disposed along a front-back direction of the cushion pan at predetermined intervals. Preferably, the diameter of each of the hole portions is in a range from 60 to 120 mm.

The hole portion of the cushion pan can comprise one hole portion having a size equal to or larger than an area including a site corresponding to a pair of ischial tuberosities of a person. Preferably, the hole portion is formed in an approximately square shape where a length thereof in a front-back direction of the cushion pan is in a range from 60 to 350 mm, while a length thereof in a lateral direction thereof is in a range from 160 to 350 mm.

Preferably, the cushioning member for a seat cushion is fixed to the cushion pan at a peripheral portion of the hole portion of the cushion pan. Preferably, a rigid body is provided at the peripheral portion of the hole of the cushion pan.

Preferably, the cushion pan comprises a combination of synthetic resin material, and tetra-axial woven fabric, bi-axial woven fabric, or non-woven fabric which is integrated with the synthetic resin material to impart stiffness to the synthetic resin material.

Preferably, the front link portion and the rear link portion configuring the parallel linkage are provided such that a seat angle of the cushion pan at a non-loaded time is in a range from 0° to 10° when the front link portion and the rear link portion support the cushion pan.

Preferably, a seat angle of a seat face of the cushioning member for a seat cushion supported by the cushion pan is set to be in one of a range from 0° to 10°, a range from 10° to 20°, and a range from 20° to 30°.

The cushioning member for a seat cushion can have a structure obtained by stacking at least a base cushion, an intermediate cushion, and an upper cushion, and preferably, the base cushion and the upper cushion are formed from three-dimensional solid knitted fabric. Preferably, at least the base cushion of the base cushion and the upper cushion is selected from two-dimensional woven fabric, non-woven fabric, or canvas, and the base cushion is disposed to be partially bonded to the cushion pan. The intermediate cushioning member can be provided with a cut face obtained by performing cutting in a thickness direction thereof. Preferably, the intermediate cushioning member comprises members different in physicality on the sides of the cut face. The present invention can be provided with a bio-signal detecting device.

Effects of the Invention

In the present invention, such a configuration is adopted that the cushioning member arrangement frame for a seat back and the cushioning member arrangement frame for a seat cushion are displaced according to load fluctuation to the cushioning member for a seat back or the cushioning member for a seat cushion. That is, such a structure is adopted that the cushioning member for a seat back or the cushioning member for a seat cushion not only moves according to load fluctuation but also the frames which support the cushioning member for a seat back and the cushioning member for a seat cushion themselves move via tension structure members (the cushioning member for a seat back and the cushioning member for a seat cushion) provided to the frames in a stretching manner. However, when a high gravity is applied to the seat at an acceleration/deceleration time, a cornering time of a vehicle or the like, high pressure is applied to the tension structure members and the flexible frames, so that rigidity feeling of the seat itself is increased. Therefore, high rigidity feeling is created when needed, and flexible elastic characteristic functions in an ordinary state. In correspondence to body motions of a person due his/her posture change or his/her respiratory movements, his/her pelvis is laid at a sitting position in order for him/her to breathe deeply, the vicinity of an upper portion of the cushioning member for a seat back is pressed and the vicinity of a lower portion thereof is pushed forward by displacement of the cushioning member arrangement frame for a seat back, so that supporting his/her sacral bone is enriched. Further, the cushioning member for a seat cushion is displaced in a sinking manner. Thereby, his/her hip slippage is reduced, and tonus of his/her antigravity muscles for holding his/her posture is released, so that he/she can relax to breathe deeply. Further, when he/she tries to raise his pelvis to breathe out, he/she presses the vicinity of the lower portion of the cushioning member for a seat back, so that the vicinity of the upper portion is pushed forward and a seat face of the cushioning member for a seat cushion is forced to rise upwardly. These movements make his/her respiratory movements easy. Therefore, the cushioning member for a seat back and the cushioning member for a seat cushion according to the seat structure of the present invention have considerably high follow-up performances to movements of his/her pelvis while maintaining high rigidity feeling, so that they do not obstruct the movements of his/her pelvis. Accordingly, his/her comfortable breathing can be realized.

Further, by adopting such a configuration that the cushioning member arrangement frame for a seat cushion is supported by the parallel linkage, further sensitive following-up to movement of his/her pelvis, his/her body movements, or the like according to the above-mentioned respiratory movements is achieved. As a result, a range from the back (including the lumbar) of a person to the vicinity of his/her breech or femoral area always comes in contact with the cushioning member for a seat back or the cushioning member for a seat cushion to be supported by the cushioning member even if respiratory movements or body motions are performed, so that a stable and natural sitting comfort for a person to breathe comfortably can be realized. Further, since the cushioning member for a seat back or the cushioning member for a seat cushion always comes in contact with a human body, when a bio-signal detecting device such as an air pack sensor provided in the vicinity of the lumbar or the like is disposed, a seating face of the cushioning member for a seat back and the air pack sensor move together, so that it is difficult for disturbance to enter the air pack sensor and the air pack sensor can detect a bio-signal such as breath or heartbeat with a high sensitivity.

Further, when the cushioning member for a seat cushion is supported by the cushion pan having a hole portion at a position corresponding to the ischial tuberosity of a person, the ischial tuberosity is supported so as to slightly sink in the hole portion. Further, when a person changes his/her posture slightly, the position of the ischial tuberosity moves within the hole portion. Therefore, an anchor effect where the ischial tuberosity functions as, so to speak, an anchor occurs, so that his/her hip slippage is prevented and his/her posture is stabilized. Thereby, he/she does not strain his/her back muscles or abdominal muscles extremely, except for suppressing slippage of his/her pelvis at his/her heels for suppressing his/her hip slippage, so that he/she can conduct smooth respiratory movements. By adopting such a configuration that the cushion pan is supported by the cushioning member arrangement frame for a seat cushion, the cushion pan having the hole portion functioning as a dam for preventing hip slippage also moves following movement of his/her pelvis, so that he/she can breathe further easily.

Further, it is preferable that, when the cushioning pan is supported, a seat angle at a non-load time to the cushion pan is in a range from 0° to 10°. When the cushion pan is provided in this manner and the seat angle of the cushioning member for a seat cushion supported on the cushion pan is in a range from 0° to 10°, namely, an approximately flat seat face whose seat angle is set to be 10° or less is adopted, especially, it becomes easy for a person to sit on or stand up from a seat. Further, a person can easily take a posture of putting his/her heels on a floor face. On the other hand, since such a hole portion is formed in the cushion pan, his/her inschial tuberosity is reliably supported even by the flat seat face, which results in that his/her hip slippage becomes hard to occur. When a space is restricted, especially, like seats in an airplane, a person sitting on a rear seat can stretch and bend his/her legs by adopting such a configuration that he/she can enters his/her foots (his/her below-knee section) below a seat cushion section of a front seat. Thereby, muscle pump of a calf of his/her lower leg functions so that constriction of peripheral blood flow is reduced. Therefore, it is desirable to adopt a flat seat face where hip slippage is prevented and his/her heels reach a floor face firmly.

Further, according to increase of the seat angle or according to increase of pushing movement of a side support portion for supporting a lateral side of a person, holding performance of the seat at a sitting time becomes high, which results in restriction of his/her posture at the sitting time. This shape is desirable for a seat for an automobile generating acceleration. However, when such a seat structure is adopted for a restricted seat space such as a seat in an airplane, movement of a person in his/her sitting state is restricted more largely according to increase of his/her frame. For example, when a large seat with a large seat angle is adopted in a small space, it is necessary to set a seat face height of a seat cushion low. Otherwise movement of his/her below-knee section is restricted, so that it becomes more difficult for a person with a larger frame to take such a laterally-facing sitting posture as pressing the vicinity of his/her ear portion on the cushioning member for a seat back. From this point, when a member for securing a supporting face for heels of a person to support the person is used in a restricted seat space such as a seat in an airplane, it is necessary to set the member to such a state that a space where the person can conduct his/her body movement or exercise can be secured. In order to secure as wide a face for supporting a person as possible while securing a space where he/she can change his/her posture freely, it is preferable that the seat cushion is configured as a small seat cushion section having a flat seat face where the hole portion for supporting a bottom of an ischial tuberosity is provided. On the other hand, it is preferable that the seat back supports an upper edge of his/her pelvis and a periphery of his/her sacral bone region and it can secure support of his/her breast region, especially, a region slightly lower from his/her blade bone. Thereby, a supporting point for posture change is made, and posture change or body motion during a sitting state of a person is made easy while preventing hip slippage at a sitting time.

Further, since such a configuration is adopted that the cushioning member arrangement frame for a seat back and the cushioning member arrangement frame for a seat cushion are displaced according to load fluctuation or posture change of a person even if the seat face is flat, a relative change between the person and a seat face portion is small, supporting performance for his/her sacral bone and an upper region of his/her pelvis is high and supporting performance for his/her breast bone, especially, a periphery of his/her blade bone is also high. That is, since the cushioning member for a seat back can receive the back region of a person on a face thereof securely, even if a member with a small frictional coefficient is used as a surface layer member of the seat face portion in order to reduce a slippage force or even if a member which is not formed with a side support portion is used, supporting performance against slippage in right and left directions is high. Further, by using a surface layer member with a small frictional coefficient, not only slippage force between the seat face and a skin of a person can be reduced but also such a feeling as a cloth nags around the person can be reduced. Further, by adopting a flat seat face, a front edge portion of the cushioning member for a seat cushion does not press the vicinity of a knee back region. When a person takes an upright posture, the vicinity of his/her knee back region separates from the front edge portion of the cushioning member for a seat cushion, so that the cushioning member for a seat is pushed by the knee back region to be easily displaced downwardly even in a leg-stretched state of the person by supporting the cushioning member arrangement frame for a seat cushion via the above-mentioned parallel linkage. Therefore, such a possibility becomes extremely small even in a long-time sitting state of a person that constriction of blood flow occurs. Incidentally, since the abovementioned seat face height is low in a seat for an automobile or the like, it is of course possible to make the thickness of the front edge portion of the cushioning member for a seat cushion thicker in a forward direction, thereby performing setting to a seat angle in a range from 10° to 20° in a seat for an ordinary sedam type automobile or the like or performing setting to a seat angle in a range from 20° to 30° in a seat for a sport type automobile, for example, according to the purpose. The seat angle of a seat face of the cushioning member for a seat cushion can be set properly according to an application of the seat structure of the present invention.

BRIEF DESCRIPTION OF DRAWINGS

FIGS. 4A and 4B are views showing one example of a cushion pan;

FIGS. 5A and 5B are views showing another example of a cushion pan;

FIGS. 21A and 21B are views for explaining a function of the seat structure according to the second embodiment;

FIGS. 28A, 28B, 28C, and 28D are graphs showing comparison of a pulse wave time-series waveform, a pulse wave spectrum waveform, a breath time-series waveform, and a breath spectrum waveform, respectively;

Figure 1:
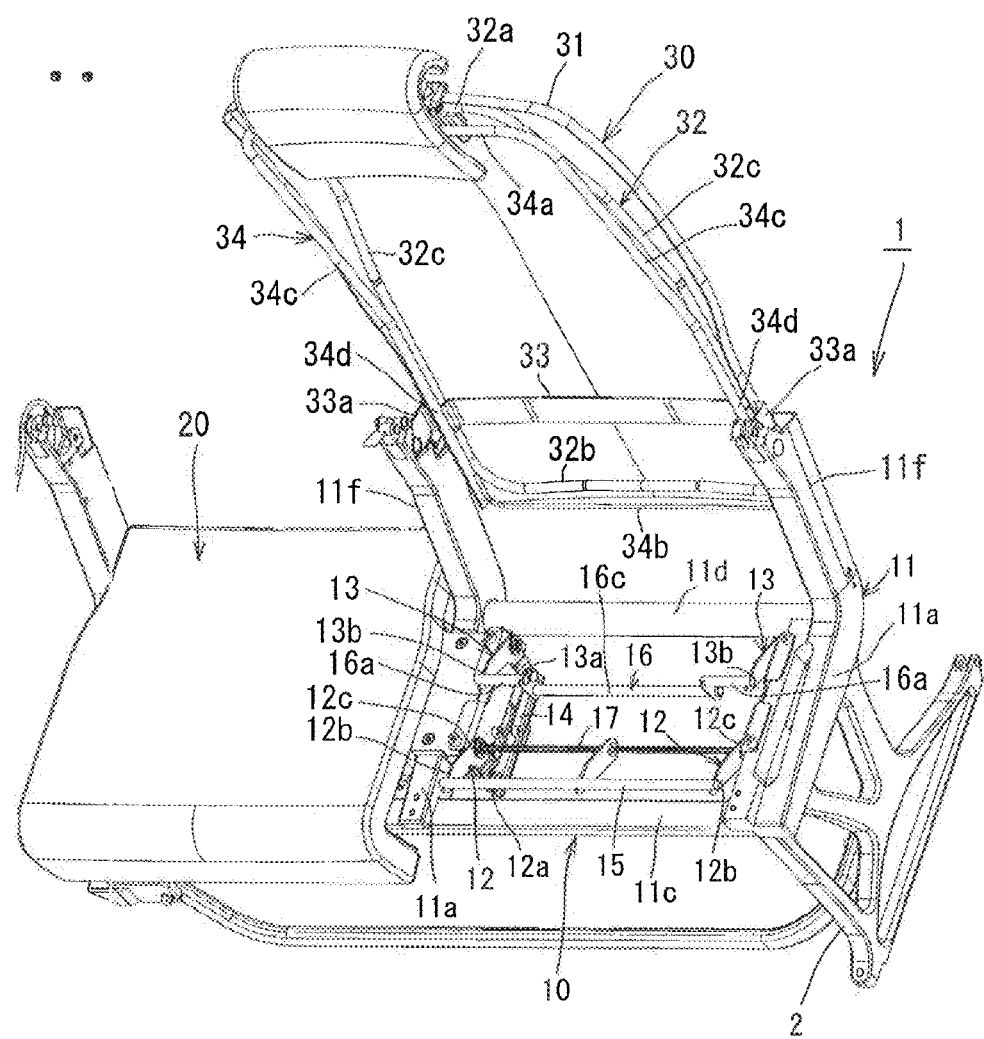
FIG. 1 is a schematic perspective view showing a seat structure according to a first embodiment of the present invention.
Figure 2:
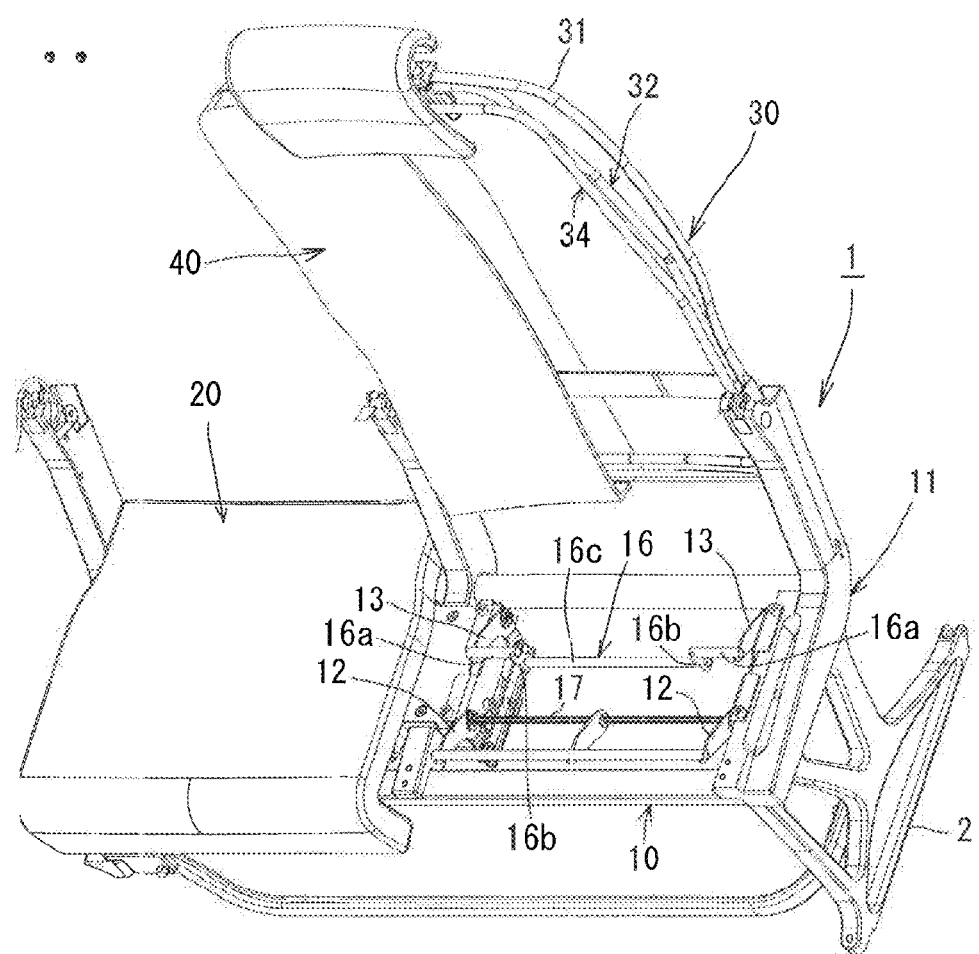
FIG. 2 is a schematic perspective view showing the seat structure shown in FIG. 1 where a cushioning member for a seat back has been disposed.

REFERENCE SIGNS LIST 1, 100: seat structure
10, 110: seat cushion section
11, 11: platform frame
12, 112: front link portion
13, 113: rear link portion
15, 115: front portion frame
16, 116: rear portion frame
17, 119, 138d: torsion bar
18, 118: cushion pan
18b, 18c, 118b: hole portion
20: cushioning member for a seat cushion
30, 130: seat back section
31, 131: resin cover
32, 132: base frame
34, 140: cushioning member arrangement frame for a seat back
40, 150: cushioning member for a seat back
45, 145: coil spring

BEST MODE FOR CARRYING OUT THE INVENTION

Hereinafter, embodiments of the present invention will be further explained in detail with reference to the drawings. FIG. 1 to FIG. 16 show a seat structure 1 according to a first embodiment of the present invention. The seat structure 1 according to the embodiment is suitable as a seat structure for an airplane, a passenger boat, a train, a movie theater, or the like, where an installation space for seats is restricted. The seat structure 1 illustrated is for a two-passenger seat, but it may be for a one-passenger seat or for a three or more-passenger seat, of course.

The seat structure 1 of the embodiment is provided with a seat cushion section 10 and a seat back section 30, and it is arranged such that the seat cushion section 10 is positioned at a predetermined height from a floor face by leg portions 2 disposed on the floor. The seat cushion section 10 is provided with a platform frame 11 supported by the leg portions 2. The platform frame 11 is provided with side portion frames 11a, 11a disposed to be spaced by a predetermined distance so as to be positioned on the left side and the right side of a sitting person and a front portion frame 11c and a rear portion frame 11d positioned so as to be spanned between front ends of the side portion frames 11a, 11a and between rear ends thereof.

Approximately L-shaped front link portions 12, 12 are provided at portions of the side portion frames 11a, 11a positioned near front portions thereof such that bent portions 12c, 12c are pivoted to the side portion frames 11a, 11a facing smaller ones of angles formed by respective legs of the L-shaped front link portions 12, 12 forward. Approximately L-shaped rear link portions 13, 13 are also attached to portions of the side portion frames 11a, 11a positioned near rear portions thereof like the front link portions 12, 12. Respective end portions of connection link plates 14 are respectively coupled via shaft pins between lower ends 12a, 13a of the front link portion 12 and the rear link portion 13 on one side and between lower ends 12a, 13a of the front link portion 12 and the rear link portion 13 on the other side. A front portion supporting frame 15 is spanned between upper ends 12b, 12b of a pair of front link portions 12, 12, while a rear portion supporting frame 16 is spanned between upper ends 13b, 13b of a pair of rear link portions 13, 13. Incidentally, the rear portion supporting frame 16 is provided with upper frames 16a, 16a disposed at both ends thereof, connection plates 16b, 16b whose one ends are connected to the upper frames 16a, 16a such that the other ends project downward, and a lower frame 16c disposed between the other ends of the connection plates 16b, 16b, so that it is formed in a recessed shape as a whole (see FIG. 1 and FIG. 2). Accordingly, the upper frames 16a, 16a are coupled to the upper ends 13b, 13b of the rear link portions 13, 13, respectively. A cushioning member arrangement frame for a seat cushion is configured by the front portion supporting frame 15 and the rear portion supporting frame 16, so that a cushioning member for a seat cushion 20 is supported. The front link portion 12 and the rear link portion 13 configure a portion of a parallel linkage.

A torsion bar 17 is disposed between the bent portions 12c, 12c configuring rotation centers of a pair of front link portions 12, 12, and the torsion bar 17 is twisted according to rotations of the front link portions 12, 12, so that a predetermined elasticity functions. Since the cushioning member for a seat cushion 20 is supported by the front portion supporting frame 15 and the rear portion supporting frame 16 coupled to the front link portion 12 and the rear link portion 13, the torsion bar 17 of the embodiment configures an elastically-supporting mechanism for a seat cushion which elastically supports the cushioning member arrangement frame for a seat cushion (the front portion supporting frame 15 and the rear portion supporting frame 16) according to load fluctuation to the cushioning member for a seat cushion 20 (which means including both load fluctuation acting on the cushioning member for a seat cushion due to a sitting action of a person or an action thereof separating from the seat and fluctuation of load application due to body motion or posture change of a person in his/her sitting state). Incidentally, the torsion bar 17 may be provided between the rear link portions 13, 13 instead of between the front link portions 12, 12.

Figure 3:
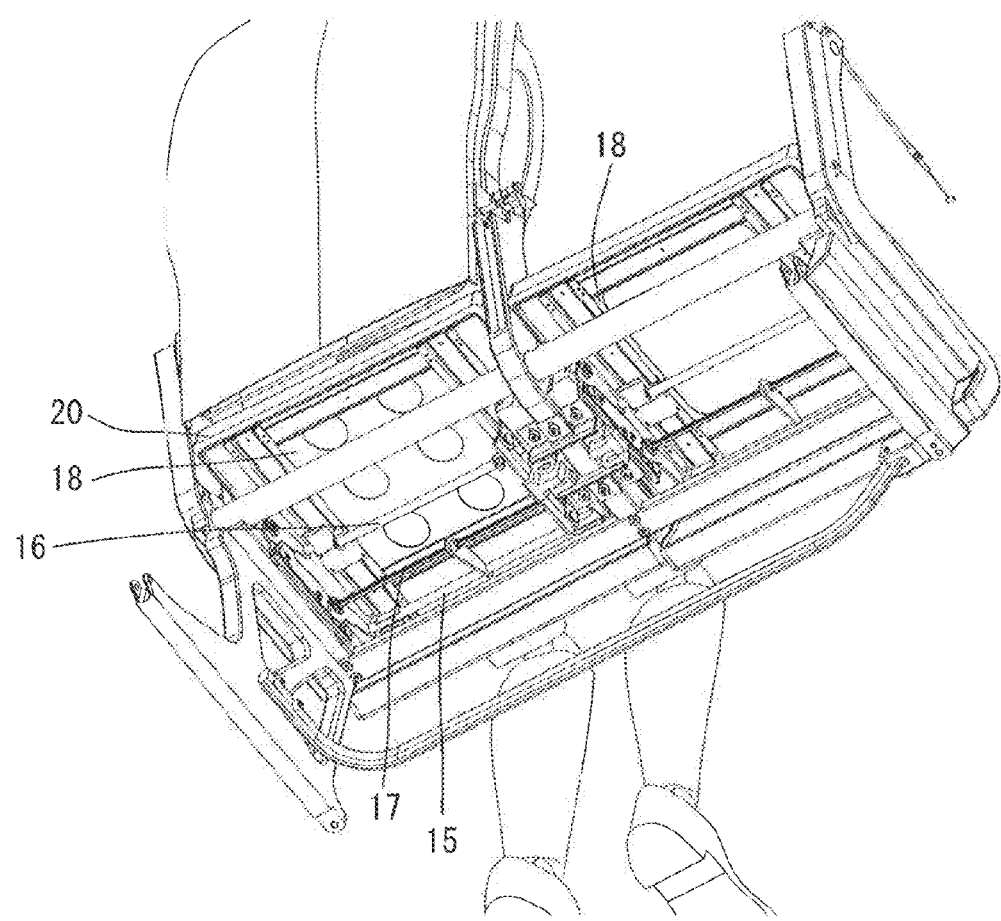
FIG. 3 is a view of the seat structure shown in FIG. 1 and FIG. 2 viewed from below.
Figure 6:
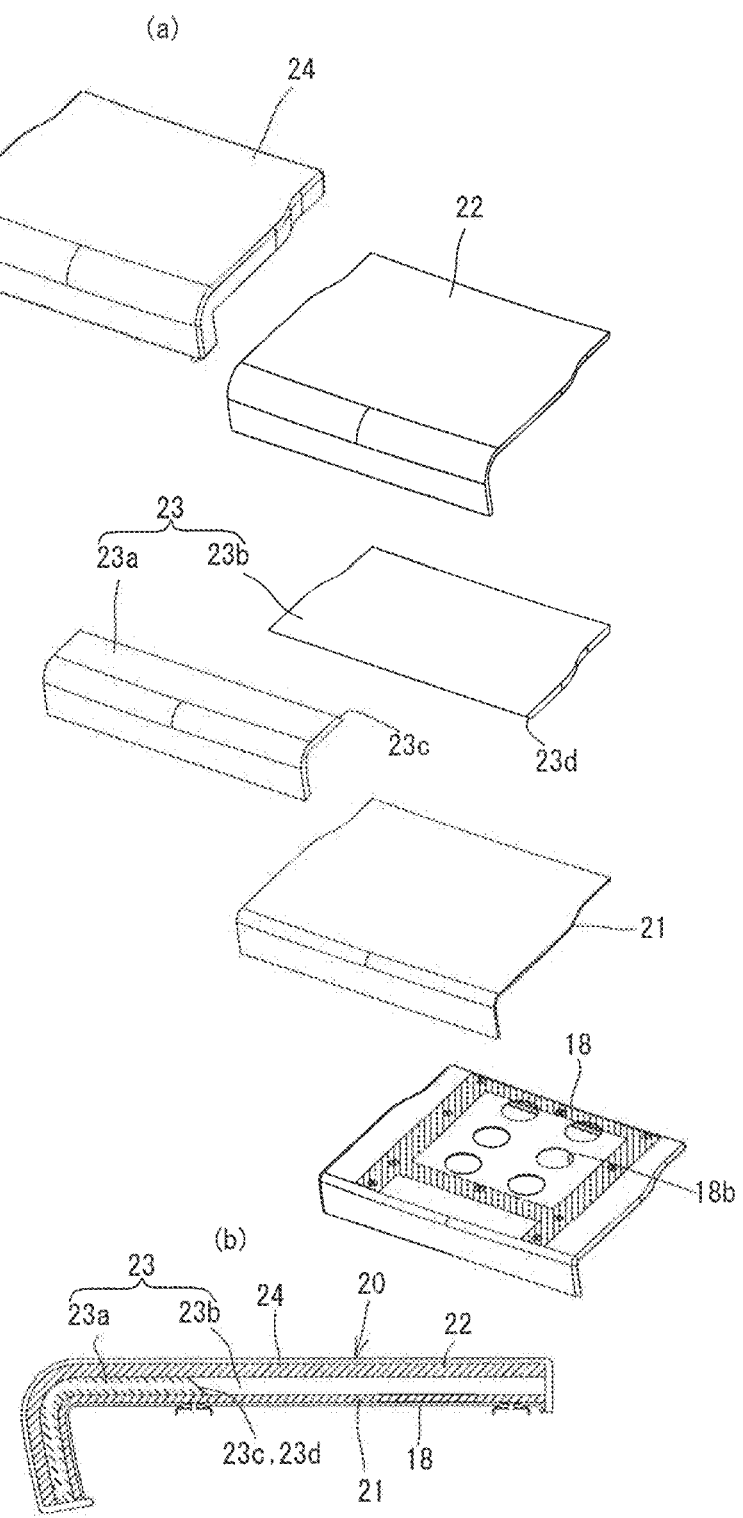
FIG. 6A is an exploded view showing one example of a seat cushion section and FIG. 6B is a sectional view of the seat cushion section.
Figure 7:
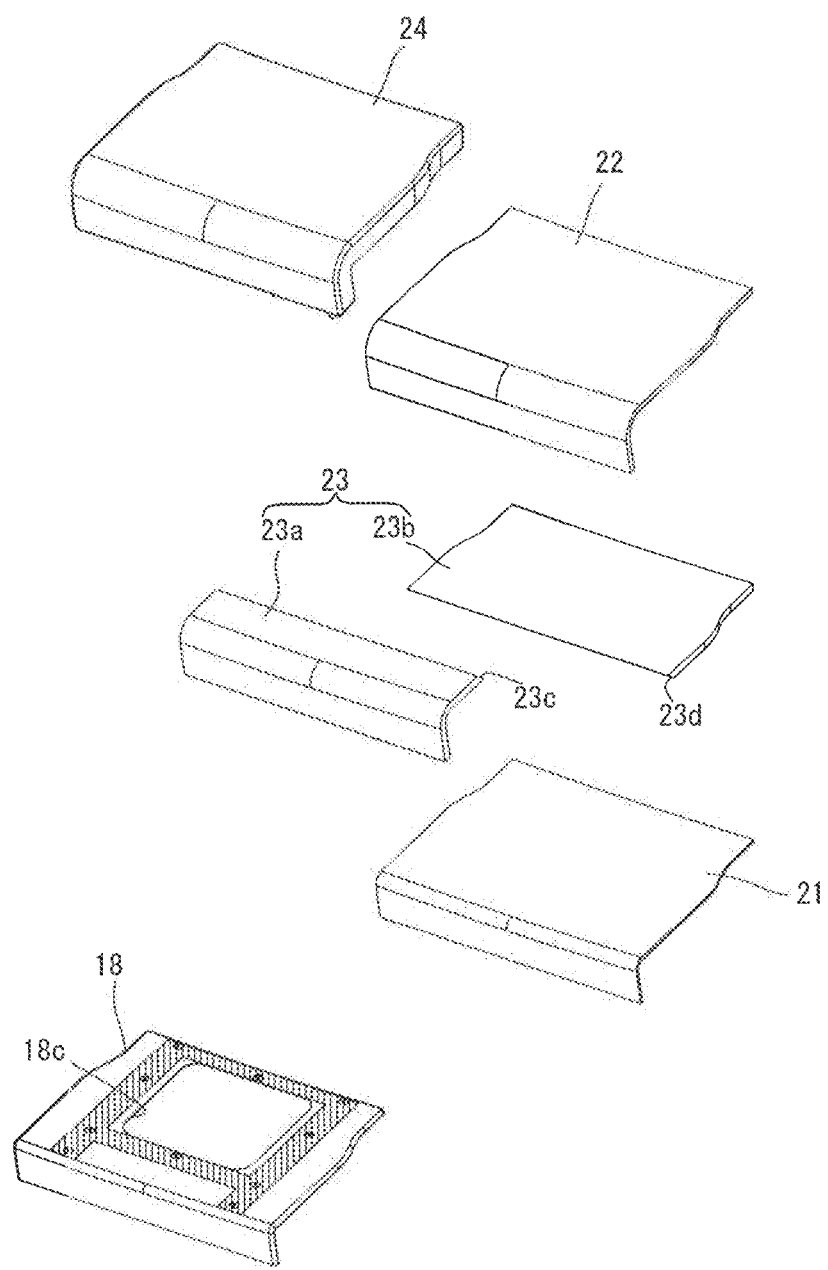
FIG. 7 is an exploded view showing another example of the seat cushion section.
Figure 8:
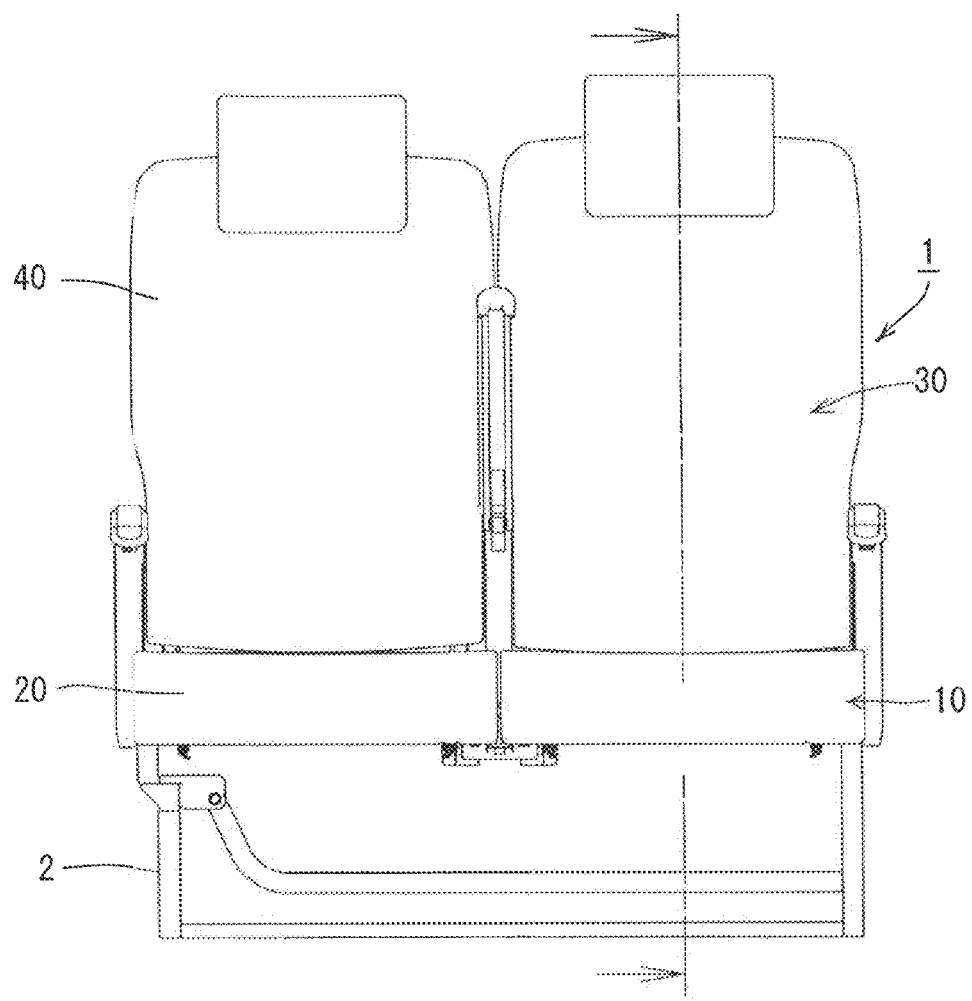
FIG. 8 is a front view of the seat structure according to the first embodiment at a non-sitting time of a person.
Figure 9:
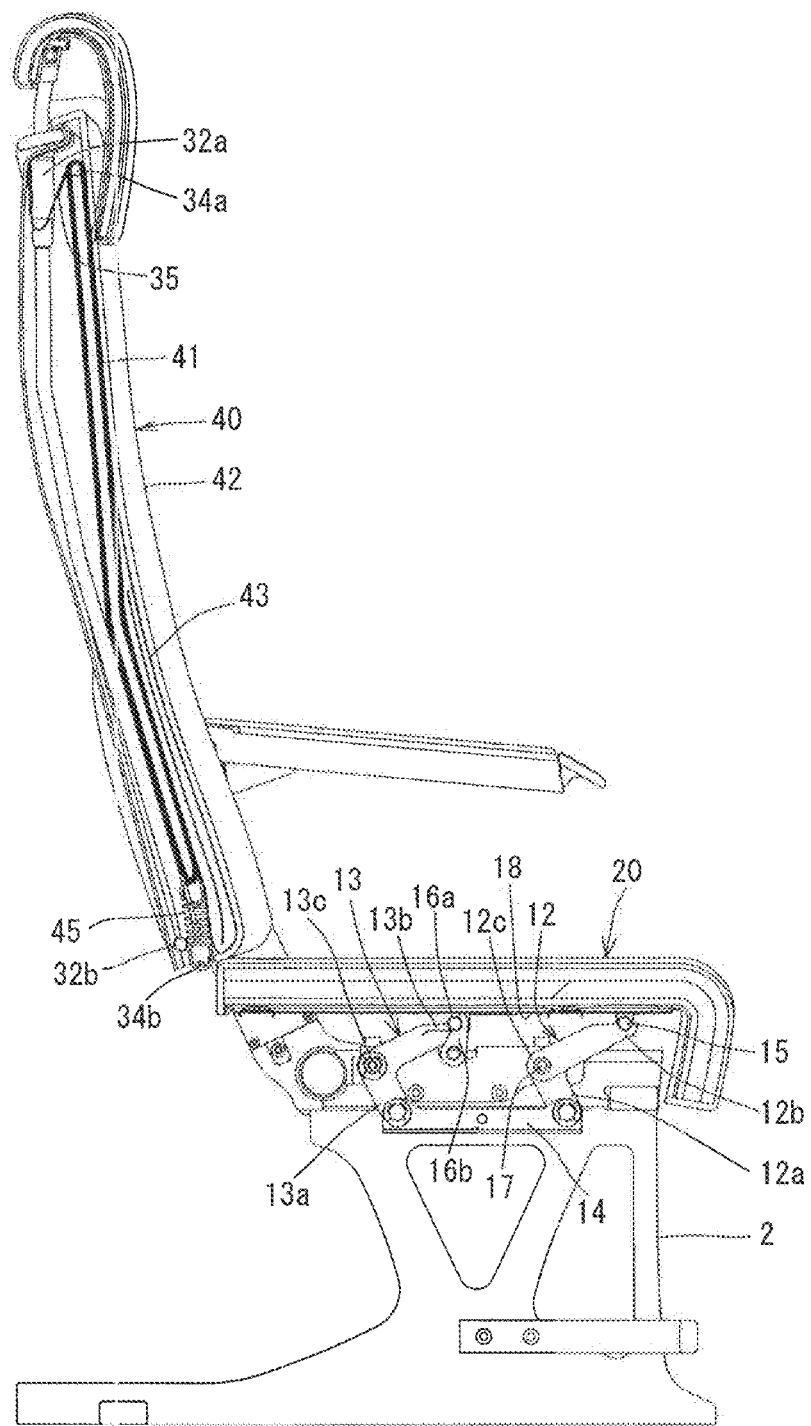
FIG. 9 is a sectional view of the seat structure shown in FIG. 8 taken along a dashed-dotted line in FIG. 8.

As shown in FIG. 3 and FIG. 9, the cushion pan 18 is supported by the front portion supporting frame 15 and the rear portion supporting frame 16, and the cushioning member for a seat cushion 20 is disposed so as to cover the cushion pan 18. Incidentally, a supporting method of the cushion pan 18 to the front portion supporting frame 15 and the rear portion supporting frame 16 will be explained later. In the embodiment, setting is performed such that heights of the upper end 12b of the front link portion 12 and the upper end 13b of the rear link portion 13 are approximately the same heights both at their positions when the front link portion 12 and the rear link portion 13 are rotated about the bend portions 12c, 13c obliquely forward and downward (in an acting direction from a state shown in FIG. 9 to a state shown in FIG. 11) at a load applying time and at their positions when they are rotated obliquely backward and upward (in an acting direction from the state shown in FIG. 11 to the state shown in FIG. 9) at a load removing time, so that the cushion pan 18 coupled to the front portion supporting frame 15 and the rear portion supporting frame 16 to be supported thereby is always maintained approximately horizontally. In the embodiment, the cushion pan 18 is set to be approximately horizontal and a seat face of the cushioning member for a seat cushion 20 covering the cushion pan 18 also becomes approximately horizontal at a non-load time (see FIG. 8 and FIG. 9). When a seat is disposed in a narrow place where a distance is short between a front seat and a rear seat like an airplane, a degree of restriction of a posture of a person when he/she sits on the seat becomes high in a seat structure with a large seat angle, so that it becomes hard for the person to conduct his/her posture change or body movements and incoming and outgoing easiness (entrance and exit easiness from left and right of the seat) is also damaged. Therefore, for securing a space where a person can move freely as much as possible, the seat face is made approximately horizontal. A seat angle corresponding to an approximately horizontal range of a preferable cushion pan 18 is in a range from 0° to 10°, and a seat angle corresponding to an approximately horizontal range of the seat face of the cushioning member for a seat cushion 20 is also in a range from 0° to 10°. Incidentally, regarding the seat for an automobile or the like, of course, it is possible to perform setting of a seat angle in a range from 10° to 20° in a seat for an ordinary sedan type automobile or the like or perform setting of a seat angle in a range from 20° to 30° in a seat for a sport type automobile, for example, according to the purpose by adopting such means as making the thickness of the front edge portion thick as the cushioning member for a seat cushion, as shown in a second embodiment described later.

Figure 16:
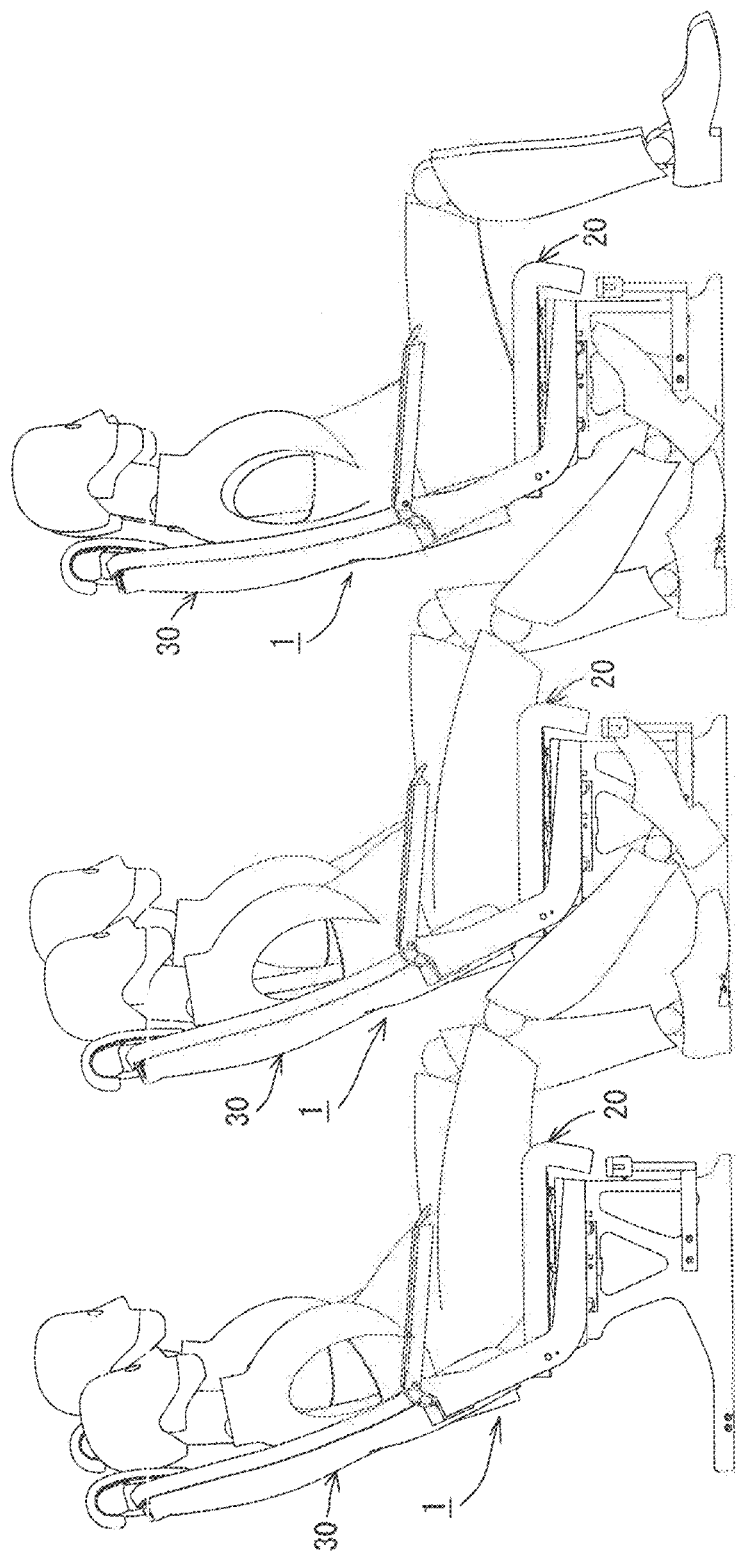
FIG. 16 is a view showing a case that a person has taken his/her upright posture, a case that he/she has taken a posture of stretching out his/her leg with his/her hip region pressed backward while reclining the seat back section, and a case that he/she has taken a posture of stretching out his/her leg with his/her hip region moved forward while reclining the seat back section, which are arranged in this order from the right in FIG. 16.
Figure 17:
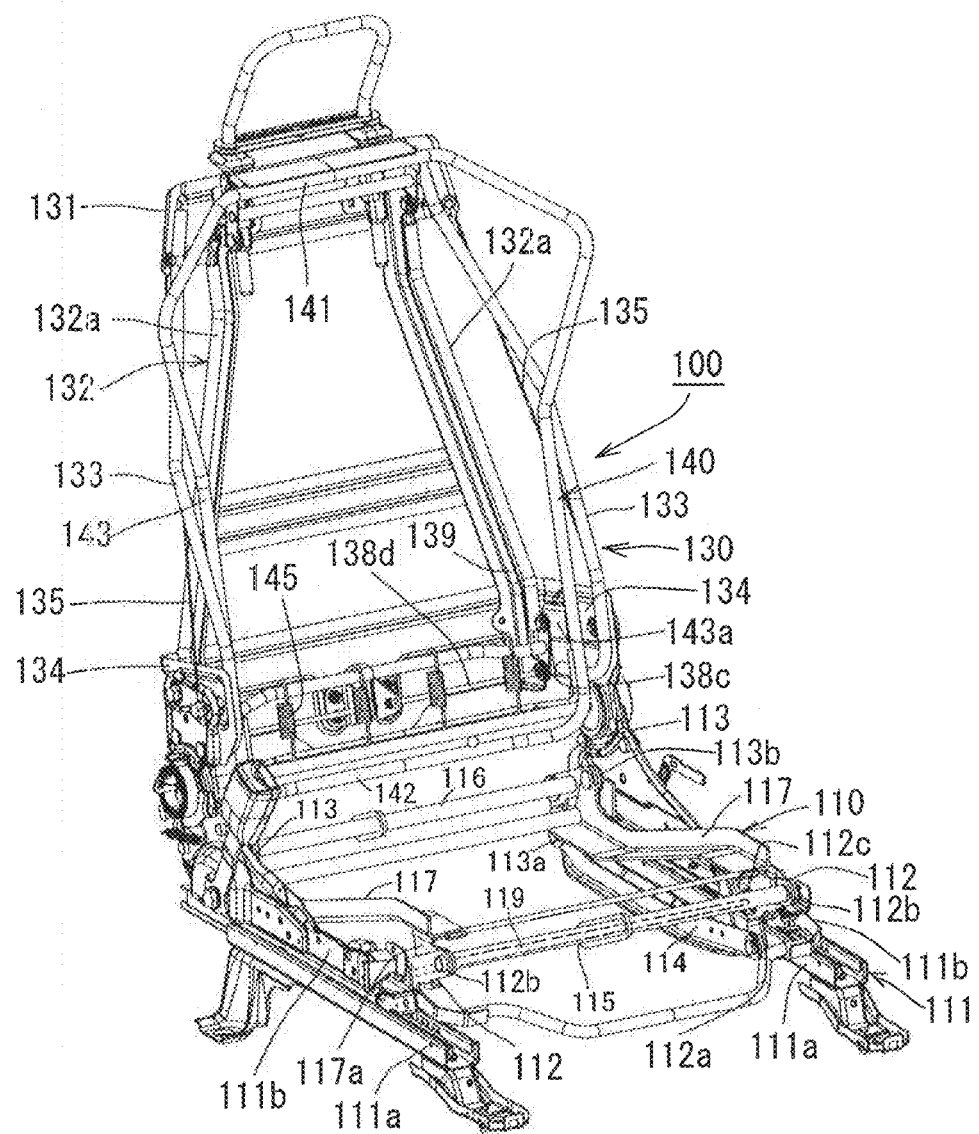
FIG. 17 is a perspective view for explaining a seat structure according to a second embodiment of the present invention.

Here, the cushion pan 18 and the cushioning member for a seat cushion 20 are preliminarily integrated with each other in this embodiment, so that the cushioning member for a seat cushion 20 can also be disposed by only causing the front portion supporting frame 15 and the rear portion supporting frame 16 to support the cushion pan 18. As shown in FIG. 16, a front portion engagement portion 18d engaged with the front portion supporting frame 15 and a rear portion engagement portion 18e engaged with the rear portion supporting frame 16 are provided on a lower face of the cushion pan 18. As shown in FIG. 16, the front portion engagement portion 18d comprises a pair of plate springs 18d1, 18d2 which are disposed on the cushion pan 18 so as to be spaced from each other in front and rear directions and which both project downwardly, and the front portion supporting frame 15 is clamped between the plate springs 18d1, 18d2 in an engaging manner. The rear portion engagement portion 18e is formed from a plate spring provided with a bent portion 18e2 obtained by bending a portion extending from a base plate portion 18e1 joined to a lower face of the cushion pan 18 downward and further bending the portion backward, and the upper frame 16a is clamped between the bent portion 18e2 and the lower face of the cushion pan 18 by inserting the bent portion 18e2 below the upper frame 16a of the rear portion supporting frame 16. Accordingly, for arranging the cushion pan 18 and the cushioning member for a seat cushion 20 which have been preliminarily integrated with each other, the rear portion engagement portion 18e is first inserted such that the bent portion 18e2 is positioned below the upper frame 16a of the rear portion supporting frame 16 while the cushion pan 18 and the cushioning member for a seat cushion 20 are inclined such that a front edge portion thereof is positioned obliquely upward and a pair of plate springs 18d1, 18d2 of the front portion engagement portion 18d is then forced to clamp the front portion supporting frame 15 by lowering the front edge portion. Thereby, the cushion pan 18 and the cushioning member for a seat cushion 20 can be disposed easily.

As shown in FIG. 4 and FIG. 5, the cushion pan 18 is made from flexible material instead of an iron plate. In the embodiment, a single-piece member obtained by laminating or embedding one or plural tetra-axial woven fabrics to synthetic resin material is used as the cushion pan 18. When an iron plate is used, a person feels hard because the rigidity of the iron plate is largely different from rigidity of the person. When the thickness of the cushioning member is thin, conduction of heat from the iron plate becomes easy. That is, the iron plate becomes warm in the summer season while a person easily feels coldness of the iron plate in the winter season. Therefore, it is preferable that synthetic resin material is used, but it is possible to use a flexible iron plate by performing treatment such as adjusting the thickness of the cushioning member. Thermoplastic resin, thermosetting resin, or the like can be used as the synthetic resin material, and bi-axial woven fabric or non-woven fabric can be used instead of the tetra-axial woven fabric. That is, these materials can be selected according to a required stiff feeling. Stiffness is made higher than one formed using only synthetic resin material by integrating the tetra-axial woven fabric, the bi-axial woven fabric, or the like to synthetic resin material, so that adjustment is performed so as to obtain a required flexibility. The cushion pan 18 is preferably provided with a spring characteristic of 10 to 90 N/mm regarding load-displacement characteristic obtained by causing supporting portions of a measurement stand separated to each other by a distance of 200 mm to support a test piece (400 mm×300 mm) in a state that a portion of the test piece positioned between the supporting portions has been separated from a measurement face and pressurizing a central portion of the test piece positioned between the supporting portions at a rate of 10 mm/min up to 200N using a circular pressurizing plate with a diameter of 30 mm to flex the same. Incidentally, the kind of the synthetic resin material or the thickness of the cushion pan 18 can be selected and adjusted properly in a range achieving such a load-displacement characteristic.

Further, rigid bodies 18a made of an iron plate with a predetermined width are fixed on a back face of the cushion pan 18 such that they surround a periphery of an ischial tuberosity of a person in a frame-shaped manner at both side portions and front and rear portions positioned outside a site where the ischial tuberosity is positioned when he/she sits on the seat (see FIG. 4B and FIG. 5B). By providing the rigid bodies 18a, sites corresponding to the rigid bodies 18a are made to have high rigidity, while sites other than the sites with high rigidity become relatively low rigid. Therefore, even when the cushion pan 18 is approximately horizontal at a non-loaded time, it flexes at its inside portion surrounded by the rigid bodies 18a when a person sits on the seat or when a high gravity is inputted into the seat, so that the input energy is absorbed and diffused, input of a reaction force into the person is reduced, and a stable sitting posture is maintained. On the other hand, the portion surrounded by the rigid bodies 18a is forced to return back to an approximately horizontal state at a load-removing time, so that following-up to body movements or a posture change of the person becomes easy.

Further, it is preferable that the inside portion surrounded by the rigid bodies 18a includes a hole portion formed at a site corresponding to at least the ischial tuberosity. FIGS. 4A and 4B show a state that hole portions 18b, 18b are formed as a pair of right and left hole portions at a site including a position corresponding to the ischial tuberosity. The cushioning member for a seat cushion 20 is disposed on the cushion pan 18, but sites of the cushioning member for a seat cushion 20 corresponding to the hole portions 18b, 18b sink most easily at an applying time of a local load. Therefore, when the ischial tuberosity is positioned on the hole portions 18b, 18b, it is held to slightly sink in the sites, so that hip slippage of the person is prevented and his/her posture is stabilized. Further, slight change of his/her posture such as moving his/her hip region is also allowed in a state that the ischial tuberosity is positioned in the hole portions 18b, 18b. Thereby, he/she does not strain his/her back muscles or abdominal muscles extremely except for suppressing slippage of his/her pelvis with his/her heels, so that he/she can conduct smooth respiratory movements. It is preferable that plural sets of pairs of hole portions 18b, 18b are provided at predetermined intervals in front and rear directions of the cushion pan 18. In the embodiment, three sets are provided, thereby catering a case that a person sits on the seat in a tense state while pressing his/her waist on the seat cushion section 3 to straighten his/her back, a case that he/she sits on the seat while stretching his/her legs in a relaxed state, a case that he/she sits on the seat while separating his/her waist from the seat cushion section 30 in a further relaxed state, or the like. When two hole portions 18b, 18b are formed in a paired manner, it is preferable that the diameter of each hole portion 18b is in a range from 60 to 120 mm.

Further, as shown in FIGS. 5A and 5B, such a configuration can be adopted that one hole portion 18c is formed in the portion of the cushion pan 18 surrounded by the rigid bodies 18a. Thereby, even if his/her posture change occurs, the position of the ischial tuberosity can always fall within the position corresponding to the hole portion 18c. When such an aspect is adopted that a relatively large hole portion 18c is formed in this manner, a feeling of being on a hammock occurs easily owing to that the cushioning member for a seat cushion drops within the hole portion 18c when a person sits on the cushioning member for a seat cushion 20. Therefore, when the cushioning member for a seat cushion 20 is bonded to the site of the cushion pan 18 corresponding to the rigidity bodies 18a provided around the hole portion 18c or it is fixed thereto via rod-shaped members, the feeling of being on a hammock becomes small, which is desirable. When one relatively large hole portion 18c is formed, it is preferable that the relatively large hole portion 18c has an approximately rectangular shape where a length x of the hole portion 18c in front and rear directions of the cushion pan 18 is in a range from 60 to 350 mm and a length y thereof in left and right directions is in a range from 160 to 350 mm. It is more preferable that the relatively large hole portion 18c has a shape in a range from an approximately rectangular shape where the length x in the front and rear directions is 60 mm and the length y in the left and right directions is 160 mm to an approximately rectangular shape where the length x in the front and rear directions is 240 mm and the length y in the left and right directions is 240 mm.

As shown in FIGS. 6A and 6B, one having a base cushion 21 and an upper cushion 22 and including a urethane member 23 as an intermediate cushioning member sandwiched between both the cushions is used as the cushioning member for a seat cushion 20. Both the base cushion 21 and the upper cushion 22 are made from three-dimensional solid knitted fabric in this embodiment. Two-dimensional woven fabric, non-woven fabric, canvas, or the like (these are collectively called "two-dimensional tension structure member" if necessary) can be used for at least one of the base cushion 21 and the upper cushion 22. However, when the two-dimensional woven fabric, the non-woven fabric, the canvas, or the like is used for the base cushion 21, it is preferable that the base cushion 21 is partially bonded to the cushion pan 18 positioned below the base cushion 21 by adhesion or the like because a face stiffness of the base cushion 21 is insufficient. Thereby, tension is imparted to the two-dimensional tension structure member, which results in increase of stiffness. The urethane member 23 is divided into two portions of a front pad 23a and a rear pad 23b, and a boundary between the front pad 23a and the rear pad 23b is provided with cut faces 23c, 23d obtained by cutting the urethane member 23 in a thickness direction thereof from an upper face toward a lower face gradually backward. In the cushioning member for a seat cushion 20, when the cushion pan 18 with a plurality of hole portions 18b shown in FIGS. 4A and 4B is used, the base cushion 21 is bonded and fixed to peripheries of the plurality of hole portions 18b (a shaded portion in FIG. 6A). Incidentally, when the cushion pan 18 with the hole portion 18c shown in FIGS. 5A and 5B is used, the base cushion 21 is bonded and fixed to a periphery of the hole portion 18c (a shaded portion in FIG. 7). Incidentally, any fixing method can be adopted, where blind rivets can be used, or engagement can be performed utilizing resin-made hook members attached to the base cushion 21. The front pad 23a and the rear pad 23b are not attached to the base cushion 21 or the upper cushion 22 and they are disposed in a sandwiching manner between both the cushions 21, 22. Thereby, when a base net 21 is forced to enter the hole portion 18b or the hole portion 18c according to load application, force acts on the rear pad 23b in a direction in which the cut face 23d is position-shifted from the cut face 23c of the front pad 23a downward, therefore, the rear pad 23b easily sinks in the hole portion 18b or the hole portion 18c, so that it is easy to stabilize the position of the ischial tuberosity when the person sits on the seat. Further, the surface of the upper cushion 22 is covered with a surface member such as a three-dimensional solid knitted fabric or a leather.

Incidentally, the intermediate cushioning member is not limited to the urethane member but other cushioning members such as a fiber cushion can be used. As described above, when the division into the front pad 23a and the rear pad 23b is performed, both the pads may be different in physicality. For example, such a configuration can be adopted that a soft member with a low density is used as the front pad 23a applied with a small load while a hard member with a high density is used as the rear pad 23b applied with a large load. Further, members with high hardness and low density can be provided on both side portions of the intermediate cushioning member for side support. As the intermediate cushioning member, a one-piece member may be used according to application of the seat structure, for example, in an office chair or the like instead of a member comprising a plurality of divided pieces as described above. Further, regarding the thickness of the intermediate cushioning member, it is preferable that thin member with a thickness of 35 mm or thinner is used as the intermediate cushioning member because a required stiffness can be ensured by using a three-dimensional solid knitted fabric as the base cushion 21 or the upper cushion 22 or using a two-dimensional tension structure member joined to the cushion pan 18 as described above.

Projecting frames 11f, 11f projecting upwardly, respectively, are provided on rear portions of the side portion frames 11a, 11a of the abovementioned platform frame 11. The seat back section 30 is supported by the projecting frames 11f, 11f.

The seat back section 30 is provided with a resin cover 31 formed in an approximately rectangular shape as viewed from the front, and a portion of a metal-made base frame 32 formed in an approximately square shape and provided with an upper edge portion 32a, a lower edge portion 32b, and respective left and right side edge portions 32c, 32c is fixed and integrated to an inner face of the resin cover 31. The resin cover 31 is formed like the abovementioned cushion pan 18 by integrating at least one sheet of at least one of a tetra-axial woven fabric, bi-axial woven fabric, and non-woven fabric to thermosetting resin. By integrating the tetra-axial woven fabric, the bi-axial woven fabric, or the like to the thermosetting resin, the stiffness of the resin cover 31 is increased. A mounting frame 33 which clamps the resin cover 31 and the base frame 32 is provided along a widthwise direction of the seat back section 30 at a site positioned near lower ends of the resin cover 31 and the base frame 32 and corresponding to a lumbar of a person when he/she sits on the seat, and mounting of the mounting frame 33 is performed by coupling both end portions 33a, 33a of the mounting frame 33 bent forward to upper portions of the projecting frames 11f, 11f.

Figure 11:
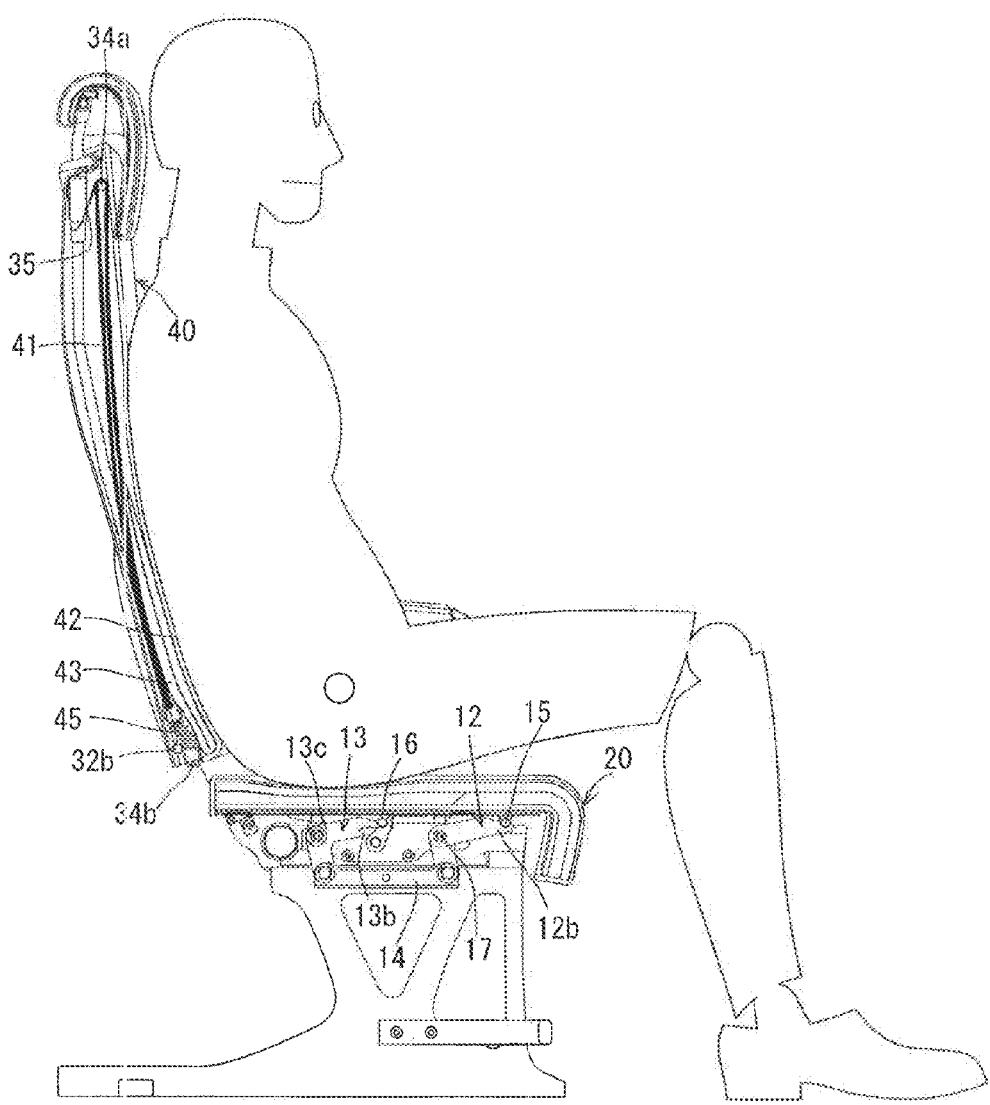
FIG. 11 is a sectional view of the seat structure shown in FIG. 10 taken along a dashed-dotted line in FIG. 10.
Figure 12:
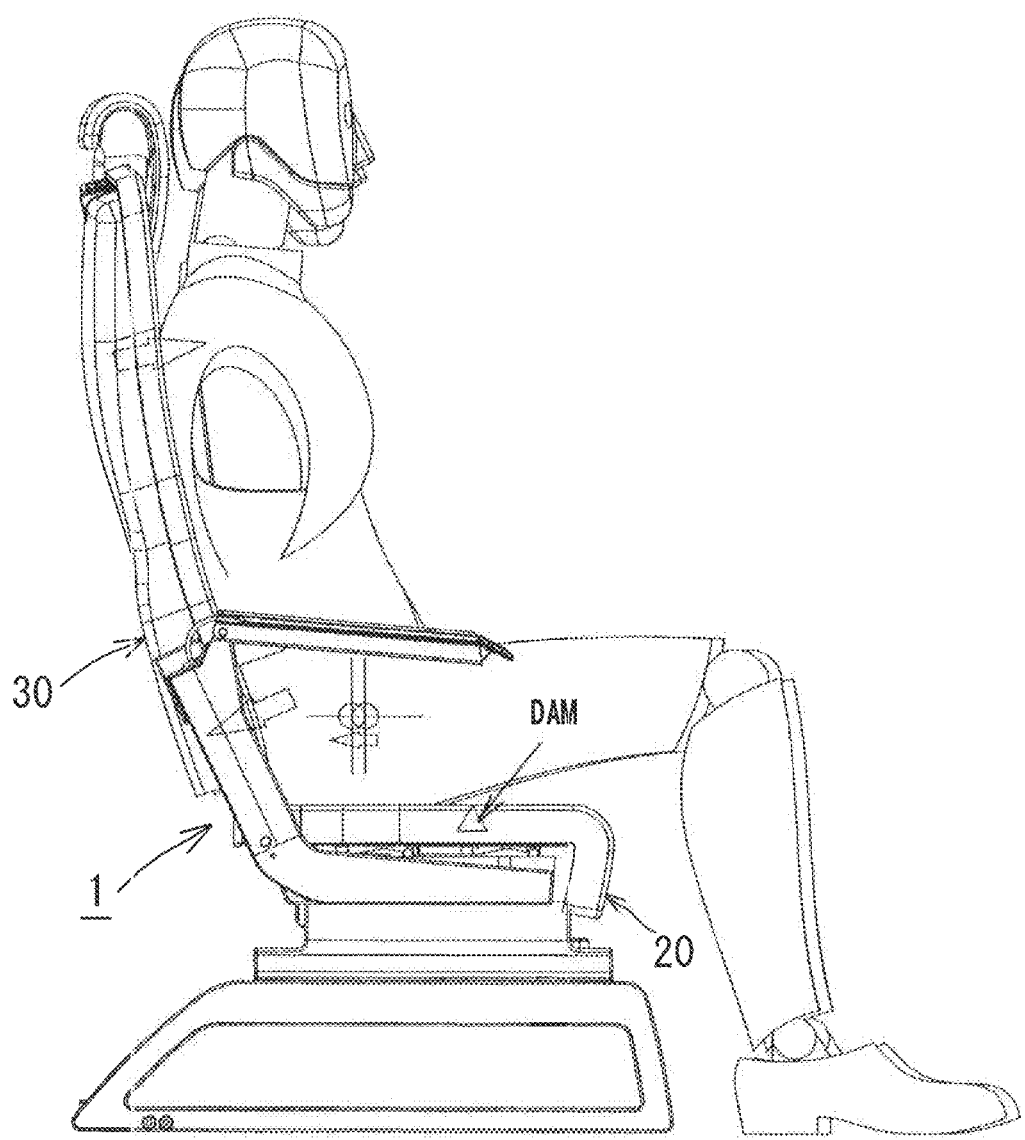
FIG. 12 is a view showing a state that a person sits on a seat in an upright posture with his/her lumbar (pelvis) in contact with the vicinity of a lower portion of a seat back section in the seat structure according to the first embodiment.

Further, the vicinities of a lumbar correspondence sites 34d, 34d of a metal-made cushioning member arrangement frame for a seat back 34 provided with an upper edge portion 34a, a lower edge portion 34b, and left and right side edge portions 34c, 34c and formed in an approximately square shape are fixed to both the end portions 33a, 33a of the mounting frame 33. The respective side edge portions 34c, 34c positioned above the vicinities of the lumbar correspondence sites 34d, 34d are formed in shapes protruding toward the upper edge portion 34a forward. Thereby, when a portion of the seat back section 30 positioned above the lumbar correspondence portions 34d, 34d is pressed, the portion is displaced backward centering the lumbar correspondence portions 34d, 34d which are high rigid portions, while a lower portion of the seat back section 30 positioned below the lumbar correspondence portions 34d, 34d is displaced to protrude out forward, and when the lower portion of the seat back section 30 positioned below the lumbar correspondence portions 34d, 34d is pressed backward, the upper portion of the seat back section 30 positioned above the lumbar correspondence portions 34d, 34d is moved out forward. In the embodiment, thus, the cushioning member arrangement frame for a seat back 34 is partially provided with the high rigid portions, a vertically elastically deformable site is configured via the high rigid portions, and the cushioning member arrangement frame for a seat back 34 itself also serves as an elastic supporting mechanism for a seat back. Incidentally, the high rigid portion can be formed by performing such a treatment as thermally treating at least a portion of the cushioning member arrangement frame for a seat back 34. A plate spring 35 functioning as a member biasing the upper edge portion 34a of the cushioning member arrangement frame for a seat back 34 in a direction away from the upper edge portion 32a of the base frame 32 to configure the elastic supporting mechanism for a seat back is disposed between the upper edge portion 34a of the cushioning member arrangement frame for a seat back 34 and the upper edge portion 32a of the base frame 32, as shown in FIG. 9 and FIG. 11. In the embodiment, the plate spring 35 is used, but another spring member can be used if it can bias the upper edge portion 34a of the cushioning member arrangement frame for a seat back 34 in the above manner.

The cushioning member for a seat back 40 has a base cushion 41 and a surface layer cushion 42. The base cushion 41 comprises, for example, three-dimensional solid knitted fabric, and an upper portion thereof is engaged with the upper edge portion 34a of the cushioning member arrangement frame for a seat back 34. A lower portion of the base cushion 41 is engaged with an upper end of a coil spring 45 whose lower end is engaged with the lower edge portion 34b of the cushioning member arrangement frame for a seat back 34, as shown in FIG. 9 and FIG. 11. Therefore, the shape of the base cushion 41 is governed by an arrangement shape of the frame. Since the coil spring 45 is arranged, when the coil spring 45 is pressed from the side of the seat face, the coil spring 45 is displaced such that an upper end thereof is rotated about a lower end thereof backward. When load pressing is further applied from the side of the seat face to the coil spring 45, the lower portion of the cushioning member arrangement frame for a seat back 34 positioned below the lumbar correspondence sites 34d, 34d is pressed, so that the upper portion of the cushioning member arrangement frame for a seat back 34 positioned above the lumbar correspondence sites 34d, 34d is displaced in a direction in which it protrudes out forward. By arranging the coil spring 45, the coil spring 45 is rotated about the lower end thereof even when small force is applied to the coil spring 45. Further, stretching expansion and contraction action of the coil spring 45 acts on force in a direction in which the back of a person moves vertically. Accordingly, the cushioning member for a seat back 40 sensitively reacts with forward and backward movements of the pelvis of a person and vertical movement of an upper body (the back) thereof to follow up them.

The surface layer cushion 42 is formed of, for example, three-dimensional solid knitted fabric or a leather, and it is stretched with a tension of 5% or less so as to cover the whole surface of the base cushion 41, and all the upper edge portion 34a, the lower edge portion 34b, and sides edge portions 34c, 34c of the cushioning member arrangement frame for a seat back 34.

An auxiliary cushion for a seat back 43 whose upper end edge is connected to an approximately central portion of the base cushion 41 in a vertical direction thereof and whose lower end edge covers a front side of the coil spring 45 is provided between the surface layer cushioning member 42 and the base cushion 41 on a back face side of the surface layer cushioning member 42, as shown in FIG. 9 and FIG. 11. The auxiliary cushion for a seat back 43 is formed such that a lower end side thereof is thicker than an upper end side thereof, where, when force pressing the vicinity of the upper end edge of the auxiliary cushion for a seat back 43 backward is applied to the cushioning member for a seat back 40 according to posture change of a person, a lower end edge side of the auxiliary cushion for a seat back 43 is protruded out forward. When a person takes his/her posture such as pressing the vicinity of the upper end edge of the auxiliary cushion for a seat back 43 backward, his/her hip region (pelvis) moves forward, so that a clearance occurs between the hip region and the surface layer cushioning member 42, but the clearance occurring therebetween is made small by providing the auxiliary cushion for a seat back 43, so that a follow-up performance to movement of the hip region (pelvis) is further enhanced. Foreign matter feeling from the coil spring 45 is also reduced.

As a result, the surface layer cushion 42 provided with a low tension follows vertical movement of the diaphragm of a person according to his/her breathing or fitting feeling sensed by him/her vertically owing to a spring function of the surface layer cushion 42 to becomes dominant over the same. On the other hand, the spring functions of the base cushion 41, the coil spring 45, and the cushioning member arrangement frame for a seat back 34 function to follow movement of his/her abdominal muscles or back muscles according to breathing, body motion or the like, movement of larger bones themselves. When further large impact force is applied to the cushioning member for a seat back 40, the impact force is forced to be absorbed by a spring function of members comprising a combination of the resin cover 31 and the base frame 32.

Accordingly, such a configuration is adopted that the surface (the seat face) of the surface layer cushion 42 of the seat back section 30 moves while following various movements of a human body due to breath, vibrations, body motion, impact force or the like, so that a relative change to the back of a person can be made as small as possible.

Regarding this point, the abovementioned seat cushion section 10 is similar to the seat back section 30, and it follows a relative displacement to the surface (the seat face) of the cushioning member for a seat cushion 20 due to breath or the like according to a spring function of the cushioning member for a seat cushion 20, follows movement of further larger bones according to a spring mechanism of the torsion bar 17 supported by the front link portions 12, 12, and functions to absorb further large impact force by the cushion pan 18.

These functions of the seat cushion section 10 and the seat back section 30 do not function independently from each other but both of them are associated with various movements of a human body. Accordingly, in the seat structure 1 of the embodiment, even if the ischial tuberosity coming in contact with the surface (the seat face) of the cushioning member for a seat cushion 20 of the seat cushion section 10, the back region of the pelvis coming in contact with the surface (the seat face) of the cushioning member for a seat back 40 of the seat back section 30, and the back region (the breast bone, especially, a peripheral region of the blade bone) move according to breath, body movements, posture change, or the like, the respective seat faces act in directions coming in contact with these members, so that a relative displacement to a human body according to breath or the like can be made small.

Figure 10:
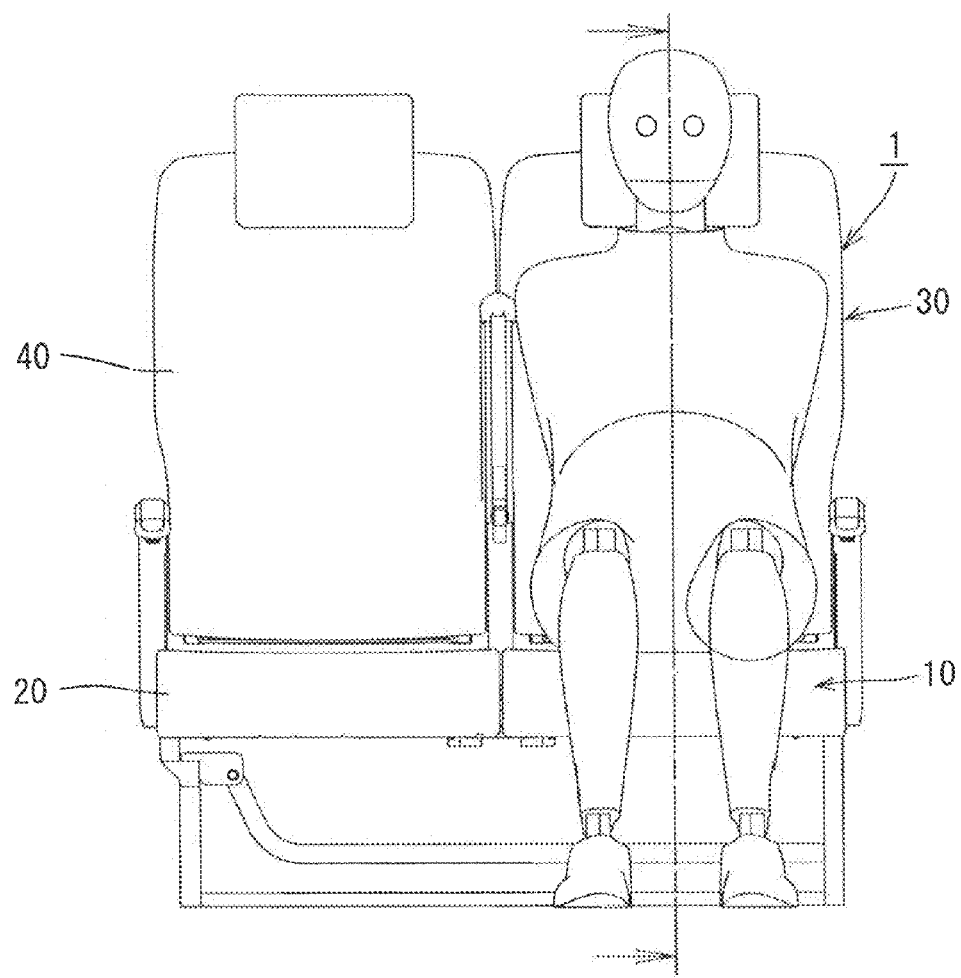
FIG. 10 is a front view of the seat structure according to the first embodiment at a sitting time of a person.

When a person sits on the seat from the state at a non-loaded time shown in FIG. 8 and FIG. 9, the seat becomes the state shown in FIG. 10 and FIG. 11. That is, in the seat cushion section 10, a portion of the cushioning member for a seat cushion 20 positioned in the vicinity of the ischial tuberosity of the person sinks, so that the coupling portions of the front link portion 12 and the rear link portion 13 to the cushion pan 18 move obliquely forward and downward. Further, since the vicinity of the lower portion of the seat back section 30 is pressed backward, the coil spring 45 is displaced via the surface layer cushion 42 and the auxiliary cushion 43 so as to be rotated about the lower end of the coil spring 45 backward, so that a site of the cushioning member arrangement frame for a seat back 34 positioned above the high rigid portion 34d is relatively protruded out forward to fit the vicinity of the breast bone or the blade bone of the person. In the upright posture shown in FIG. 10 to FIG. 12, since the vicinity of the ischial tuberosity sinks in the hole portions 18b or the hole portion 18c of the abovementioned cushion pan 18, a portion of the seat cushion section 10 positioned slight in front of the hip region of the person serves as a darn for preventing forward slippage of the hip region. Therefore, the person does not strain his/her back muscles or abdominal muscles extremely for preventing his/her hip slippage so that he/she can conduct smooth respiratory movements. In addition, when the front link portion 12 and the rear link portion 13 is applied with load, they move obliquely forward and downward, while being displaced obliquely backward and upward at a load-removing time. Further, the surface layer cushion 42 stretched with a low tension and the base cushion 41 supported by the coil spring 45 can be displaced vertically. Since approximately vertical body movement occurs due to breath of a person along his/her back in his/her sitting state, the structure of this embodiment follows the body movement due to such breath well, so that low-impact breath of the person can be realized. Further, since the seat back can secure support of the breast region, especially, the periphery of a region slightly below the blade bone in addition to support of the upper edge of hi/her pelvis and the periphery of his/her sacral bone, a fulcrum for posture change is created, so that posture change or body movement of a person becomes easy in his/her sitting state while preventing hip slippage at a sitting time. Further, since the seat face of the cushioning member for a seat cushion 20 is flat, a clearance occurs between his/her knee back region and the seat cushion 20 when he/she takes an upright posture, so that constriction of blood flow due to long-term sitting hardly occurs. That is, according to the embodiment, a person can stretch and shrink back his/her upper body through stretching, but the seat structure 1 of the embodiment has a mechanism for following the movement of the person to move a contact face with the person upward and backward on the seat side and move the same forward and downward. In other words, a structure where movement of each frame (the front portion supporting frame 15, the rear portion supporting frame 16, the cushioning member arrangement frame for a seat back 34) in a direction spreading a space for a seat in a seat back and a seat cushion corresponds to stretching and shrinking of an upper body of a person is provided.

Figure 13:
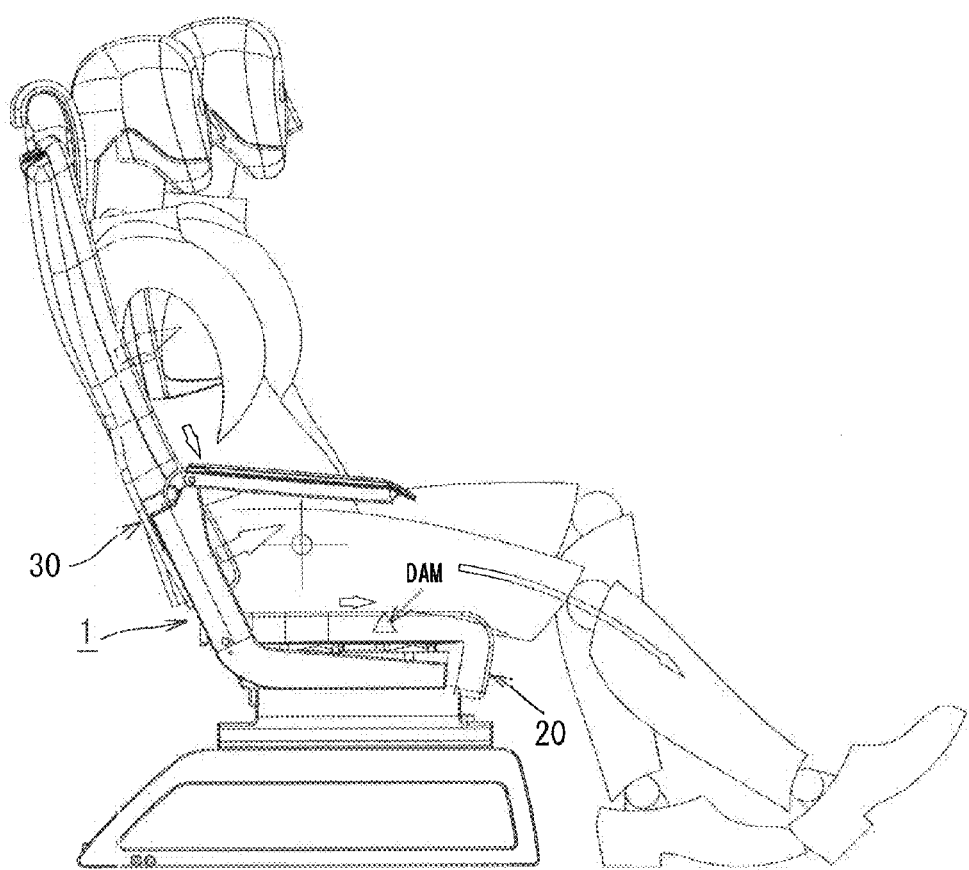
FIG. 13 is a view showing a state that a person sits on the seat with his/her leg stretched out forward while he/she keeps pressing his/her lumbar (pelvis) on the vicinity of the lower portion of the seat back section in a state that the seat back section has been reclined slightly rearward in the seat structure according to the first embodiment.

FIG. 13 shows a posture of a person in a leg-stretching state where he/she sits on the seat with his/her leg stretched out forward while he/she keeps pressing his/her lumbar (pelvis) on the vicinity of the lower portion of the seat back section 30 in a state that the seat back section 30 has been reclined slightly backward. In this posture, slippage force causing his/her hip region to slip forward also occurs, but since the dam is produced slightly in front of the ischial tuberosity region, the forward slippage of the hip region is suppressed. Further, slippage force where the seat back is forced to move downward also occurs, but the slippage force is reduced by vertical movement of the base cushion 41 having the degree of freedom in a vertical direction. The vicinity of the upper portion of the cushioning member arrangement frame for a seat back 34 is pressed backward, so that the vicinity of the lower portion such as the vicinity of the lower portion of the cushioning member arrangement frame for a seat back 34 or the vicinity of the lower portion of auxiliary cushion for a seat back 43 protrudes out forward, which results in rise of supporting pressure for supporting the back region of the pelvis. Further, force for pressing the vicinity of the upper portion of the cushioning member arrangement frame for a seat back 34 backward is not strong so much in a state that the back region of the pelvis has been pressed on the vicinity of the lower portion of the seat back section 30, so that the vicinity of breast bone or the vicinity of the blade bone is supported by the restoring force of the site. As a result, both of the seat cushion section 10 and the seat back section 30 are supported such that the seat face fits the body of the person, so that the person conducts smooth respiratory movements without using his/her extra muscles even in this posture.

Figure 14:
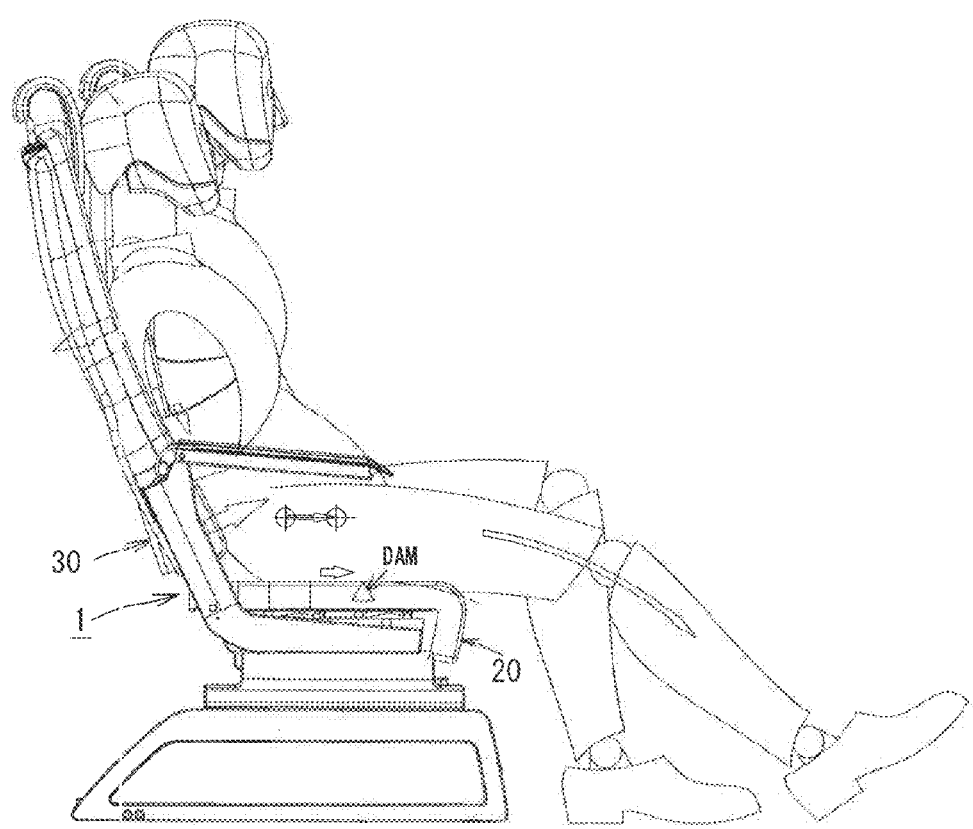
FIG. 14 is a view showing a state that a person sits on the seat with his/her leg stretched out forward while moving his/her ischial tuberosity forward in a state that the seat back section has been reclined slightly rearward in the seat structure according to the first embodiment.

FIG. 14 shows a state that a person sits on the seat with a leg-stretching posture where his/her leg has been stretched out forward while moving his/her ischial tuberosity forward in a state that the seat back section 30 has been reclined slightly rearward. In this case, in a structure where a plurality of sets of hole portions 18b are provided in the cushion pan 18, his/her ischial tuberosity drops in the hole portions 18b formed further forward to be supported. Therefore, in such a posture, a dam for preventing forward slippage of his/her hip region is formed ahead of the position shown in FIG. 12. The slippage force is reduced by the base cushion 41 moving vertically. On the other hand, force pressing the vicinity of the upper portion of the cushioning member arrangement frame for a seat back 34 backward becomes stronger and the lower portion of the cushioning member arrangement frame for a seat back 34, the lower portion of the auxiliary cushion for a seat back 43, and the like protrude out forward to support the back region of the pelvis. According to the embodiment, even if a person takes such a posture, his/her ischial tuberosity is securely supported and the back region of the pelvis is supported, and the vicinity from his/her breast bone to his/her blade bone is supported by the face, so that he/she can breathe comfortably even in this posture without using extra muscles such as preventing the breathing.

Here, FIGS. 15A and 15B are diagrams for explaining, in detail, a function of the cushion pan 18 in a leg-stretching posture where his/her leg has been stretched out forward in a state that the seat back section 30 has been reclined slightly backward. As shown in FIG. 16, when a posture of a person transits from a state of an ordinary sitting time where his/she does not take his/her leg-stretching posture (FIG. 15B) to a state of his/her leg-stretching posture (FIG. 15A), load for pressing the front edge portion of the cushioning member for a seat cushion 20 downward is applied by the vicinity of the back region of his/her knee, so that load of his/her hip region becomes relatively small. Since the front portion engagement portion 18d of the cushion pan 18 is engaged with the front portion supporting frame 15, the cushion pan 18 is rotated about the front portion supporting frame 15 according to load change at this time such that a portion of the cushion pan 18 positioned on the side of his/her hip region is floated up slightly upward, and since the bent portion 18e2 of the rear portion engagement portion 18e abuts on the upper frame 16a of the rear portion supporting frame 16, it is deformed to expand obliquely downward, as shown in FIG. 15A. Since the cushion pan 18 is supported to the front portion supporting frame 15 and the rear portion supporting frame 16 by the front portion engagement portion 18d and the rear portion engagement portion 18e, it can be mounted considerably easily, as described above, and the cushion pan 18 and the cushioning member for a seat cushion 20 are displaced following change of load application aspect according to his/her leg-stretching action in his/her leg-stretching posture. According to the embodiment, as described above, when load change occurs, motion following the load change occurs according to the actions of the front link portions 12, 12 and the rear link portions 13, 13, but follow-up performance of the cushioning member for a seat cushion 20 to the leg-stretching posture is further increased by providing the cushion pan 18 in this manner so that a possibility that constriction of blood flow occurs is further reduced even in a long-time sitting state. Incidentally, when his/her posture returns from his/her leg-stretching posture to his/her posture at an ordinary sitting time, the cushion pan 18 is rotated about the front portion supporting frame 15 in a direction in which a portion of the cushion pan 18 positioned on the side of his/her hip region comes down to return back to the position shown in FIG. 15B.

Figure 15:
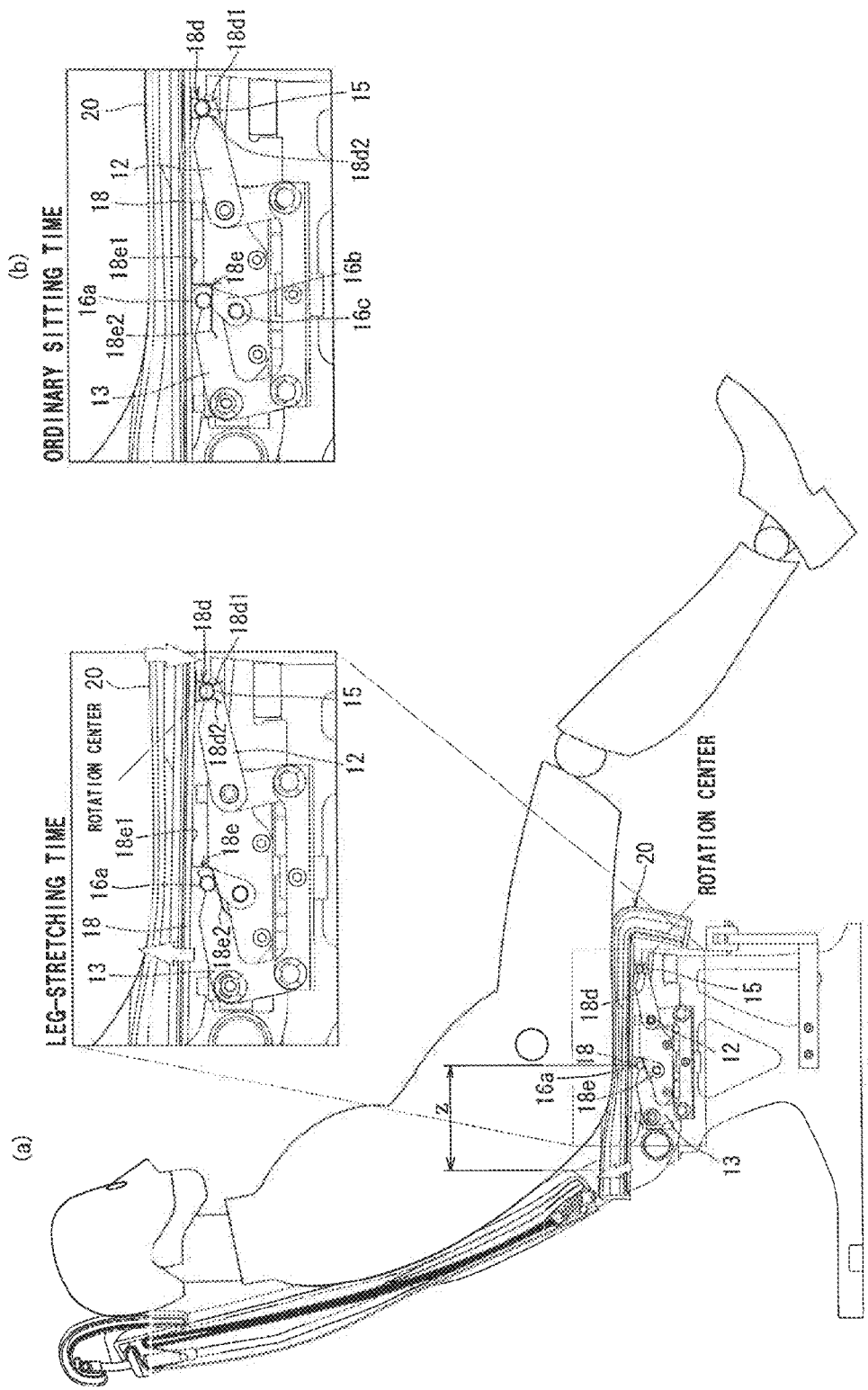
FIGS. 15A and 15B are views for explaining a supporting method of a cushion pan and a function thereof.

Further, it is preferable that the upper frame 16a of the rear portion supporting frame 16 engaged with the bent portion 18e2 of the rear portion engagement portion 18e is provided in a range from 80 to 200 mm forward beyond the boundary portion between the cushioning member for a seat back 40 and the cushioning member for a seat cushion 20 (a range shown by a reference symbol z in FIG. 15). When the range defined by the reference symbol z is pressed by a hand of a person in a state that a person does not sit on the seat, the front edge portion side of the cushion pan 18 and the cushioning member for a seat cushion 20 is floated up about the upper frame 16a of the rear portion supporting frame 16 engaged with the bent portion 18e2, so that the pair of plate springs 18d1, 18d2 configuring the front portion engagement portion 18d is released from the front portion supporting frame 15. That mounting of the cushioning member for a seat cushion 20 integrated with the cushion pan 18 can be performed easily, as described above, and a demounting work of the cushioning member for a seat cushion 20 is easy. However, it is necessary to adopt such a configuration that when a person sits on the seat in a state where he/she keeps pressing his/her hip region on the cushioning member for a seat back 40, the front portion engagement portion 18d is prevented from being disengaged from the front portion supporting frame 15 due to that his/her gravity center acts on the range defined by the reference symbol z. On the other hand, as described above, when he/she takes his/her leg-stretching posture, it is necessary to cause slight displacement in a direction in which a portion of the cushioning member for a seat cushion 20 positioned on the side of his/her hip region is floated up. It is preferable in order to achieve these functions in a balanced manner and secure easiness of mounting and demounting of the cushioning member for a seat cushion 20 that the range defined by the reference symbol z is set to the abovementioned size range. When the range defined by the reference symbol z is displaced so as to sink at a collision time, holding performance of his/her hip region is increased, but it is more preferable in order to cause the function to serve more securely that the range defined by the reference symbol z is in a range from 140 to 180 mm.

FIG. 16 shows a case that a person has taken his/her upright posture, a case that he/she has taken a posture of stretching out his/her leg with his/her hip region pressed backward while reclining the seat back section 30, and a case that he/she has taken a posture of stretching out his/her leg with his/her hip region moved forward while reclining the seat back section 30 in an arranging manner as viewed from the right in FIG. 16. A distance between respective seats coincides with a distance between seats used in an airplane currently, where a model person illustrated has an average physical frame of Japanese adult Japanese males. A reclining angle of a seat shown on the left in FIG. 16 corresponds to a designed reference position where the seat is not reclined backward. Reclined angles of the seat shown at the center and on the right side in FIG. 16 are an angle obtained by reclining the seat from the design reference position backward by an angle of 10°. From FIG. 16, even if a person takes the respective postures, he/she can sit on the seat with his/her leg accommodated in a space between his/her sitting seat and the front seat or his/her leg accommodated in a foot accommodating space positioned below the front seat, so that the seat structure of the embodiment is suitable for arrangement under the condition of a narrow space in front and rear directions in an airplane or the like. Incidentally, the cushioning member for a seat back 40 is supported by the cushioning member arrangement frame for a seat back 34, but such a configuration can be adopted like the cushioning member for a seat cushion 20 that a flexible cushion pan with a structure similar to the above is disposed for the cushioning member arrangement frame for a seat back 34, and the cushioning member for a seat back 40 is supported by the cushion pan.

FIG. 17 to FIG. 21 are diagrams showing a second embodiment of the present invention. A seat structure 100 according to the embodiment has a configuration that a seat angle is applied to a seat cushion section 110 and it is a seat structure suitable for an automobile, especially.

The seat structure 100 of the embodiment is also provided with a seat cushion section 110 and a seat back section 130. The seat cushion section 110 is provided with a platform frame 111. The platform frame 111 is provided with rail members 111a, 111a fixed on a vehicle body floor and side portion frames 111b, 111b provided so as to be slidable along the rail members 111a, 111a.

Front link portions 112, 112 formed in an approximately L shape are provided at portions of the side portion frames 111b, 111b positioned near front portions thereof such that bent portions 112c, 112c are pivoted to the side portion frames 111b, 111b facing smaller ones of angles formed by respective legs of the L shaped front link portions 112, 112 forward. Approximately L-shaped rear link portions 113, 113 are attached to portions of the side portion frames 111b, 111b positioned near rear portions thereof like the front link portions 112, 112. Respective end portions of a connection link portion 114 are connected between lower ends 112a, 113a of the front link portion 112 and the rear link portion 113 via shaft pins, respectively. Side supporting frames 117, 117 configuring a cushioning member arrangement frame for a seat cushion are spanned between upper ends 112b, 113b of the front link portion 112 and the rear link portion 113, respectively. Front end portions of the side supporting frames 117a, 117a are attached to the upper ends 112b, 112b of the front link portions 112 via mounting brackets 117a, 117a, while rear end portions thereof are pivoted to the upper ends 113b, 113b of the rear link portions 113, where the side supporting frames 117 are formed to have such a shape that they once extend downward in an approximately L shape as viewed from the positions of the upper ends 113b, 113b of the rear link portions 113 and from a side face, then extend forward, further extend obliquely upward and forward, and front end portions thereof reach the positions of the mounting brackets 117a, 117a, and because they have an obliquely upward and forward shape, when the cushioning member for a seat cushion 120 is disposed on the side supporting frames 117, an seat angle is imparted to the cushioning member for a seat cushion 120. A front portion supporting frame 115 is spanned between the vicinities of the upper ends 112b, 112b of the front link portions 112, 112, while a rear portion supporting frame 116 is spanned between the vicinities of the upper ends 113b, 113b of the rear link portions 113, 113, and the front link portion 112 and the rear link portion 113 configure a portion of a parallel linkage.

Further, a torsion bar 119 configuring an elastically supporting mechanism for a seat cushion which elastically supports a cushioning member arrangement frame (the front portion supporting frame 115 and the rear portion supporting frame 116) according to load fluctuation to the cushioning member for a seat cushion is disposed between bent portions serving as rotation centers of the front link portions 112, 112 like the first embodiment.

Figure 18:
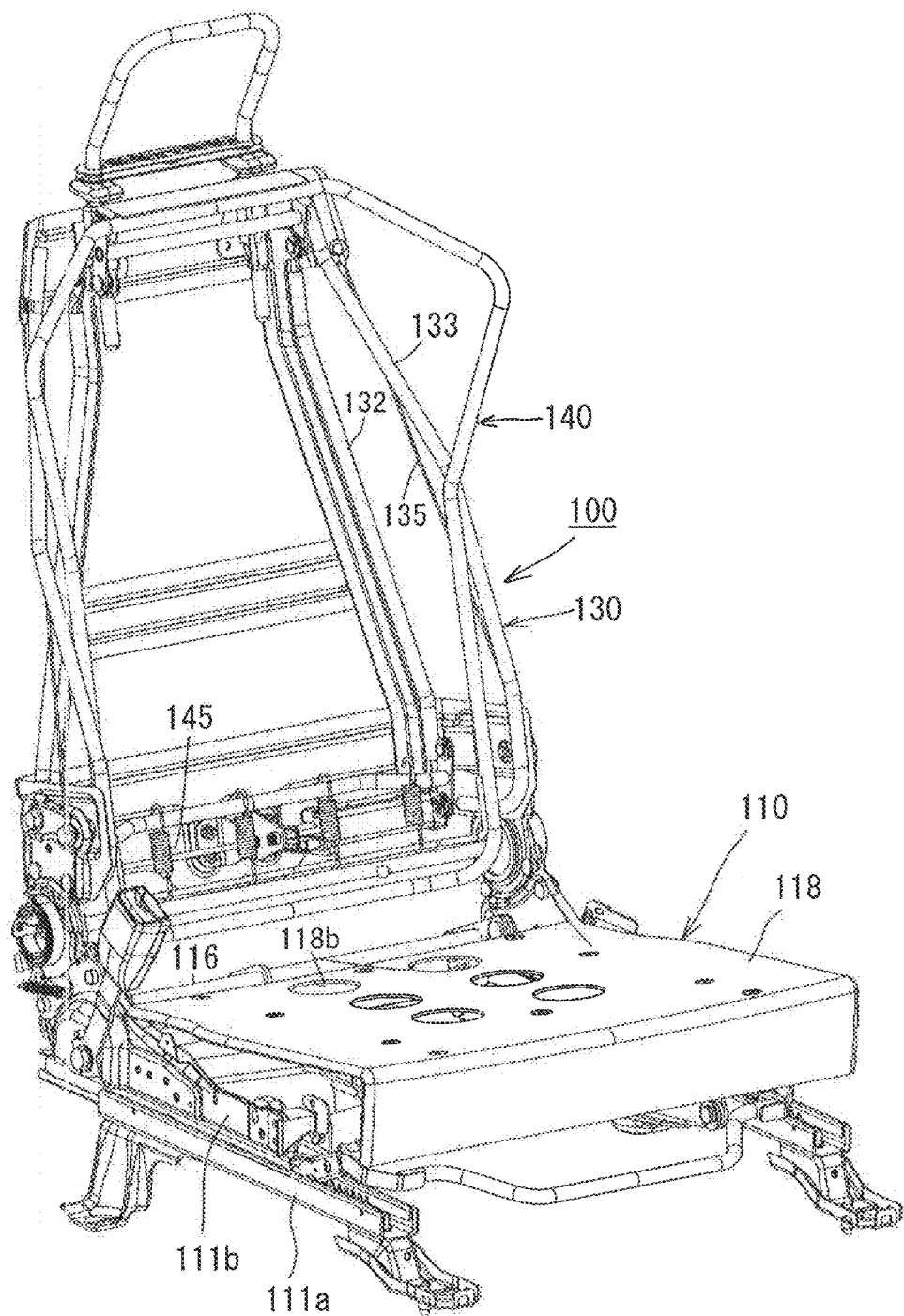
FIG. 18 is a perspective view showing a state that a cushion pan has been provided in the seat structure shown in FIG. 17.

It is preferable that a cushion pan 118 is provided on the front portion supporting frame 115 and the rear portion supporting frame 116 like the first embodiment (see FIG. 18). In FIG. 18, the cushion pan 118 provided with a plurality of hole portions 118b is shown, but a cushion pan formed with a large hole portion can be used like the first embodiment.

The cushion pan 118 is covered with a cushioning member for a seat cushion (not shown). As the cushioning member for a seat cushion, a three-dimensional solid knitted fabric, a urethane member or the like can be used, but one having a structure where a urethane member is sandwiched between three-dimensional solid knitted fabrics can be also used like the first embodiment. Of course, a fiber cushion, a two-dimensional woven fabric, a non-woven fabric, a canvas, or the like can be used instead of the three-dimensional solid knitted fabric or a fiber cushion or the like can be used instead of the urethane member which is an intermediate cushioning member like the abovementioned first embodiment. Incidentally, regarding a characteristic regarding a sitting comfort on the seat, a characteristic of a cushioning member to be used becomes dominating.

The seat back section 130 has a resin cover 131, and a base frame 132 is fixed to an inner face of the resin cover 131. This point is similar to the abovementioned first embodiment. On the other hand, in this embodiment, reinforcement frames for body side supporting 133, 133 formed in a forward-budging manner directed from an upper end downward are formed right and left in paired manner. Upper ends of the reinforcement frames 133, 133 are fixed to the vicinity of an upper portion of the resin cover 131, and lower ends thereof are respectively fixed to mounting brackets 134, 134 mounted at the vicinities of lower portions of side portion frames 132a, 132a of a base frame 132 in a forward-projecting direction. Further, reinforcement wires 135 reducing rearward inclinations of the base frame 132 and the side portion frames 133 are respectively provided obliquely between the vicinity of the upper portion of the resin cover 131 and the mounting brackets 134, 134 for security measures.

Mounting brackets 136 are provided in the vicinities of the upper portions of the respective side portion frames 132a, 132a of the base frame 132 (see FIG. 20), and bent portions 137c of approximately L-shaped upper link portions 137 are pivoted to the mounting brackets 136. Further, bent portions 138c of lower link portions 138 are pivoted to mounting brackets 134, 134 provided in the vicinities of lower portions of the respective side portion frames 132a, 132a of the base frame 132. Respective end portions of a connection link portion 139 is pivoted between one end 137a of the upper link portion 137 and one end 138a of the lower link portion 138, and the upper link portion 137 and the lower link portion 138 of the embodiment configures a portion of a parallel linkage.

A cushioning member arrangement frame for a seat back 140 is disposed between the other end 137b of the upper link portion 137 and the other end 138b of the lower link portion 138. Specifically, the cushioning member arrangement frame for a seat back 140 is provided with an upper edge portion 141, a lower edge portion 142, and side edge portions 143, 143, and the vicinities of both ends of the upper edge portion 141 are coupled to the other ends 137b, 137b of the upper link portions 137, 137. Further, the other ends 138b, 138b of the lower link portions 138, 138 are respectively coupled to mounting plates 143a, 143a provided so as to project in the vicinities of the lower ends of the respective side edge portions 143, 143.

Here, bent portions 138c, 138c serving as rotation centers of the lower link portions 138, 138 supporting the cushioning member arrangement frame for a seat back 140 are supported by a torsion bar 138d, where the torsion bar 138d is twisted to provide predetermined elasticity according to rotation of the lower link portions 138, 138. Accordingly, the torsion bar 138d configures an elastic supporting mechanism for a seat back in this embodiment.

Figure 19:
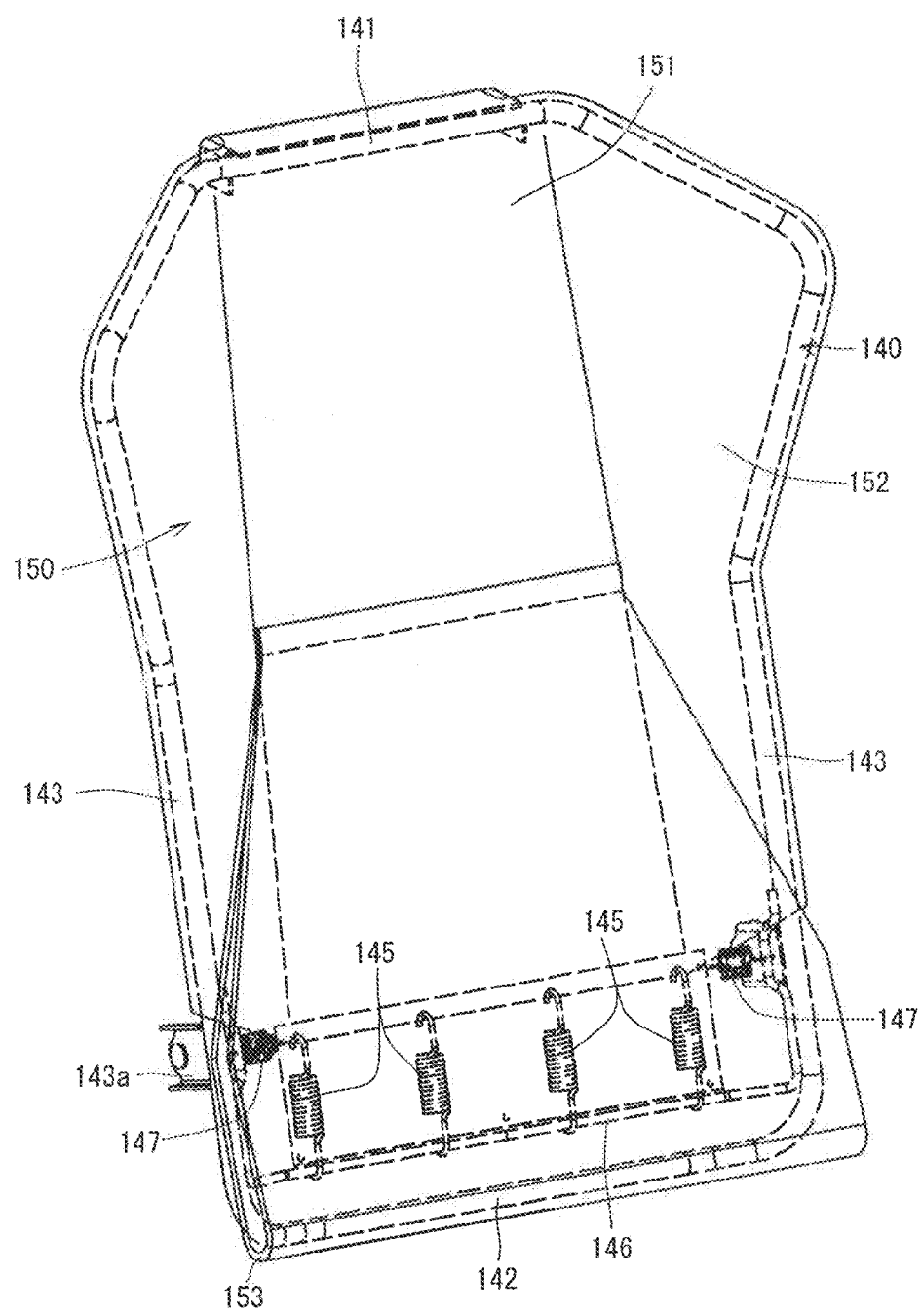
FIG. 19 is a view for explaining a configuration of a cushioning member for a seat back.
Figure 20:
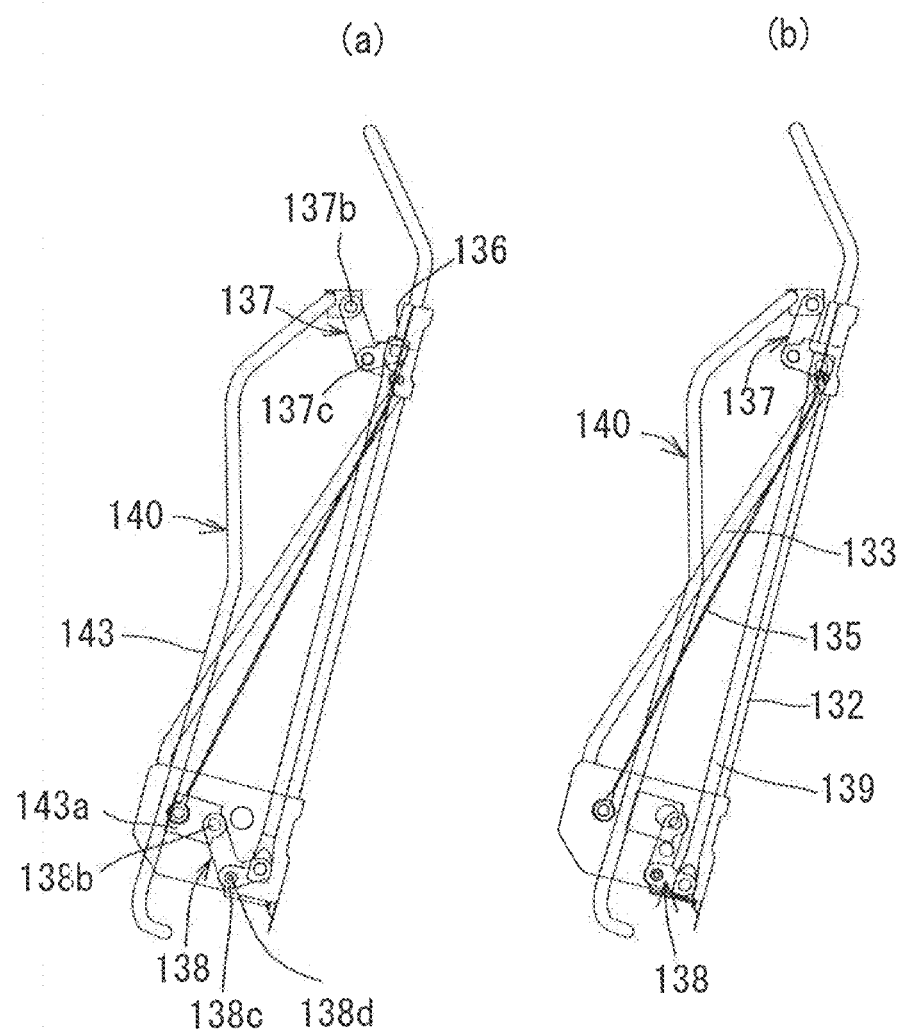
FIGS. 20A and 20B are views for explaining a function of a cushioning member arrangement frame for a seat back.

As shown in FIG. 19, a cushioning member for a seat back 150 includes a first base cushion 151 and second base cushions 152. The first base cushion 151 comprises, for example, a three-dimensional knitted fabric, and an upper portion thereof is engaged with the upper edge portion 141 of the cushioning member arrangement frame for a seat back 140. A lower portion of the first base cushion 151 is engaged with upper ends of coil springs 145 whose lower ends are engaged with a spring supporting frame 146 arranged slightly above the lower edge portion 142 of the cushioning member arrangement frame for a seat back 140. The function of the coil springs 145 is completely similar to that of the first embodiment, but other coil springs 147 are further disposed between the vicinity of the lower portion of the first base cushion 151 and the vicinities of the lower ends of the side edge portions 143, 143 in this embodiment. Thereby, since elasticity functions in front and rear directions of the first base cushion 151, stroke feeling of a lumbar correspondence site in the first base cushion 151 is increased and a function of reduction of bottom contact or the like is achieved.

The second base cushions 152 are formed of, for example, a three-dimensional solid knitted fabric, and they are is provided on the sides of the first base cushion 151. The second base cushions 152 may be integral with the first base cushion 151, or they may be separate members sewn to the first base cushion 151. Further, an auxiliary cushion for a seat back 153 whose upper edge is connected to an approximately central portion of the first base cushion 151 and which covers the coil springs 145 is disposed on a surface side of the first base cushion 151 and the second base cushions 152 like the first embodiment, so that follow-up performance to a hip region (pelvis) of a person according to posture change is increased. Further, such a configuration can be adopted that the second base cushions 152 are formed of members different from the first base cushion 151 and the second base cushions 152 are provided so as to cover the whole surface of the first base cushion 151 and the cushioning member arrangement frame for a seat back 140. In this case, the auxiliary cushion for a seat back 153 is disposed between the first base cushion 151 and the second base cushion 152. Incidentally, FIG. 19 shows only the first base cushion 151, the second base cushions 152 and the auxiliary cushion for a seat back 153 as the cushioning member for a seat back 150, but a cushion for a surface layer (not shown) is also disposed so as to cover these cushions.

In the embodiment, the cushioning member arrangement frame for a seat back 140 is supported by a parallel linkage provided with the upper link portion 137 and the lower link portion 138 in the seat back section 130, which is different from the abovementioned first embodiment. Therefore, when force pressing the cushioning member for a seat back 150 from a surface side thereof (the seat face) is applied from a state shown in FIG. 20A, both the upper link portion 137 and the lower link portion 138 together are rotated from the state shown in FIG. 20A obliquely backward and upward, so that the cushioning member arrangement frame for a seat back 140 is also moved obliquely backward and upward to reach a state shown in FIG. 20A. As a result, when the cushioning member for a seat back 150 is pressed or a pressing force is made small according to breathing action of a person, the cushioning member arrangement frame for a seat back 140 is displaced obliquely backward and upward or it is next displaced from the previous position obliquely forward and downward, so that the cushioning member arrangement frame for a seat back 140 coincides with an acting direction of a body of the person according to the breathing action (a direction in which the person moves easily), and breath can be conducted more easily than the abovementioned configuration.

FIG. 21A shows a state that a person erects his upper body to sit on a seat, while FIG. 21A shows a case that a person sits on a seat in his/her relaxing state where he/she presses the cushioning member for a seat back 150 with his/her legs stretched out. When his/her sitting state changes from the state shown in FIG. 21A to the state shown in FIG. 21B due to his/her breathing, body movement or the like, the cushioning member arrangement frame for a seat back 140 is displaced obliquely backward and upward as shown by an arrow, and the front portion supporting frame 115 and the rear portion supporting frame 116 configuring the cushioning member arrangement frame for a seat cushion is pressed by his/her legs to be displaced obliquely forward and downward. Accordingly, in the embodiment, follow-up performance of the cushioning member for a seat back 150 or the seat face of the cushioning member for a seat cushion to movements of the back, the waist, the hip region (pelvis), and the femoral region of the person is high like the first embodiment.

As described above, in the seat structure of the embodiment, follow-up performance of the seat face of the cushioning member for a seat back or the cushioning member for a seat cushion to a human body which is obtained by each of the elastically supporting mechanisms of the cushioning member arrangement frame for a seat back and the cushioning member arrangement frame for a seat cushion is high in each of the abovementioned embodiments. Further, vibrations from the outside are reduced by the spring characteristic of the parallel linkage. Accordingly, by combining devices which detect respective bio-signals, further accurate detection of the bio-signals becomes possible.

Figure 22:
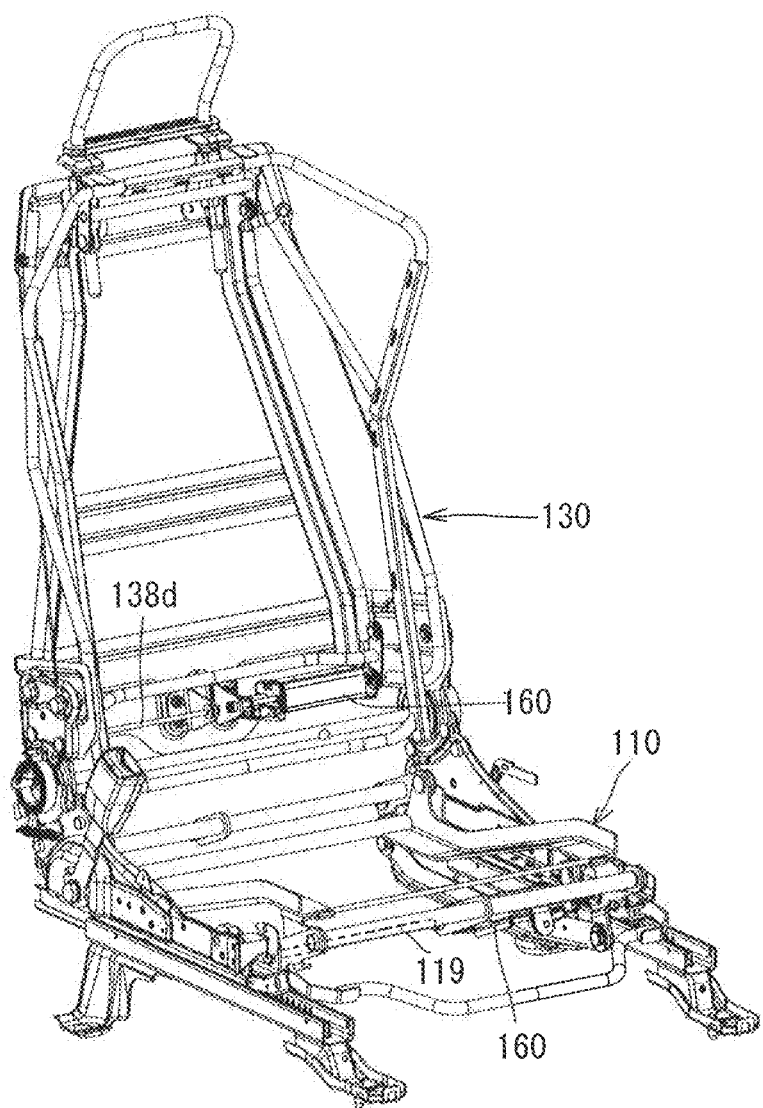
FIG. 22 is a view where a load detecting device has been provided as a bio-signal detecting device in the seat structure according to the second embodiment.

FIG. 22 shows a configuration where load detecting devices 160 are respectively provided on the seat cushion section 110 and the seat back section 130 in the second embodiment as bio-signal detecting devices. The load detecting device 160 is configured by winding an exciting coil and a pickup coil on a periphery of the torsion bar 119 or the 138d, and it detects load from change of an output voltage characteristic occurring due to twisting of the torsion bar 119 or 138d. The torsion bar 119 or 138d is twisted by motion of the front link portion 112 supporting the cushioning member arrangement frame for a seat cushion or the lower link portion 138 supporting the cushioning member arrangement frame for a seat back and the load detecting device 160 can detect load change sensitively because a structure where each seat face of the cushioning member for a seat back or the cushioning member for a seat cushion fits a human body well regardless of breath, body movements, or posture change of a person is adopted.

Figure 23:
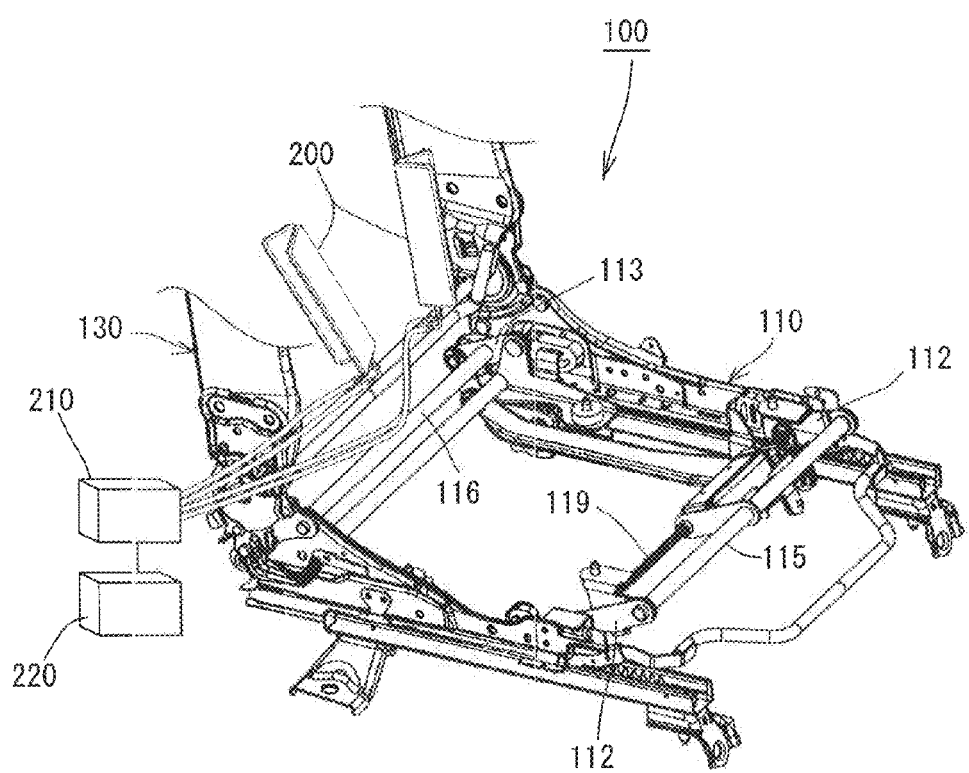
FIG. 23 is a view where an air cushion (an air pack sensor) has been provided as the bio-signal detecting device in the seat structure according to the second embodiment.

Further, as shown in FIG. 23, a configuration incorporating a bio-signal analyzer provided with an air cushion (an air pack sensor) 200 which is arranged at least one of positions corresponding to left and right iliocostalis lumborum muscles of a person along the iliocostalis lumborum muscles in an approximately vertically-long state and whose upper end has a length which can be set to a height corresponding to a lower face of the diaphragm of a person and analyzing means 220 which detects air pressure fluctuation of the air cushion 200 caused by a bio-signal of a person through an air pressure measuring instrument 210 to analyze a live body state of a person can be adopted in the seat back section 30. According to the bio-signal analyzer, heartbeat, voice, and breath are transmitted to the air cushion 200 filled with air via the diaphragm and the iliocostalis lumborum muscles as solid propagation sounds. Alternatively, the air cushion 200 is pressed by motion of muscles according to breath or the like. As a result, since the air pressure of the air cushion 200 is fluctuated, a live body state can be judged by analyzing a time-series waveforms at this time utilizing the analyzing means 220. At this time, according to the seat structure 1 or 100 of the present invention, since the seat back section and the seat cushion section coincide with movement of a person well according to the abovementioned configuration, the air cushion 200 reacts with movement of the cushioning member for a seat back sensitively, so that air pressure fluctuation in the air cushion 200 can be detected with high sensitivity.

Incidentally, as a computer program for analysis set in the analyzing means 220, for example, a program for determining a live body state such as hypnagogic symptoms disclosed in WO2005/092193 proposed by the present applicant, a program for quantifying the degree of fatigue disclosed in WO2005/039415, or the like can be used, and the hypnagogic symptoms or the degree of fatigue can be determined.

Tests for capturing breaths and pulse waves of persons were carried out by incorporating the air cushions 200 shown in FIG. 23 into the seat back section 130 of the seat structure 100 according to the second embodiment. Incidentally, the seat angle of the seat cushion section 110 of the seat structure 100 was about 25°.

TEST EXAMPLE 1

Seventeen healthy Japanese males and three healthy Japanese females aged in their twenties to thirties were selected as subjects. They were respectively seated on the abovementioned seat structure 100 for five minutes in the morning (AM 9 to AM 11), in the noon (PM 1 to PM 5), and in the night (PM 7 to PM 9) in a resting state with a vehicle being in a static state and live body states of the subjects during this period were examined. In text example 1, outputs due to air pressure fluctuation of the air cushion 200 obtained from the air pressure measuring instrument 210 were filtered through an analog signal processing circuit to be separated into breath components and heartbeat components, and respective spectrum waveforms of the breath components and the heartbeat components were obtained in the analyzing means 220. Incidentally, in the filtering processing step, fourth-order filtering was performed to bands of 0.1 Hz to 0.5 Hz and 0.5 Hz to 2.0 Hz, thereby separating the breath components and the heartbeat components. The sampling frequency was 200 Hz and the resolution was 12 bits.

Figure 24:
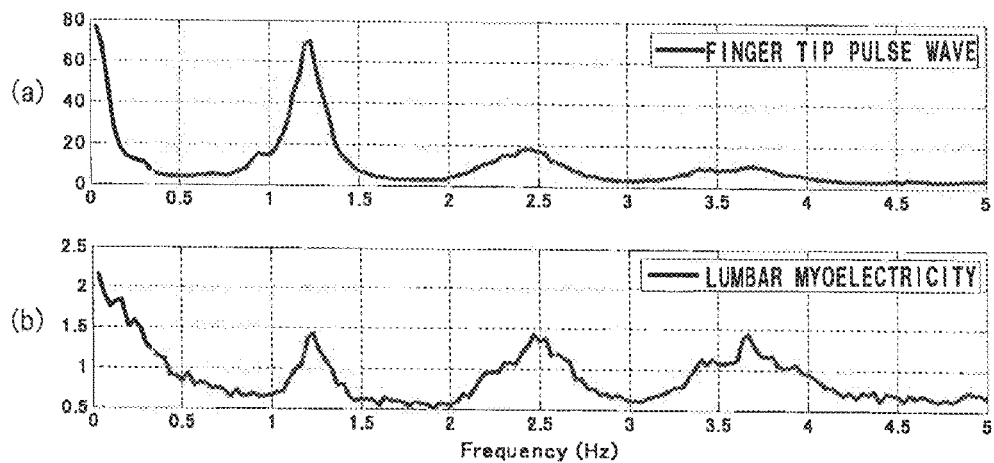
FIGS. 24A and 24B are graphs of comparison data between a detection signal of finger tip pulse waves and a detection signal of a muscle potential obtained by attaching an electrode to a left lumbar iliocostal muscle region.

Further, for obtaining correlativity with bio-signals obtained from the air cushion 200, an optical finger tip pulse wave meter was attached to the left index finger of each subject to measure finger tip volume pulse waves, and a distortion type respirometer was attached to the chest region of each subject to measure breathing. The measured data were processed, and spectral waveforms of heartbeats were obtained from the finger tip volume pulse wave meter and spectral waveforms of breaths were obtained from the distortion type respirometer. Incidentally, as pre-verification of bio-signal sensing at a lumbar of the subject, an electrode was attached to his/her right iliocostalis lumborum muscle region thereby performing a muscle potential and performing comparison with finger tip pulse waves. It was found that both positions of peaks of the muscle potential and the finger tip pulse waves coincided with each other at a frequency of 1.2 Hz, as shown in FIGS. 24A and 24B. From such a fact, it is said that the pulse waves influence an active potential on muscle fibers, so that it is thought that it is possible to detect pulse wave components from the lumbar.

Figure 25:
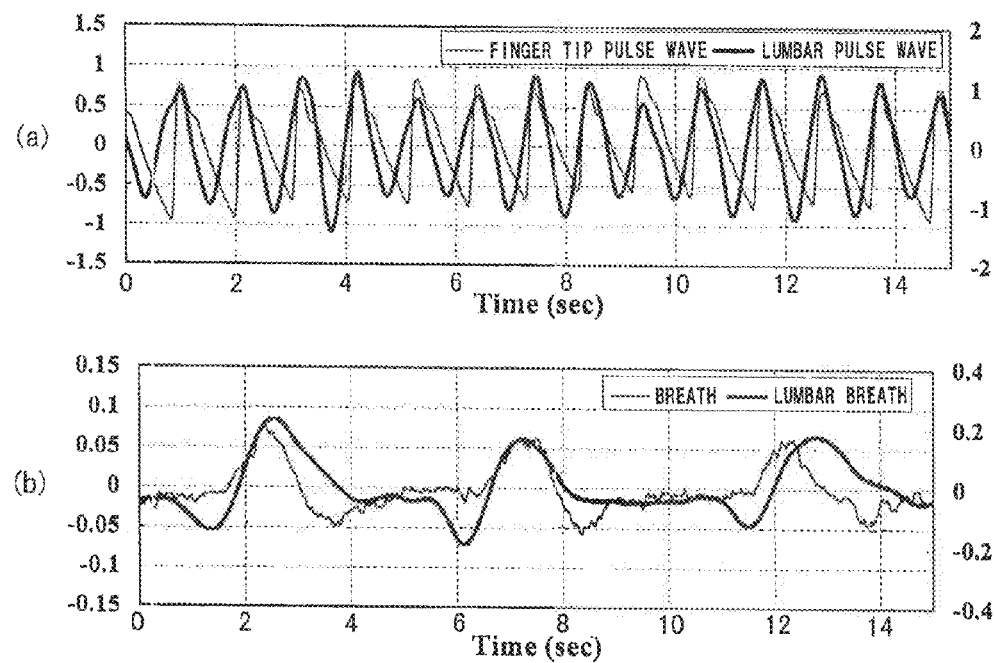
FIG. 25A is a graph of comparison between time-series waveforms of finger tip pulse waves and lumbar pulse waves collected from a finger tip pulse wave meter and an air cushion.
FIG. 25B is a graph showing comparison between time-series waveforms of a distortion type respirometer and lumbar breath.
Figure 26:
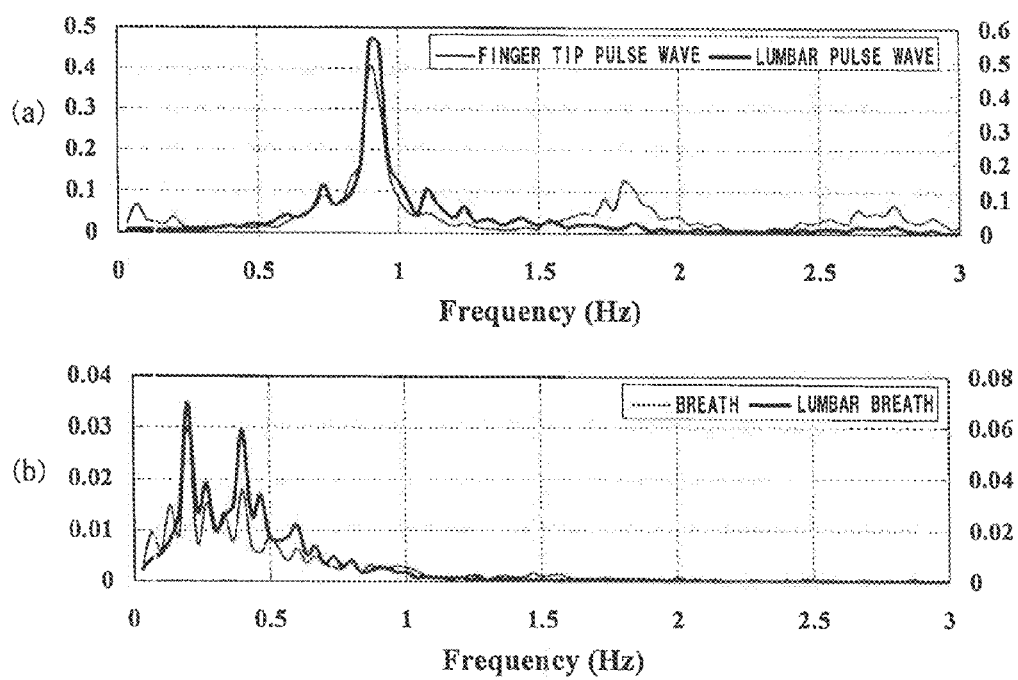
FIG. 26A is a graph of comparison of frequency analysis of time-series waveforms of finger tip pulse waves and lumbar pulse waves collected from a finger tip pulse wave meter and an air cushion.
FIG. 26B is a graph of comparison of frequency analysis of time-series waveforms of a distortion type respirometer and lumbar breath.

FIG. 25A shows comparison between time-series waveforms of finger tip pulse waves and lumbar pulse waves collected from a finger tip pulse wave meter and the air cushion 200, while FIG. 24B shows comparison between time-series waveforms of a distortion type respirometer and lumbar breathing. FIG. 26A shows comparison of frequency analysis between time-series waveforms of finger tip pulse waves and lumbar pulse waves collected from the finger tip pulse wave meter and the air cushion 200, while FIG. 26B shows comparison of frequency analysis between time-series waveforms of the distortion type respirometer and lumbar breathing. In FIGS. 25A and 25B, the numbers of peaks of the pulse waves and breaths coincided with each other, and the positions of peaks of pulse waves and breaths coincided with each other in FIGS. 26A and 26B, so that it was possible to detect bio-signals from the lumbar. This applied to all twenty subjects, and coincidence was obtained in the experiment time bands of the morning, the noon, and the night.

Figure 27:
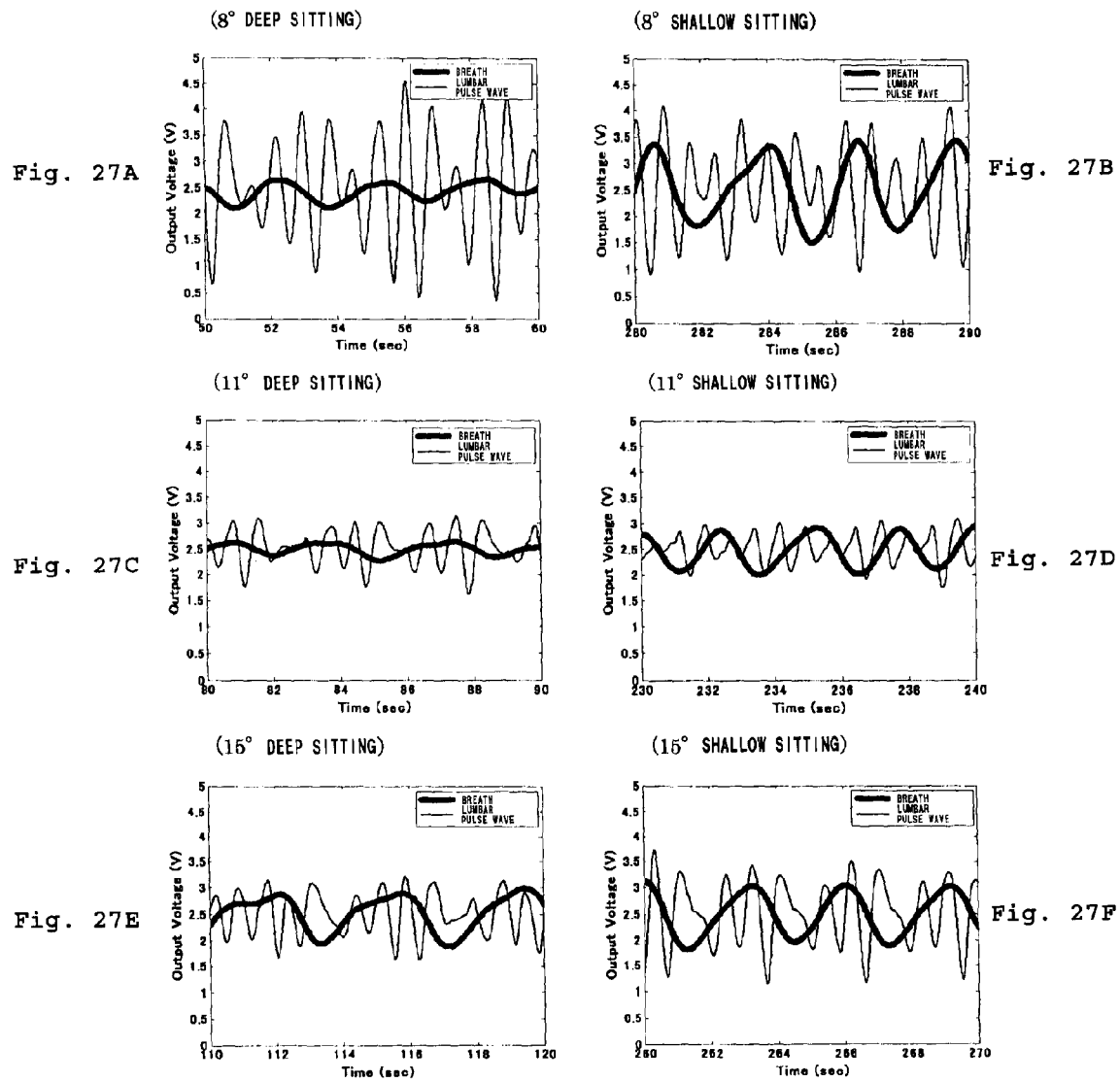
FIGS. 27A to 27F are graphs showing respective output results obtained by changing a reclining angle of a seat back section to 8°, 11°, and 15° and performing measurements at the respective angles in a case of a deep sitting posture where a person has put his/her pelvis back region on the seat back section and in a case of a shallow sitting posture where he/she has sat with a clearance between the seat back section and his/her pelvis back region.
Figure 28:
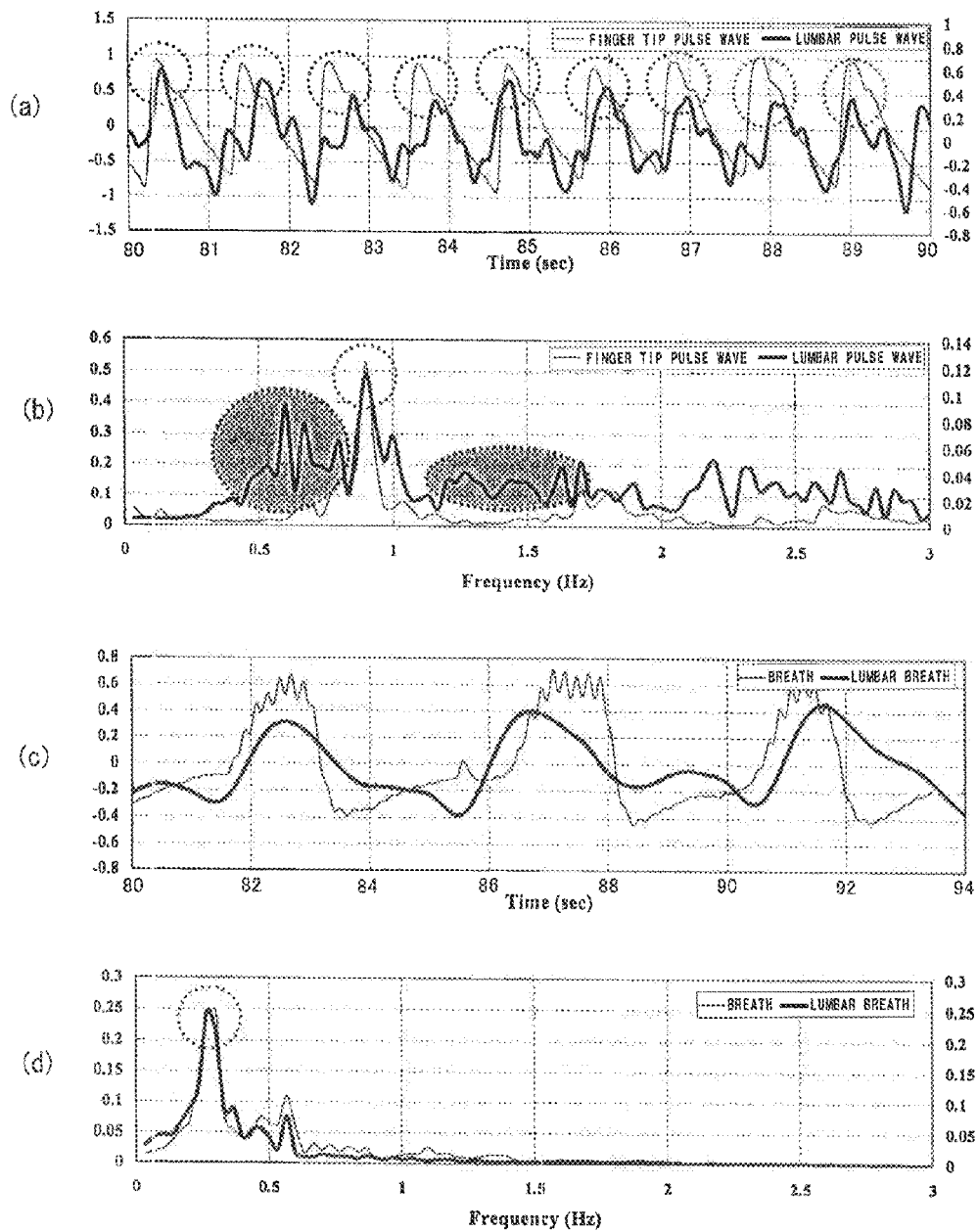
FIGS. 28A to 28D are graphs showing results of pulse wave components/breath components obtained from an air cushion at a 5 Hz spot vibration Lime, where

FIG. 27 shows respective output results of the air cushion 200 obtained in the case of a deep sitting posture with a back region of the pelvis brought in contact with the seat back section and in the case of a shallow sitting posture with a clearance formed between the seat back section and the back region of the pelvis while the reclining angle of the seat back section being changed to 8°, 11°, and 15°. Thin line denotes lumbar pulse waves, while thick line denotes lumbar breaths. Since pressure applied to the air cushion is changed by influence of a sitting posture, amplitude of waveform varies according to change of the reclining angle, but the number of pulse waves and the number of breaths are captured excellently even in the respective reclining angles. From the above results, it was found that sensing of lumbar pulse waves and lumbar breaths using the air cushion could be detected even if the sitting posture changed under static sitting conditions.

TEST EXAMPLE 2

Next, detection of pulse wave components and breath components was performed like the test example 1 in a state that the abovementioned seat structure 100 was set to a vibrator and spot vibrations at a frequency of 5 Hz were applied to the seat structure. FIGS. 28A to 28D shows results of pulse wave components and breath components obtained from the air cushion in the case of 5 Hz spot vibrations. FIGS. 28A, 28B, 28C, and 28D show comparison of pulse wave time-series waveform, pulse wave spectral waveform, breath time-series waveform, and breath spectral waveform. Regarding time-series comparison between finger tip pulse waves and lumbar pulse wave components in FIG. 28A, the numbers of characteristic peaks coincide with one another, and coincidence is obtained at a frequency of 0.9 Hz even in FIG. 28B. However, unnecessary components appear in bands of 0.4 Hz to 0.8 Hz and 1.2 Hz to 1.6 Hz in FIG. 28B. Though the bands should not be originally present by vibrations at a frequency of 5 Hz, it is thought that such a presence results from motion components of a person and a seat induced by inputted vibrations. Even in time-series comparison between the distortion type respirometer and lumbar breath components, the numbers of characteristic peaks coincide with each other, and coincidence is obtained at a frequency of 0.25 Hz in the comparison between spectral waveforms in FIG. 28D. When the pulse wave components and the breath components obtained from the air cushion are compared with each other regarding spectral waveforms, it is found that breath component extraction can be performed easily from the degree of coincidence with respective calibrators (an optical type finger tip pulse wave meter and a distortion type respirometer). In this experiment, pulse waves and breaths can be detected from all of three subjects.

TEST EXAMPLE 3

Figure 29:
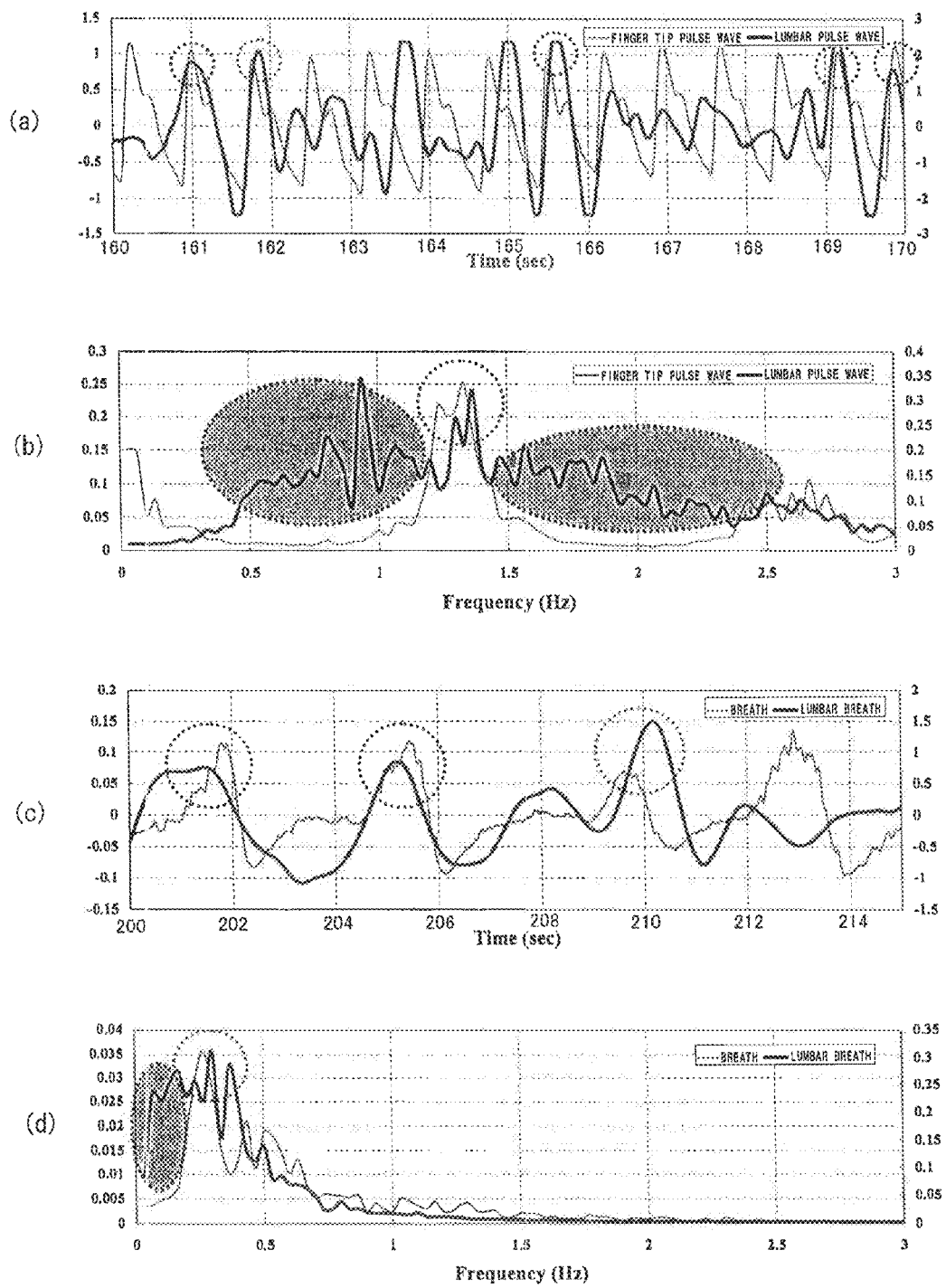
FIGS. 29A, 29B, 29C, and 29D are graphs showing comparison of a pulse wave time-series waveform, a pulse wave spectrum waveform, a breath time-series waveform, and a breath spectrum waveform, respectively.
Figure 30:
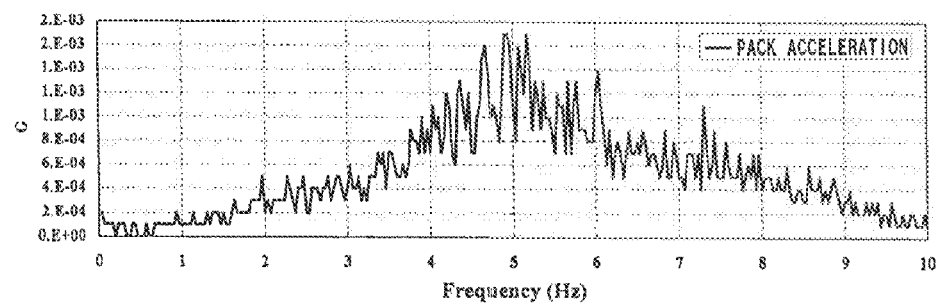
FIG. 30 is a graph showing acceleration inputted into a lumbar portion where the air cushion has been arranged.

Next, test was performed while a vibrator was actuated at random. FIGS. 29A to 29B show random vibration experiment results, and FIGS. 29A, 29B, 29C, and 29D show comparison of pulse wave time-series waveform, pulse wave spectral waveform, breath time-series waveform, and breath spectral waveform. In time-series comparison between finger tip pulse waves and lumbar pulse waves shown in FIG. 29A, five coincidence points of peak are present, and coincidence is obtained at a frequency of 1.3 Hz even in FIG. 29B. However, sensitivity is low as in compared with the case of 5 Hz vibration shown in FIG. 28A. This is because pressure fluctuation occurs in the air cushion due to motions of the seat face and the subject, so that the unnecessary portions shown by a gray region in FIG. 29A become larger than the gray regions in FIG. 28B. This is because acceleration inputted into a lumbar portion to which the air cushion is arranged spreads over a frequency region of a wide range in a normal distribution manner centering a frequency of 5 Hz, as shown in FIG. 30. Regarding the results of the distribution type respirometer and the lumbar breath components shown in FIG. 29C, coincidence points of peak are present, but sensitivity becomes lower than that in the case of 5 Hz vibration. This is also understood from a gray region shown in FIG. 29D. Influence of pressure fluctuation to the air cushion is thought in the case of the breaths like the pulse waves.

Figure 31:
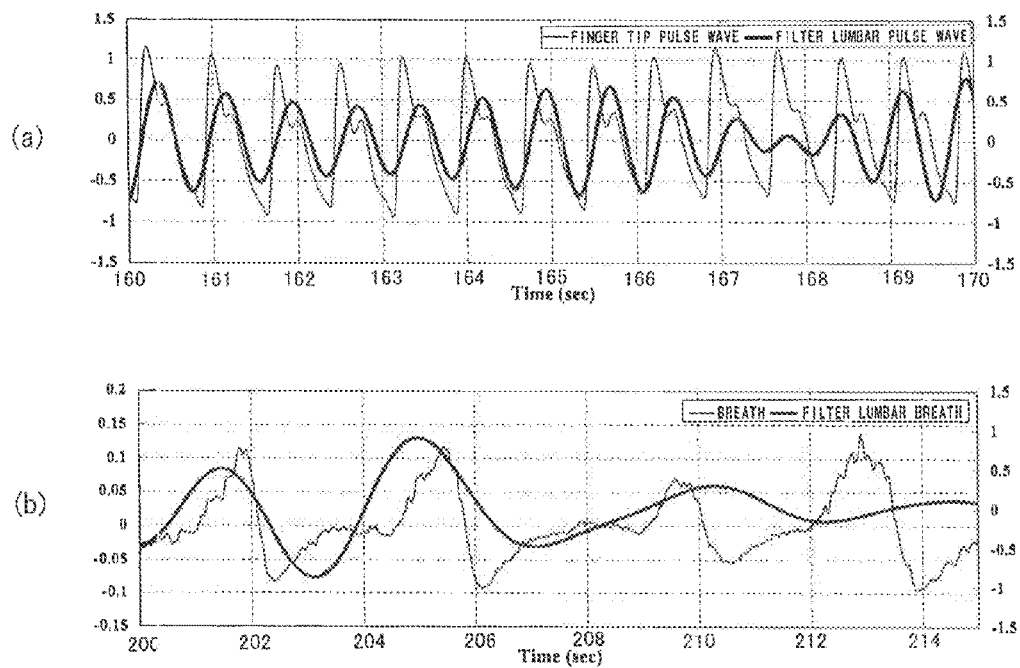
FIGS. 31A and 31B are graphs showing comparison of time-series waveforms obtained by applying a digital filter to pulse wave components and breath components respectively sensed from the air cushion shown in FIG. 23 as post-processing.

FIGS. 31A and 31B show comparisons of time-series waveforms obtained by applying a digital filter to pulse wave components and breath components sensed from the air cushion shown in FIG. 23 as a post-processing, respectively. A filter region of pulse wave components is obtained by cutting the gray regions in FIG. 29B, and a filter region of breath components is obtained by cutting the gray region in FIG. 29D. Such excellent result was obtained that the degree of coincidence of peak was improved from pulse wave comparison shown in FIG. 31A and the degree of coincidence of peak was similarly improved from breath comparison shown in FIG. 31B. Pulse waves and breaths could be detected from all three subjects after digital filter.

TEST EXAMPLE 4

Next, three subjects aged from their thirties to forties were seated on the abovementioned seat structure 100 and test was carried out about whether or not determination about whether or not they were drinking could be made. As bio-signals for comparison, measures of finger tip volume pulse waves (Finger Clip Probe manufactured by AMCO Inc.: Model SR-5C), a breath sensor (Breath Pickup manufactured by NIHON KODEN CORPORATION: Model TR-751T), a laser blood flowmeter (Laser Blood Flowmeter manufactured by Cyber Firm Inc.: Model CDF-2000), an electrocardiograph (Electrocardiograph manufactured by NIHON KODEN CORPORATION: Model CG-9122), and alcohol concentration in breath (Alcohol Detector: Model CA-2000) were carried out.

Figure 32:
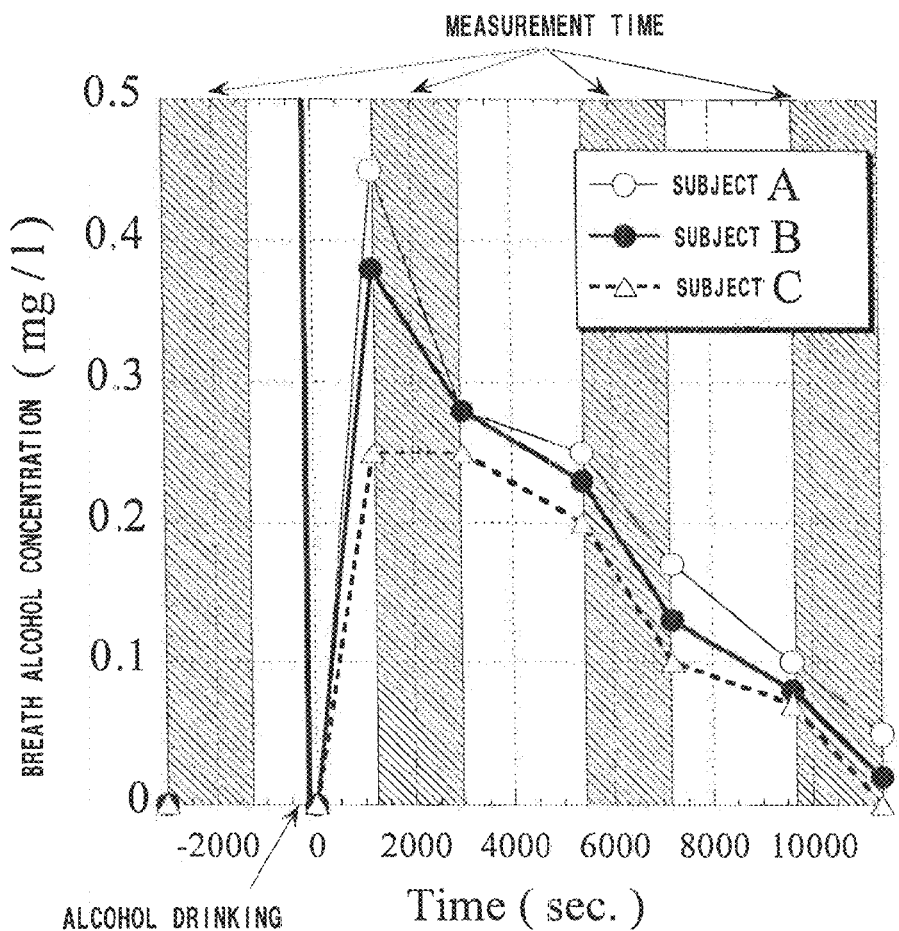
FIG. 32 is a graph showing a measurement result of alcohol concentration in breath before and after measurement.

Ethanol patch test was carried out to three subjects in a day different from a day for alcohol-drinking test in advance, where it was confirmed that all of three subjects were of active type (NN type). Incidentally, regarding body weights and body heights of the subjects, the subject A weighs 58 kilograms and is 166 centimeters tall, the subject B weighs 58 kilograms and is 178 centimeters tall, and the subject C weights 70 kilograms and is 167 centimeters tall. Measurements of bio-signals performed by an air cushion (an air pack sensor) and the abovementioned sensor for comparison were once performed 30 minutes before drinking alcohol, and thereafter they drank alcohol (Japanese sake: alcohol 15°, ichi-gou=180 ml) and the first measurements were performed in a period of 30 minutes from 20 minutes to 50 minutes after drinking alcohol where the alcohol concentration in blood after drinking alcohol was considered to be highest. Thereafter, taking fixed time intervals for seeing change due to time elapsing, the second measurements was performed in a period from 90 to 120 minutes after drinking alcohol and the third measurements were performed in a period from 160 to 190 minutes after drinking alcohol, thus, four measurements was totally carried out. Alcohol concentrations in breath were measured before measurement of the bio-signals and after the measurement. The measurement result of the breath alcohol concentrations is shown in FIG. 32. Incidentally, these values show average values obtained by performing three measurements.

The present applicants have already proposed algorithm capturing hypnagogic symptom phenomenon or the degree of fatigue, as described above (WO2005/092193, WO2005/039415, and the like). Here, the hypnagogic symptom phenomenon is called a transition state (balanced state) produced by fluctuation of balance of homeostatic function from fatigue, especially, during fluctuation due to competition between sympathetic nerve and parasympathetic nerve, and when fatigue further proceeds from this state, the balanced state is collapsed, which results in sleeping. On the other hand, before and after drinking alcohol, homeostatic function of a live body resists ethanol which is external stimulus, so that primary balance fluctuation occurs such as occurring at a time of hypnagogic symptom phenomenon. In view of these circumstances, the present applicants have thought that application of the algorithm capturing hypnagogic symptom phenomenon will be possible.

Figure 33:
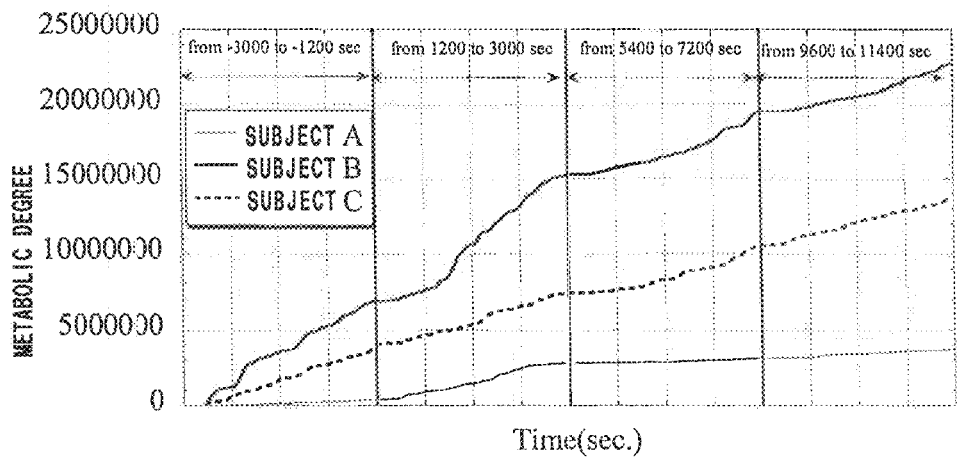
FIG. 33 is a graph showing a degree of metabolism at a drinking time obtained from a gradient time-series analysis of finger tip volume pulse waves.

FIG. 33 shows the metabolic degree at an alcohol-drinking time obtained from the gradient time-series analysis of finger tip volume pulse waves (defined as "degree of fatigue" in the abovementioned Publications). The metabolic degrees of the subjects A and B whose breath alcohol concentrations were high just after drinking alcohol rise largely in a period from 1200 to 3000 seconds. This state shows an active state. On the other hand, according to Order for Enforcement of Road Traffic Act 44 (3), breath alcohol concentration of 0.15 mg per 1 liter of breath is said to correspond to 0.3 mg per 1 ml in flood. It is thought that the subjects A and B correspond to buzzed term from the breath alcohol concentration of this time band, they are in a stage where increases of a heart rate and the number of breaths occur, and it is considered that the metabolic degree was increased due to strain on bodies of the subjects. The subjects A and B are in a state where advance of the so-called physical fatigue is fast. It is thought that the subject C is low in blood alcohol concentration and he/she is in an exhilarating term, where considerable increase of the metabolic degree does not occur and significant increase of the physical fatigue is suppressed. Now, both the subjects A and B become small in gradient of the metabolic degree at a time point of 3000 seconds. This is thought due to that the subjects A and B enter a release period of suppression due to drinking alcohol. Slight disturbance occurs in the subject C in a period from 5400 to 7200 seconds, but it is unlikely that such disturbance is due to significant increase of fatigue, but it can be thought that the disturbance is fluctuation of the homeostatic function.

Figure 34:
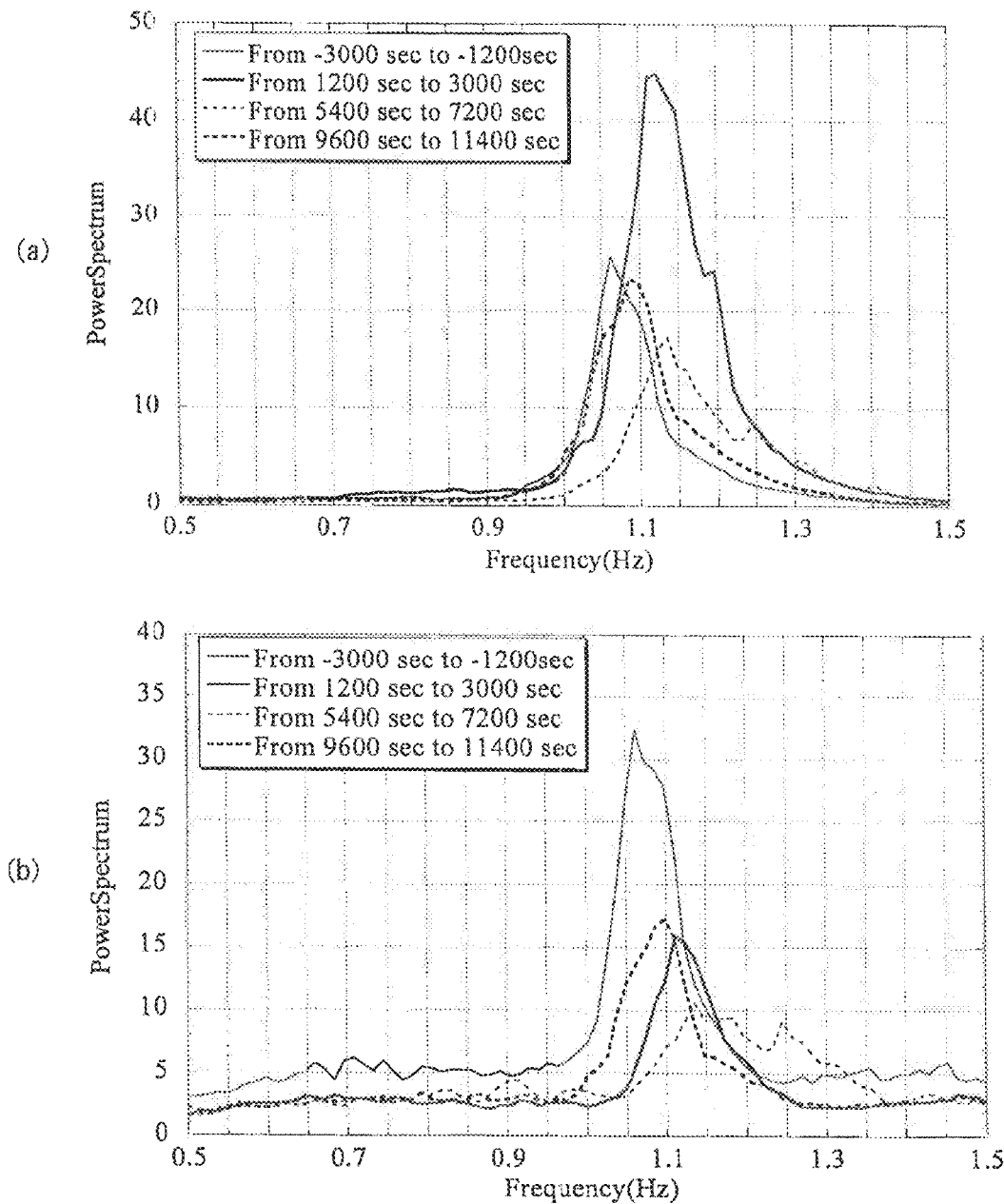
FIGS. 34A and 34B are graphs showing power spectra according to an FFT frequency analysis of finger tip volume pulse waves (FIG. 34A) and pulse waves obtained from an air pack sensor (FIG. 34B)

FIGS. 34A and 34B show power spectra according to FFT frequency analysis of finger tip volume pulse waves (FIG. 34A) and pulse waves obtained from the air pack sensor (FIG. 34A). It is understood that a frequency of power spectrum after drinking alcohol was shifted toward high frequency side as compared with that before drinking alcohol. Incidentally, it is thought that a difference in magnitude between the finger tip volume pulse waves and the pulse waves obtained from the air pack sensor is a difference according to detecting fluctuation of blood or detecting fluctuation of muscle force linked to pulse waves. That is, in the case of the air pack sensor, since air pressure fluctuation is detected via movement of muscles, air pressure fluctuation is difficult to conduct in a state that muscles have been relaxed after drinking alcohol as compared with a state of muscles before drinking alcohol (a relatively contracted state as compared with the state after drinking alcohol). Accordingly, in the case of the air pack sensor, it is thought that a difference between before drinking alcohol and thereafter appears significantly because the detection is performed through the muscles. It is understood that the frequency of power spectrum becomes close to a frequency before drinking alcohol according to lowering of relative breath alcohol concentration. FIG. 34 shows the case of the subject A but similar tendency is obtained regarding the subjects B and C.

Figure 35:
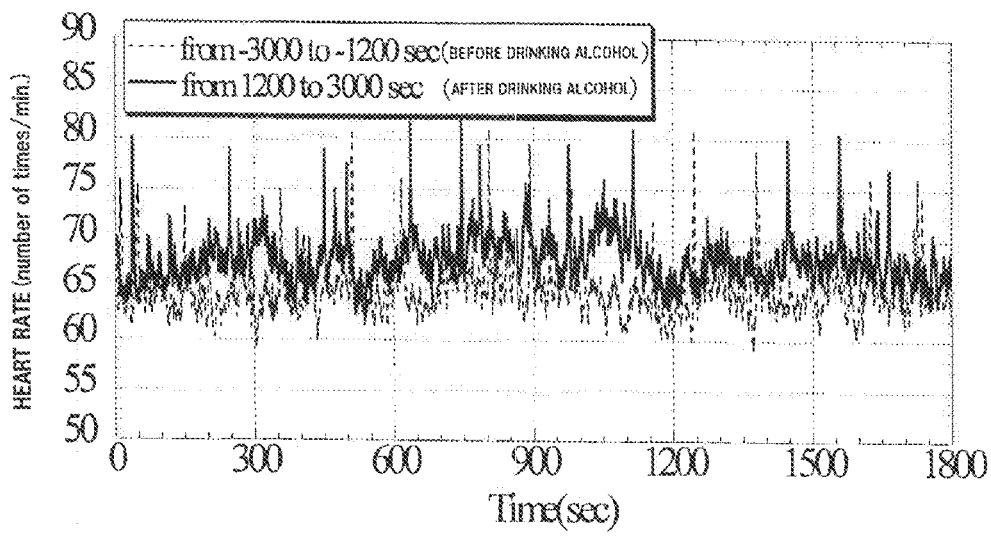
FIG. 35 is a graph showing fluctuation of a heart rate obtained from an electrocardiograph.

FIG. 35 shows fluctuation of a heart rate obtained from an electrocardiograph. As compared with before drinking alcohol (between −3000 and −12000 seconds), the heart rate rises after drinking alcohol (between 1200 and 3000 seconds), and a tendency similar to the frequency analysis result of pulse waves is in evidence.

Figure 36:
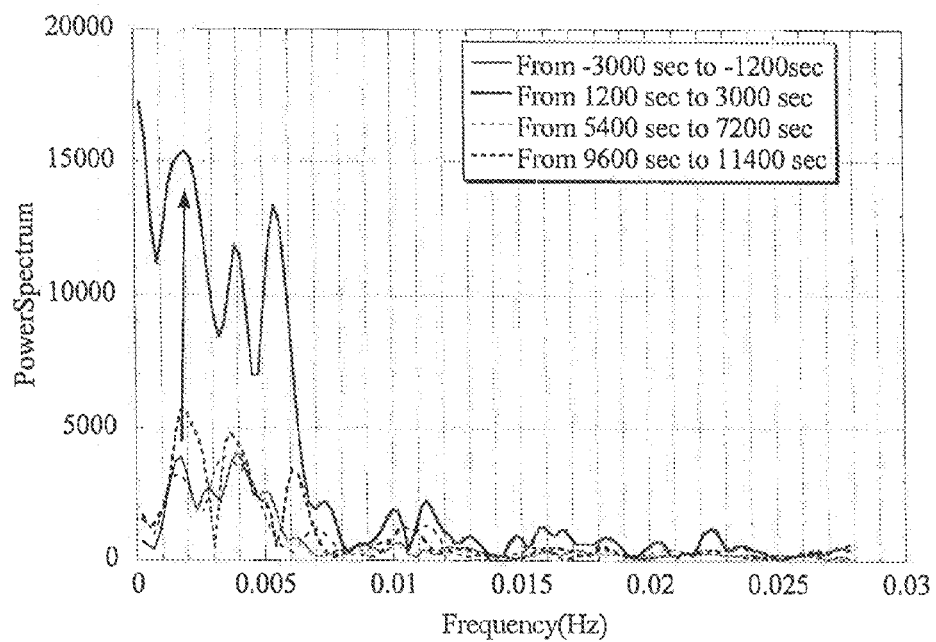
FIG. 36 is a graph showing a frequency analysis result of a gradient time-series analysis of power values obtained from finger tip volume pulse waves.

FIG. 36 shows a frequency analysis result of a gradient time-series analysis of power values obtained from finger tip volume pulse waves. It is understood that a frequency of a main power spectrum tends to rise due to drinking alcohol like the original waveform frequency analysis of pulse waves shown in FIG. 34. Main power spectra of the subjects A and B who are thought to be in a buzzed term during measurement between 1200 and 3000 seconds where breath alcohol concentration after drinking alcohol is high become large in fluctuation as compared with fluctuation before drinking alcohol. Here, competition of homeostatic function can be found. Regarding the other subjects, there are differences in absolute value of power spectrum, but a relationship between before drinking alcohol and thereafter shows similar tendency.

Figure 37:
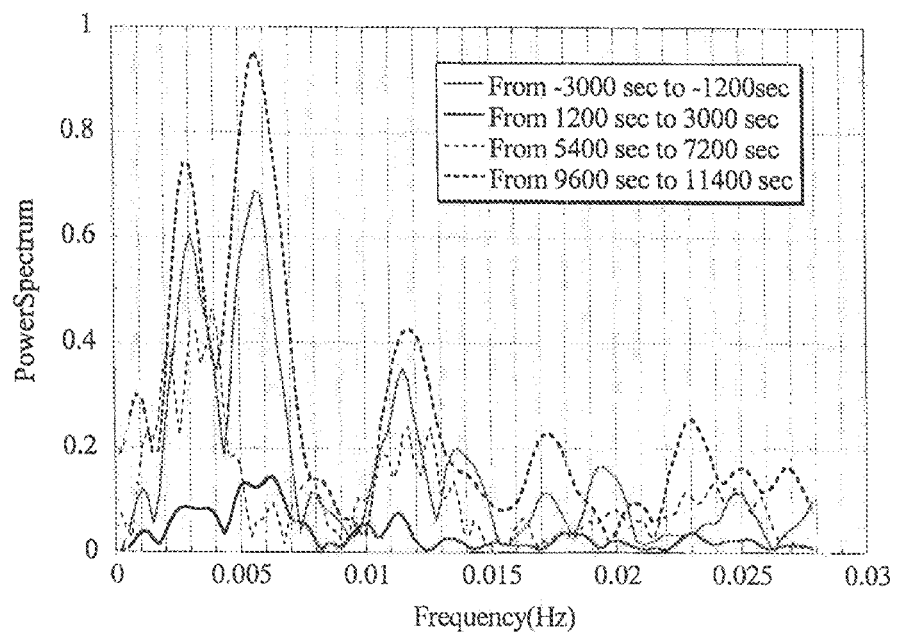
FIG. 37 is a graph showing a frequency analysis result of a gradient time-series analysis of the maximum Lyapunov index obtained from a chaos analysis of fingertip volume pulse waves of a subject A.
Figure 38:
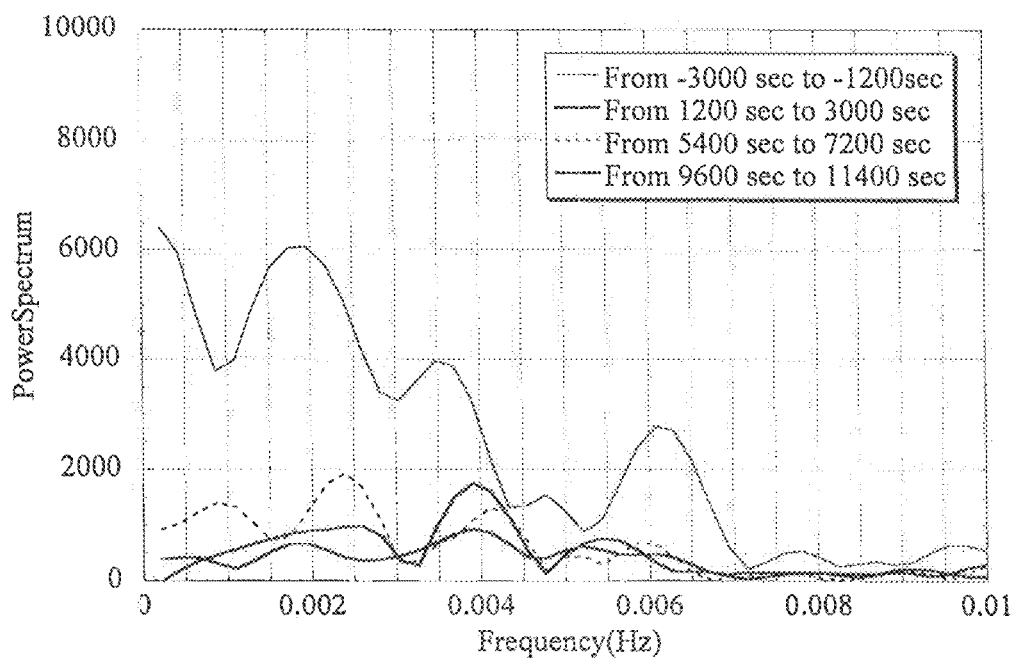
FIG. 38 is a diagram showing a frequency analysis of a gradient time-series waveforms of power values of an air pack sensor.
Figure 39:
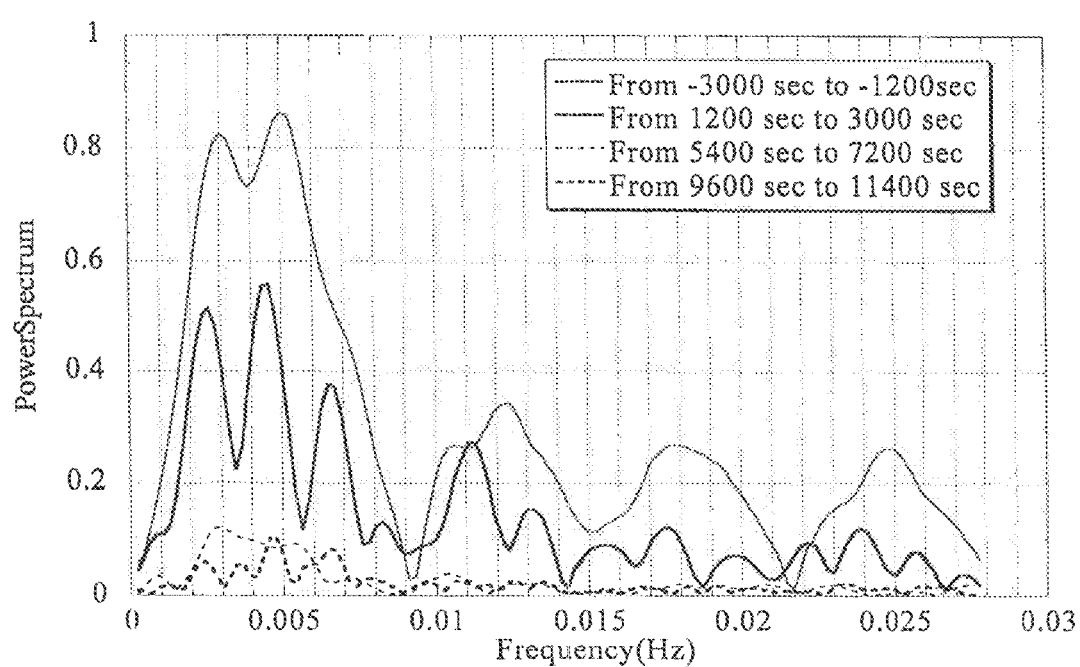
FIG. 39 is a diagram showing a frequency analysis of a gradient time-series waveform of the maximum Lyapunov indexes of an air pack sensor.

FIG. 37 shows a frequency analysis result of a gradient time-series analysis of the maximum Lyapunov indexes obtained from chaos analysis of finger tip volume pulse waves of the subject A. The maximum Lyapunov index is an index about orbit instability, where a small index indicates a spiritually relaxed state, while it is said that a large index indicates a state that adaptive force, strain, and concentration power are high. It is said that the subject A who is in a buzzed term just after drinking alcohol becomes small in fluctuation and is in a relaxed state. On the other hand, in FIG. 38, frequency analysis of gradient time-series waveforms of power values of the air pack sensor shows a difference between an alcohol-drinking state and a non-alcohol-drinking state clearly, from which a significant difference appears. A phenomenon of stepwise function lowering at non-alcohol-drinking and at alcohol-drinking appears from the frequency analysis of the gradient time-series waveforms of the maximum Lyapunov indexes of the air pack sensor shown in FIG. 39. Analysis based upon the gradient time-series waveforms of lumbar bio-signals collected from the air pack sensor makes discrimination between non-alcohol-drinking and alcohol-drinking easy.

Figure 40:
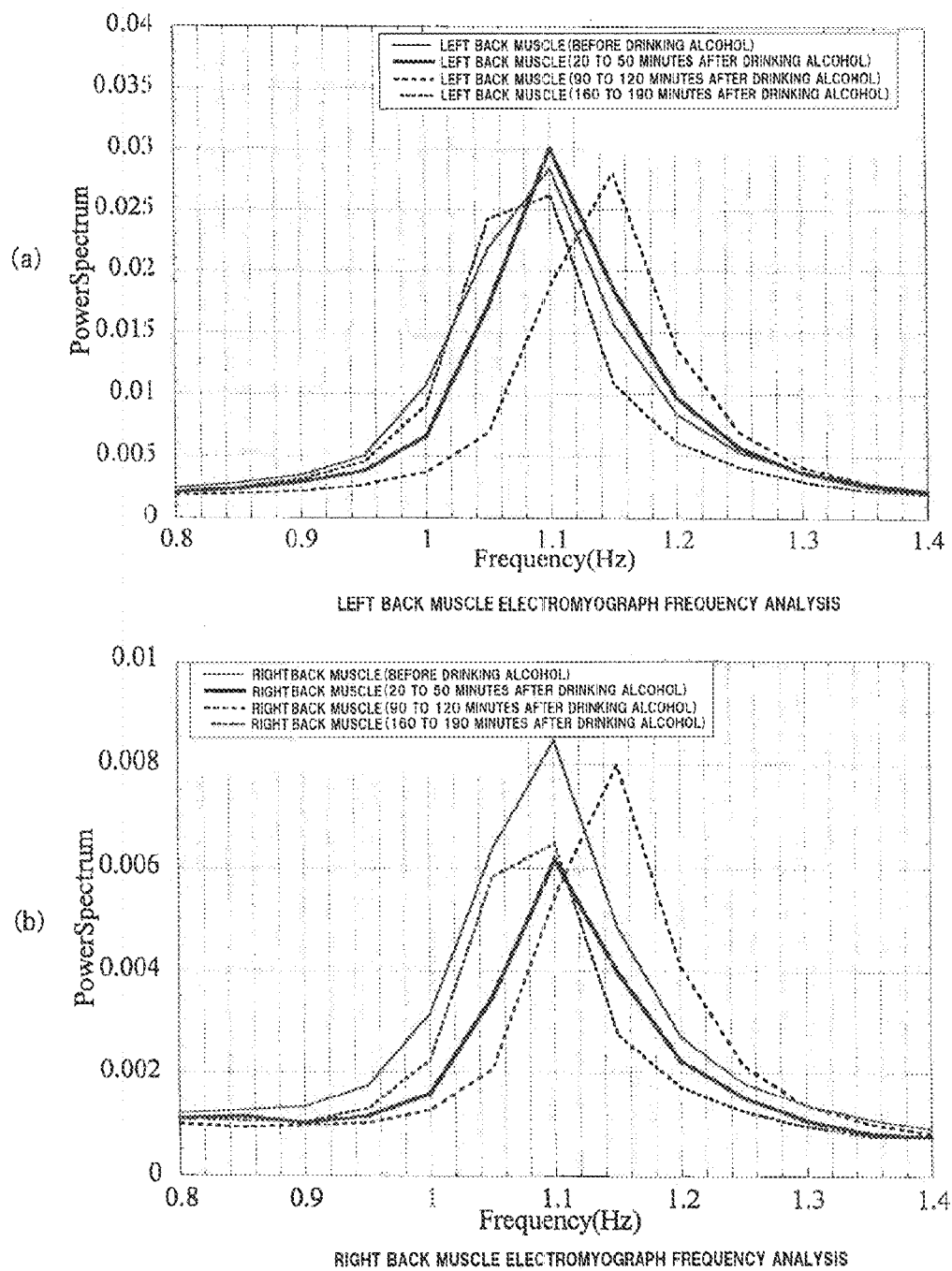
FIGS. 40A and 40B are graphs obtained by measuring a back myoelectric potential to prepare an electromyograph and performing frequency analyses before and after drinking alcohol.

Further, regarding whether an air pack sensor should be arranged at a position corresponding to a right back muscle region or at a position corresponding to a left back muscle region for achieving more sensitive detection, an electromyogram was prepared by measuring back region myoelectricity, so that the result shown in FIG. 40 was obtained. That is, it was found that amplitude of waveforms appearing in the electromyogram regarding the left back muscle region is about three times larger than that regarding the right back muscle region, the magnitude of the amplitude depended on the distance from the heart, and the left back muscle region was detected more easily than the right back muscle region.

In addition, regarding the subject A, finger tip volume pulse waves were measured in a non-alcohol-drinking state at the same time as the measurement day of the alcohol-drinking test such that the same circadian rhythm as that when the abovementioned alcohol drinking test was obtained, the gradient time-series of power values and the gradient time-series of the maximum Lyapunov indexes at the same time were obtained, and frequency analysis thereof was further carried out. Tests were carried out in a sitting state in the respective cases, and influence to the fatigue of the subject A due to alcohol drinking was examined.

Figure 41:
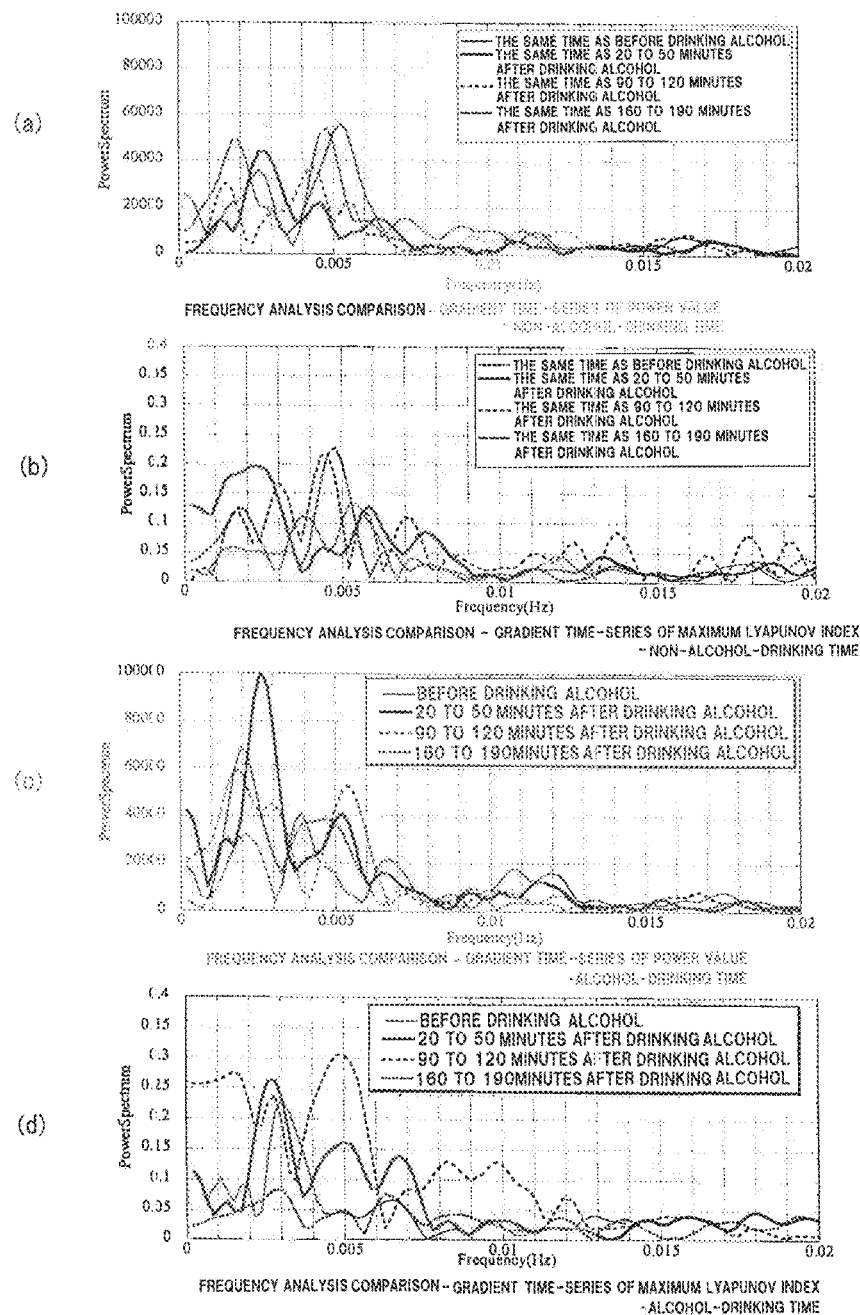
FIG. 41A is a graph showing a frequency analysis of time-series waveforms of a power value gradient at a non-drinking time.
FIG. 41B is a graph showing a frequency analysis of time-series waveforms of a maximum Lyapunov index gradient at a non-drinking time.
FIG. 41C is a graph showing a frequency analysis of time-series waveforms of a power value gradient at a drinking time.
FIG. 41D is a graph showing a frequency analysis of time-series waveforms of a maximum Lyapunov index gradient at a non-drinking time.
Figure 42:
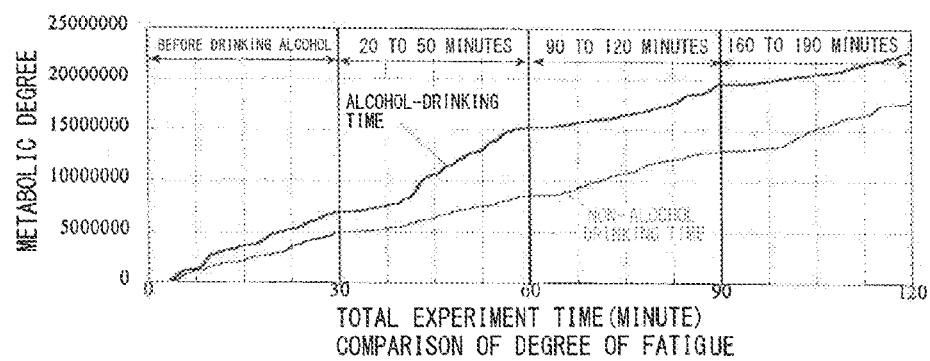
FIG. 42 is a graph showing degree of metabolism (degree of fatigue)

FIG. 41A shows frequency analysis of gradient time-series waveforms of power values at a non-alcohol-drinking time, FIG. 41B shows frequency analysis of gradient time-series waveforms of the maximum Lyapunov indexes at a non-alcohol-drinking time, FIG. 41C shows frequency analysis of a gradient time-series waveforms of power values at an alcohol-drinking time, and FIG. 41D shows frequency analysis of gradient time-series waveforms of the maximum Lyapunov indexes at a non-alcohol-drinking time. Further, the metabolic degree (the degree of fatigue) is shown in FIG. 42.

Figure 43:
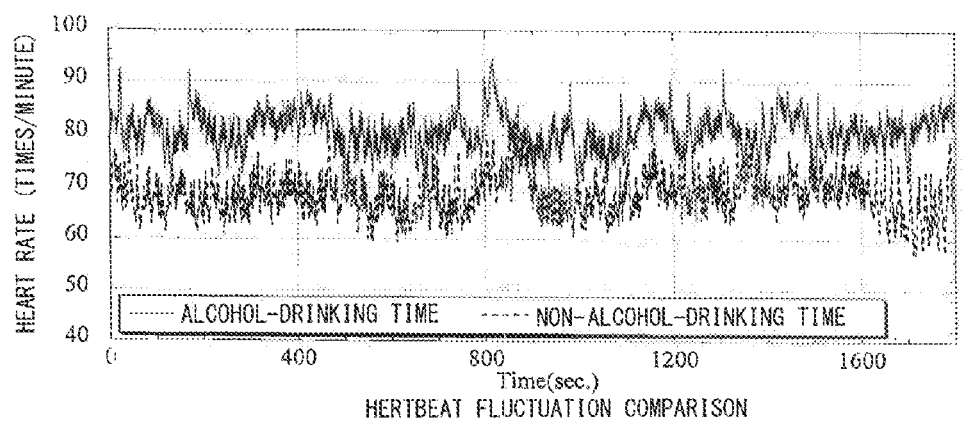
FIG. 43 is a graph showing a measurement result of a heart rate.

From these graphs, when the non-alcohol-drinking time and the alcohol-drinking time were compared with each other, a period where a significant difference therebetween occurred was a period from 20 to 50 minutes just after drinking alcohol. As shown in FIG. 43, a heart rate was also measured together with these values, but coincidence with a timing at which a heart rate rose after drinking alcohol was obtained. Accordingly, it was found that there was a significant difference in heart rate between presence of alcohol drinking and absence thereof and presence or absence of alcohol drinking could be detected by capturing the difference according to the abovementioned approach. As shown in FIG. 34, when the air pack sensor is used, since heartbeat fluctuation can be detected via movements of muscles, a difference between before drinking alcohol and thereafter can be detected more significantly than finger tip volume pulse waves.

The invention claimed is:
1. A seat structure comprising:
a seat back section provided with an elastic supporting mechanism for a seat back which supports a cushioning member arrangement frame for a seat back provided for arranging a cushioning member for a seat back such that the cushioning member arrangement frame for a seat back can be displaced according to load fluctuation to the cushioning member for a seat back; and
a seat cushion section provided with an elastic supporting mechanism for a seat cushion which supports a cushioning member arrangement frame for a seat cushion provided for arranging a cushioning member for a seat cushion such that the cushioning member arrangement frame for a seat cushion can be displaced according to load fluctuation to the cushioning member for a seat cushion, wherein
the seat cushion section is provided with a platform frame and a parallel linkage having a front link portion and a rear link portion which are disposed in the vicinity of a front portion of the platform frame and in the vicinity of a rear portion thereof, respectively,
the cushioning member arrangement frame for a seat cushion is provided with a front portion supporting frame disposed between a pair of front link portions of the parallel linkage and a rear portion supporting frame disposed between a pair of rear link portions of the parallel linkage, the elastic supporting mechanism for a seat cushion is provided with a torsion bar coupled to at least one of a rotation center of the front link portion and a rotation center of the rear link portion, the front link portion and the rear link portion of the parallel linkage are attached such that positions of the front portion supporting frame and the rear portion supporting frame supported by the front link portion and the rear link portion are displaced obliquely forward and downward at a load applying time while being displaced obliquely backward and upward at a load removing time, a cushion pan with flexibility for supporting the cushioning member for a seat cushion which is supported by the front portion supporting frame and the rear portion supporting frame is disposed at a lower portion of the cushioning member for a seat cushion, the cushion pan includes a hole portion formed at a site including a position corresponding to at least an ischial tuberosity of a person, the cushion pan is provided with a front portion engagement portion engaged with the front portion supporting frame and a rear portion engagement portion engaged with the rear portion supporting frame, and the cushion pan is provided such that, when load pressing a front edge portion of the cushion pan at a leg stretching time of a person acts on the cushion pan, the cushion pan is rotated about the front portion supporting frame such that a portion of the cushion pan positioned on the side of a hip of a person rises upwardly, the front portion engagement portion comprises a pair of plate springs projecting from the cushion pan downwardly such that the plate springs can clamp the front portion supporting frame, and the rear portion engagement portion is formed of a plate spring having a bent portion obtained by bending a base plate portion joined to a lower face of the cushion pan downward and then bending the same backward, where the bent portion is inserted below the rear portion supporting frame so that the rear portion supporting frame is clamped between the bent portion and the lower face of the cushion pan.

2. The seat structure according to claim 1, wherein
the cushioning member arrangement frame for a seat back is made of flexible material and configures a portion of the elastic supporting mechanism for a seat back,
the vicinity of an upper portion of the cushioning member arrangement frame for a seat back is displaced backward by load fluctuation for pressing the vicinity of an upper portion of the cushioning member for a seat back backward, and
the vicinity of an upper portion of the cushioning member arrangement frame for a seat back is displaced forward via the cushioning member for a seat back by load fluctuation pressing the vicinity of a lower portion of the cushioning member for a seat back backward.

3. The seat structure according to claim 2, wherein
the vicinity of the upper portion of the cushioning member arrangement frame for a seat back is displaced backward and the vicinity of a lower portion thereof is displayed forward by load fluctuation pressing the vicinity of the upper portion of the cushioning member for a seat back backward.

4. The seat structure according to claim 3, wherein
the cushioning member arrangement frame for a seat back is provided with a high rigid portion in the vicinity of a portion corresponding to a waist of a person, and can be displaced forward and backward utilizing the vicinity as a fulcrum.

5. The seat structure according to claim 1, wherein
the seat back section is provided with a resin cover, a base frame fixed inside the resin cover, and the cushioning member arrangement frame for a seat back, and
the cushioning member arrangement frame for a seat back is provided such that an upper hem portion thereof is spaced from the resin cover forward.

6. The seat structure according to claim 1, wherein
a combination of the resin cover and the base frame fixed and integrated to the resin cover, and the cushioning member arrangement frame for a seat back have different elasticities and the elasticity of the cushioning member arrangement frame for a seat back is lower than that of the combination of the resin cover and the base frame fixed and integrated to the resin cover.

7. The seat structure according to claim 5, wherein
a spring member configuring a portion of the elastic supporting mechanism for a seat back is provided on an upper portion side of the base frame, and the upper hem portion of the cushioning member arrangement frame for a seat back is elastically supported by the spring member.

8. The seat structure according to claim 1, wherein
the seat back section is provided with a base frame and a parallel linkage having an upper link portion and a lower link portion which are respectively arranged in the vicinity of an upper portion of the base frame and in the vicinity of a lower portion thereof,
the cushioning member arrangement frame for a seat back is disposed such that the vicinity of an upper portion thereof is coupled to the upper link portion of the parallel linkage and the vicinity of a lower portion thereof is coupled to the lower link portion of the parallel linkage, and
the elastic supporting mechanism for a seat back is provided with a torsion bar coupled to at least one of a rotation center of the upper link portion and a rotation center of the lower link portion.

9. The seat structure according to claim 8, wherein the upper link portion and the lower link portion of the parallel linkage are attached such that a position of the cushioning member for a seat back supported by the upper link portion and the lower link portion is displaced obliquely backward and upward at a load applying time while being displaced obliquely forward and downward at a load removing time.

10. The seat structure according to claim 1, wherein an upper end of a coil spring whose lower end is engaged with any frame is engaged with a lower portion of the cushioning member for a seat back.

11. The seat structure according to claim 10, wherein the coil spring is disposed in the vicinity of a portion corresponding to a waist of a person along a vertical direction, where forward and backward swing centering around a lower end of the coil spring and expansion and contraction occur in the coil spring according to load fluctuation.

12. The seat structure according to claim 10, further comprising an auxiliary cushion for a seat back whose upper end is engaged with an approximately central portion of the cushioning member for a seat back and whose lower end is provided covering a front side of the coil spring, wherein a lower end side of the auxiliary cushion for a seat back is thicker than an upper end side thereof.

13. The seat structure according to claim 1, wherein the cushion pan comprises a combination of synthetic resin material, and tetra-axial woven fabric, bi-axial woven fabric, or non-woven fabric which is integrated with the synthetic resin material to impart stiffness to the synthetic resin material.

14. The seat structure according to claim 1, wherein the front link portion and the rear link portion configuring the parallel linkage are provided such that a seat angle of the cushion pan at a non-loaded time is in a range from 0° to 10°when the front link portion and the rear link portion support the cushion pan.

15. The seat structure according to claim 1, wherein the cushioning member for a seat cushion has a structure obtained by stacking at least a base cushion, an intermediate cushion, and an upper cushion.

* * * * *